United States Patent
Li et al.

(10) Patent No.: US 10,812,977 B2
(45) Date of Patent: *Oct. 20, 2020

(54) SYSTEMS AND METHODS FOR APPLICATION-FRIENDLY PROTOCOL DATA UNIT (PDU) SESSION MANAGEMENT

(71) Applicant: HUAWEI TECHNOLOGIES CO., LTD., Shenzhen (CN)

(72) Inventors: Xu Li, Nepean (CA); Ngoc Dung Dao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,850

(22) Filed: Oct. 25, 2019

(65) Prior Publication Data

US 2020/0128503 A1    Apr. 23, 2020

Related U.S. Application Data

(63) Continuation of application No. 15/832,103, filed on Dec. 5, 2017, now Pat. No. 10,531,420.

(Continued)

(51) Int. Cl.
  *H04W 60/04* (2009.01)
  *H04W 16/04* (2009.01)
  (Continued)

(52) U.S. Cl.
  CPC ........... *H04W 12/06* (2013.01); *H04W 4/50* (2018.02); *H04W 4/60* (2018.02); *H04W 8/065* (2013.01);
  (Continued)

(58) Field of Classification Search
  CPC . H04W 60/04; H04W 16/04; H04W 72/0493; H04W 76/12; H04W 36/22;
  (Continued)

(56) References Cited

U.S. PATENT DOCUMENTS

9,781,259 B1    10/2017 Kodaypak
2003/0101246 A1    5/2003 Lahti
(Continued)

FOREIGN PATENT DOCUMENTS

CN    101273650 A    9/2008
CN    102158897 A    8/2011
(Continued)

OTHER PUBLICATIONS

3GPP TSG-RAN WG2 Meeting #96 R2-167661,"Status of NG study in SA2",Nokia, CMCC (Rapporteurs),Nov. 14-18, 2016.
(Continued)

*Primary Examiner* — Minjung Kim

(57) ABSTRACT

Methods by which User Plane (UP) management information is exchanged between an Application Function (AF) supporting one or more applications and a Slice Management Function (SMF) configured to manage traffic flows in a given slice of the network. The exchange of UP management information may be initiated from either the AF or the SMF. In the case of AF-initiated information exchange, the UP management information provided by the AF may comprise traffic requirements of applications supported by the AF. In the case of SMF-initiated information exchange, the UP management information provided by the SM may comprise operator policy information or events, and the AF may respond with information of traffic requirements of applications supported by the AF.

28 Claims, 40 Drawing Sheets

Related U.S. Application Data

(60) Provisional application No. 62/442,857, filed on Jan. 5, 2017, provisional application No. 62/455,368, filed on Feb. 6, 2017, provisional application No. 62/459,985, filed on Feb. 16, 2017, provisional application No. 62/473,274, filed on Mar. 17, 2017, provisional application No. 62/477,384, filed on Mar. 27, 2017, provisional application No. 62/487,960, filed on Apr. 20, 2017, provisional application No. 62/491,529, filed on Apr. 28, 2017, provisional application No. 62/522,040, filed on Jun. 19, 2017.

(51) Int. Cl.
| | |
|---|---|
| *H04W 72/04* | (2009.01) |
| *H04W 76/12* | (2018.01) |
| *H04W 36/22* | (2009.01) |
| *H04W 80/10* | (2009.01) |
| *H04W 72/12* | (2009.01) |
| *H04W 36/14* | (2009.01) |
| *H04W 28/02* | (2009.01) |
| *H04W 8/06* | (2009.01) |
| *H04W 8/14* | (2009.01) |
| *H04W 4/60* | (2018.01) |
| *H04W 4/50* | (2018.01) |
| *H04W 4/14* | (2009.01) |
| *H04W 12/06* | (2009.01) |
| *H04W 36/12* | (2009.01) |

(52) U.S. Cl.
CPC ............ *H04W 16/04* (2013.01); *H04W 28/02* (2013.01); *H04W 36/14* (2013.01); *H04W 60/04* (2013.01); *H04W 72/0493* (2013.01); *H04W 72/1257* (2013.01); *H04W 80/10* (2013.01); *H04W 4/14* (2013.01); *H04W 8/14* (2013.01); *H04W 36/12* (2013.01); *H04W 36/22* (2013.01); *H04W 76/12* (2018.02)

(58) Field of Classification Search
CPC . H04W 80/10; H04W 72/1257; H04W 36/14; H04W 28/02; H04W 8/065; H04W 8/14; H04W 4/60; H04W 4/50; H04W 4/14
See application file for complete search history.

(56) References Cited

U.S. PATENT DOCUMENTS

| | | | |
|---|---|---|---|
| 2008/0153443 A1 | 6/2008 | Takusagawa et al. | |
| 2008/0205345 A1 | 8/2008 | Sachs et al. | |
| 2010/0208704 A1 | 8/2010 | Wu | |
| 2011/0141946 A1 | 6/2011 | Ostrup et al. | |
| 2011/0202647 A1 | 8/2011 | Jin et al. | |
| 2012/0155377 A1 | 6/2012 | Chai | |
| 2013/0073508 A1 | 3/2013 | Zhou et al. | |
| 2013/0322365 A1* | 12/2013 | Garcia Martin | H04W 72/048 370/329 |
| 2014/0179310 A1 | 6/2014 | Liang | |
| 2014/0256283 A1 | 9/2014 | Lin et al. | |
| 2014/0376454 A1 | 12/2014 | Boudreau et al. | |
| 2015/0078295 A1 | 3/2015 | Mandyam et al. | |
| 2015/0264512 A1 | 9/2015 | Jain et al. | |
| 2015/0341837 A1 | 11/2015 | Zhao et al. | |
| 2015/0351138 A1 | 12/2015 | Metsala et al. | |
| 2016/0112896 A1 | 4/2016 | Karampatsis et al. | |
| 2016/0135010 A1 | 5/2016 | Zhu | |
| 2016/0174198 A1 | 6/2016 | Akiyoshi et al. | |
| 2016/0212678 A1 | 7/2016 | Akiyoshi | |
| 2016/0270132 A1 | 9/2016 | Patil et al. | |
| 2016/0277243 A1 | 9/2016 | Kim et al. | |
| 2017/0028988 A1 | 2/2017 | Light-Holets et al. | |
| 2017/0036642 A1 | 2/2017 | Nomura | |
| 2017/0242730 A1 | 8/2017 | Wang et al. | |
| 2017/0289882 A1 | 10/2017 | Faccin et al. | |
| 2017/0317894 A1 | 11/2017 | Dao et al. | |
| 2017/0331691 A1 | 11/2017 | Zhou | |
| 2017/0339609 A1 | 11/2017 | Youn et al. | |
| 2017/0366399 A1 | 12/2017 | Li et al. | |
| 2017/0366423 A1 | 12/2017 | Griot et al. | |
| 2017/0367026 A1 | 12/2017 | Li et al. | |
| 2018/0097894 A1 | 4/2018 | Li et al. | |
| 2018/0176979 A1 | 6/2018 | Ryu et al. | |
| 2018/0317121 A1 | 11/2018 | Liao et al. | |
| 2018/0352593 A1 | 12/2018 | Velev et al. | |
| 2018/0376373 A1 | 12/2018 | Liao et al. | |
| 2019/0028866 A1 | 1/2019 | Baek et al. | |
| 2019/0045408 A1 | 2/2019 | Kim et al. | |
| 2019/0058767 A1 | 2/2019 | Chandramouli et al. | |

FOREIGN PATENT DOCUMENTS

| | | |
|---|---|---|
| CN | 102763392 A | 10/2012 |
| CN | 102811473 A | 12/2012 |
| CN | 103582044 A | 2/2014 |
| CN | 104348826 A | 2/2015 |
| CN | 104704905 A | 6/2015 |
| CN | 105393506 A | 3/2016 |
| CN | 106210042 A | 12/2016 |
| EP | 2884803 A1 | 8/2013 |
| EP | 3276990 A1 | 1/2018 |
| JP | 2005510802 A | 4/2005 |
| JP | 2015177385 A | 10/2015 |
| JP | 2016537920 A | 12/2016 |
| JP | 2017510209 A | 4/2017 |
| WO | 2014035418 A1 | 3/2014 |
| WO | 2014117370 A1 | 8/2014 |
| WO | 2015055063 A1 | 4/2015 |
| WO | 2015103875 A1 | 7/2015 |
| WO | 2015153589 A1 | 10/2015 |
| WO | 2016045708 A1 | 3/2016 |
| WO | 2016074138 A1 | 5/2016 |
| WO | 2016163723 A1 | 10/2016 |

OTHER PUBLICATIONS

3GPP TR 23.799 V2.0.0 (Nov. 2016);3rd Generation Partnership Project;Technical Specification Group Services and System Aspects;Study on Architecture for Next Generation System(Release 14).
3GPP TSG SA WG2 Meeting # S2-170370,"Application-friendly UP Management",Huawei, HiSilicon,2016.
3rd Generation Partnership Project 3GPP TR 23.708 V13.0.0 Architecture enhancements for service capability exposure (Release 13) Technical Specification Group Services and System Aspects Jun. 30, 2015.
"Session Management for Scenarios with Branching Functions", 3GPP S2-164516 SA WG2 Meeting #117-BIS, Huawei, HiSilicon, Sep. 2, 2016.
"Session Management to Enable (Re-)selection of Efficient User plane path", 3GPP S2-162507 SA WG2 Meeting #115, Nokia, Alcatel-Shanghai Bell, Sprint, May 27, 2016.
"Session Management Support for URLLC in High Mobility Scenarios", 3GPP S2-163430 SA WG2 Meeting #116, Huawei, HiSilicon, Jul. 15, 2016.
3GPP TR 23.799: "Study on Architecture for Next Generation System," Feb. 2016.
3GPP TR 23.799: "Study on Architecture for Next Generation System," Apr. 2016.
3GPP TR 23.799: "Study on Architecture for Next Generation System," May 2016.
3GPP TR 22.891: "Feasibility Study on New Services and Markets Technology Enablers," Mar. 2016.
China Mobile:"Clarify the Key Issue on Network Capability Exposure", 3GPP Draft;S2-161340 Feb. 29, 2016, XP051086307, 3 pages.
"Architecture enhancements for service capability exposure"; 3GPP TR 23.708 V13.0.0 (Jun. 2015).

(56) References Cited

OTHER PUBLICATIONS

"System Architecture for the 5G System; Stage 2;" 3GPP TS 23.501 V0.0.0 (Jan. 2017).
"Procedures for the 5G System; Stage 2;" 3GPP TS 23.502 V0.0.0 (Jan. 2017).
"Study on Architecture for Next Generation System"; 3GPP TR 23.799 V14.0.0 (Dec. 2016).
"3rd Generation Partnership Project; Technical Specification Group Services and System Aspects; Study on Architecture for Next Generation System (Release 14)", 3GPP Standard;3GPP TR23.799 V1.0.1, Sep. 28, 2016, 423 pages.
Huawei et al.,"Solution for key issue 6: Co-ordination the Session and Service Continuity with the Application-aware UP Path (Re)selection",SA WG2 Meeting #116b S2-165150 (revision of S2-164628),Aug. 29-Sep. 2, 2016, Sanya, P.R. China,total 4 pages.
Huawei et al.,"Solution 4.X: On-demand SM setup",3GPP TSG SA WG2 Meeting #115 S2-162468, May 23-27, 2016, Nanjing, China,total 2 pages.
Huawei et al.,"TS 23.502: Procedures of enabling application-influenced UP management and SSC handling", 3GPP TSG SA WG2 Meeting #120 S2-172006, Mar. 27-31, Mar. 2017, Busan, South Korea,Total 5 pages.

\* cited by examiner

SYSTEMS AND METHODS FOR APPLICATION-FRIENDLY PROTOCOL DATA UNIT (PDU) SESSION MANAGEMENT

CROSS REFERENCE TO RELATED APPLICATION

This application is a continuation of U.S. patent application Ser. No. 15/832,103 filed Dec. 5, 2017 entitled "SYSTEMS AND METHODS FOR APPLICATION-FRIENDLY PROTOCOL DATA UNIT (PDU) SESSION MANAGEMENT", which claims the benefit and priority from U.S. Provisional Patent Application Ser. No. 62/442,857 PROTOCOL DATA UNIT (PDU) SESSION MANAGEMENT SYSTEMS AND METHODS filed Jan. 5, 2017; U.S. Provisional Patent Application Ser. No. 62/455,368 PROTOCOL DATA UNIT (PDU) SESSION MANAGEMENT SYSTEMS AND METHODS filed Feb. 6, 2017; U.S. Provisional Patent Application No. 62/459,985 PROTOCOL DATA UNIT (PDU) SESSION MANAGEMENT SYSTEMS AND METHODS filed Feb. 16, 2017; U.S. Provisional Patent Application No. 62/473,274 PROTOCOL DATA UNIT (PDU) SESSION MANAGEMENT SYSTEMS AND METHODS filed Mar. 17, 2017; U.S. Provisional Application 62/477,384 filed Mar. 27, 2017; U.S. Provisional Application 62/487,960 filed Apr. 20, 2017; U.S. Provisional Application 62/491,529 filed Apr. 28, 2017 SYSTEMS AND METHOD FOR APPLICATION-FRIENDLY PROTOCOL DATA UNIT (PDU) SESSION MANAGEMENT; and U.S. Provisional Application 62/522,040, SYSTEMS AND METHOD FOR APPLICATION-FRIENDLY PROTOCOL DATA UNIT (PDU) SESSION MANAGEMENT filed Jun. 19, 2017 the contents of each of which are incorporated herein by reference.

FIELD OF THE INVENTION

The present invention pertains to the field of Protocol Data Unit (PDU) session management in communication networking and Network Management systems, and in particular to systems and methods for PDU session management that enable application awareness and application-friendly Protocol Data Unit (PDU) session management

BACKGROUND

The 3$^{rd}$ Generation Partnership Project (3GPP) technical report numbered TR 23.799 and entitled "Study on Architecture for Next Generation System," version 0.8.0, September 2016 (hereinafter referred to as TR 23.799), represents one approach to the design of a system architecture for next generation mobile networks, also referred to as 5$^{th}$ generation (5G) networks. As proposed in the above referenced documents, the network can be logically divided into a control plane (CP) that supports network control functionality and a user plane (UP) that supports data traffic being communicated between User Equipment (UE), servers, and network functions available on the network. In some embodiments, a management plane may also be defined. It should be understood that the different planes are logical constructs. In many instances, the nodes and functions within the network may use the same physical hardware and connections, though they are considered to be logically distinct.

Communications between connected devices, such as UE and servers, are managed by the CP. Unlike current communication networks, with fixed short-life PDU sessions established between end points, in next generation networks it is proposed to that PDU sessions may sustain for relatively longer periods during which time PDU session parameters may need to be changed Therefore, there is a need for a method and apparatus serving mobile wireless communication devices in wireless communication networks such as proposed 5G networks, in which PDU sessions may be configured and/or updated to reflect current PDU session parameters such as application system location or UP selection.

Network function virtualization (NFV) is a network architecture concept that uses the technologies of IT virtualization to create entire classes of virtualized network functions into building blocks that may be connected to each other or to other entities, or may be chained together, to create communication services. NFV relies upon, but differs from, traditional server-virtualization techniques, such as those used in enterprise IT. A virtualized network function (VNF) may consist of one or more virtual machines (VMs) running different software and processes, on top of standard high-volume servers, switches and storage devices, or even cloud computing infrastructure, instead of having custom hardware appliances for each network function. In other embodiments, a VNF may be provided without use of a Virtual Machine through the use of other virtualization techniques including the use of containers. In further embodiments, a customized hardware appliance may be resident within the physical infrastructure used for different virtual networks, and may be presented to each virtual network as a virtual version of itself based on a partitioning of the resources of the appliance between networks. For example, a virtual session border controller could be instantiated upon existing resources to protect a network domain without the typical cost and complexity of obtaining and installing physical network protection units. Other examples of VNFs include virtualized load balancers, firewalls, intrusion detection devices and WAN accelerators.

The NFV framework consists of three main components:
Virtualized network functions (VNFs) are software implementations of network functions that can be deployed on a network functions virtualization infrastructure (NFVI).
Network functions virtualization infrastructure (NFVI) is the totality of all hardware and software components that provide the resources upon which VNFs are deployed. The NFV infrastructure can span several locations. The network providing connectivity between these locations is considered as part of the NFV infrastructure.
Network functions virtualization MANagement and Orchestration (MANO) architectural framework (NFV-MANO Architectural Framework, for example the NFV-MANO defined by the European Telecommunications Standards Institute (ETSI), referred to as ETSI MANO or ETSI NFV-MANO) is the collection of all functional blocks, data repositories used by these blocks, and reference points and interfaces through which these functional blocks exchange information for the purpose of managing and orchestrating NFVI and VNFs.

The building block for both the NFVI and the NFV-MANO are the resources of an NFV platform. These resources may consist of virtual and physical processing and storage resources, virtualization software and may also include connectivity resources such as communication links between the data centers or nodes providing the physical processing and storage resources. In its NFV-MANO role the NFV platform consists of VNF and NFVI managers and virtualization software operating on a hardware platform. The NFV platform can be used to implement carrier-grade features used to manage and monitor the platform components, recover from failures and provide appropriate security—all required for the public carrier network.

Software-Defined Topology (SDT) is a networking technique that defines a logical network topology in a virtual network. Based on requirements of the service provided on the virtual network, and the underlying resources available, virtual functions and the logical links connecting the functions can be defined by an SDT controller, and this topology can then by instantiated for a given network service instance. For example, for a cloud based database service, an SDT may comprise logical links between a client and one or more instances of a database service. As the name implies, an SDT will typically be generated by an SDT controller which may itself be a virtualized entity in a different network or network slice. Logical topology determination is done by the SDT controller which generates a Network Service Infrastructure (NSI) descriptor (NSLD) as the output. It may use an existing template of an NSI and add parameter values to it to create the NSLD, or it may create a new template and define the composition of the NSI.

Software Defined Protocol (SDP) is a logical End-to End (E2E) technique that may be used within a network service instance. SDP allows for the generation of a customized protocol stack (which may be created using a set of available functional building blocks) that can be provided to different nodes or functions within the network, or network slice. The definition of a slice specific protocol may result in different nodes or functions within a network slice having defined procedures to carry out upon receipt of a type of packet. As the name implies, an SDP will typically be generated by one or more SDP controllers which may be virtualized functions instantiated upon a server.

Software-Defined Resource Allocation (SDRA) refers to the process of allocation of network resources for logical connections in the logical topology associated with a given service instance or network slice. In an environment in which the physical resources of a network are used to support a plurality of network slices, an SDRA controller will allocate the processing, storage and connectivity resources of the network to the different network slices to best accommodate the agreed upon service requirements for each of the network slices. This may result in a fixed allocation of resources, or it may result in an allocation that is dynamically changed to accommodate the different temporal distribution of traffic and processing requirements. As the name implies, an SDRA Controller will typically determine an allocation of resources, and may be implemented as a function that is instantiated upon a server.

Service Oriented Network Auto Creation (SONAC) is a technology that makes use of software-defined topology (SDT), software defined protocol (SDP), and software-defined resource allocation (SDRA) techniques to create a network or virtual network for a given network service instance. By coordinating the SDT, SDP, SDRA and in some embodiments Software Defined Network (SDN) control, optimization and further efficiencies can be obtained. In some cases, a SONAC controller may be used to create a network slice within which a 3rd Generation Partnership Project (3GPP) compliant network can be created using a virtualized infra-structure (e.g. VNFs and logical links) to provide a Virtual Network (VN) service. Those skilled in the art will appreciate that the resources allocated to the different VNFs and logical links may be controlled by the SDRA-type functionality of a SONAC controller, while the manner in which the VNFs are connected can be determined by the SDT-type functionality of the SONAC controller. The manner in which the VNFs process data packets may be defined by the SDP-type functionality of the SONAC controller. A SONAC controller may be used to optimize the Network Management, and so may also be considered to be a Network Management (NM) optimizer.

As the implementation details and standards of NFV evolve, systems and methods for ensuring that service level agreements (SLAs) can be satisfied in a consistent and reliable manner are highly desirable.

Within this disclosure, abbreviations that are not specifically defined herein should be interpreted in accordance with 3rd Generation Partnership Project (3GPP) Technical Standards, such as, for example, Technical Standard TS 23.501 V0.3.1 (March 2017).

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide systems and methods for ensuring that service level agreements (SLAs) can be satisfied.

In a first aspect of the present invention, there is provided a method of managing a subscribed notification. The method comprises obtaining, by a session management function (SMF), information associated with a user plane (UP) selection or reselection notification subscription from an application function (AF); and sending, by the SMF, a notification of a UP selection or reselection to the AF, the notification comprising a notification type indicating that the notification is sent before or after a UP path is configured.

In an embodiment of the first aspect of the present invention, the information from the AF indicates the notification type. In another embodiment, the notification comprises an application location.

In a second aspect of the present invention, there is provided a function such as a Session Management Function (SMF). The function comprises, a processor and a computer readable memory. The computer readable memory stores instructions that when executed by the processor cause the SMF to be configured to obtain, from an Application Function (AF), information associated with at least one of a User Plane (UP) selection notification subscription and a UP reselection notification subscription; and send, through the network interface to the AF, a notification of at least one of a UP selection and a UP reselection, the notification comprising a notification type indicating that the notification is sent before or after a UP path is configured.

In an embodiment of the second aspect of the present invention, the information obtained from the AF indicates the notification type. In another embodiment, the notification comprises an application location.

In a third aspect of the present invention, there is provided a method of managing a subscribed notification. The method comprises subscribing, by an application function (AF), to a notification about a user plane (UP) selection or reselection; and receiving, by the AF, a message comprising a notification type indicating the message is before or after a UP path is configured, wherein the message is associated with the notification about the UP selection or reselection.

In an embodiment of the third aspect, the subscribing the notification comprises sending a request to subscribe to the notification, the request comprising the notification type. In another embodiment, the message includes an application location.

In a fourth aspect of the present invention, there is provided a network function such as an Application Function (AF). The network function comprises, a processor and a computer readable memory. The computer readable memory stores instructions that when executed by the processor cause the network function to be configured to subscribe to a notification about at least one of a user plane (UP) selection and a UP reselection; and receive a message comprising a notification type indicating that the message is before or after a UP path is configured, wherein the message is associated with the notification about the UP selection or reselection.

In an embodiment of the fourth aspect of the present invention, the computer readable memory stores instructions that when executed by the processor further cause the AF to be configured to, subscribe to the notification by sending a request to subscribe to the notification, the request comprising the notification type. In another embodiment, the received message comprises an application location.

Those skilled in the art will appreciate that the embodiments described above can be implemented in conjunction with the embodiment with which they are described, and may be implemented in conjunction with other embodiments of the aspect with which they are described. In some instances, an embodiment may be implemented in conjunction with complementary aspects even if not explicitly described as being applicable above.

Accordingly, an aspect of the present invention provides a method by which User Plane (UP) management information is exchanged between an Application Function (AF) supporting one or more applications and a Slice Management Function (SMF) configured to manage traffic flows in a given slice of the network.

In an implementation, a method is provided for managing protocol data unit session data traffic on a network, the method comprising a control plane entity available on the network: receiving an application program interface (API)-based Application System (AS) location notification from an AS controller, the API-based AS location notification identifying an AS location and data traffic to be associated with the identified AS location; and, transmitting an AS location notification to locate the AS.

In an implementation, before the control plane entity transmits the AS location notification, the method further comprises the control plane entity authenticating the AS controller. The authenticating the AS controller may comprise\ transmitting an authentication request to an authentication server function (AUSF) available on the network; and, receiving an authentication response from the AUSF indicating an authentication result in response to the authentication request.

In an implementation, the AS location notification comprises an AS relocation notification that changes an existing location of a PDU session.

In an implementation, wherein the AS location notification comprises an AS location notification that establishes a location of a future PDU session. The AS relocation notification may be transmitted to a session management function (SMF) to configure traffic steering for the data traffic to the relocated AS.

In an implementation, the AS location notification is transmitted to a Policy Control Function (PCF) to generate a User Plane (UP) selection policy and traffic steering policy for the data traffic.

In an implementation, a method is provided for managing protocol data unit (PDU) session data traffic exchanged with a User Equipment (UE) connected to a network, the method comprising a control plane entity available on the network: receiving a PDU session request from the UE; verifying the UE context and authorizing the session request based on user subscription data, and if authorized the method further comprises: selecting and setting up a user plane (UP) path for the requested PDU session; transmitting a PDU session request response to the UE.

In an implementation, the PDU session request includes a session ID.

In an implementation, the PDU session request includes a preferred SSC mode for the requested PDU session.

In an implementation, the PDU session request includes an application identifier indicating the PDU session request is dedicated to an application associated with the application identifier.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Within this application, the term IP address has been used in the exemplary embodiments. It should be understood that in different embodiments, different identifiers and addresses such as a hardware address, an IP address, a MAC address, or other address a may be used in place of the IP address where applicable.

Figure 1:
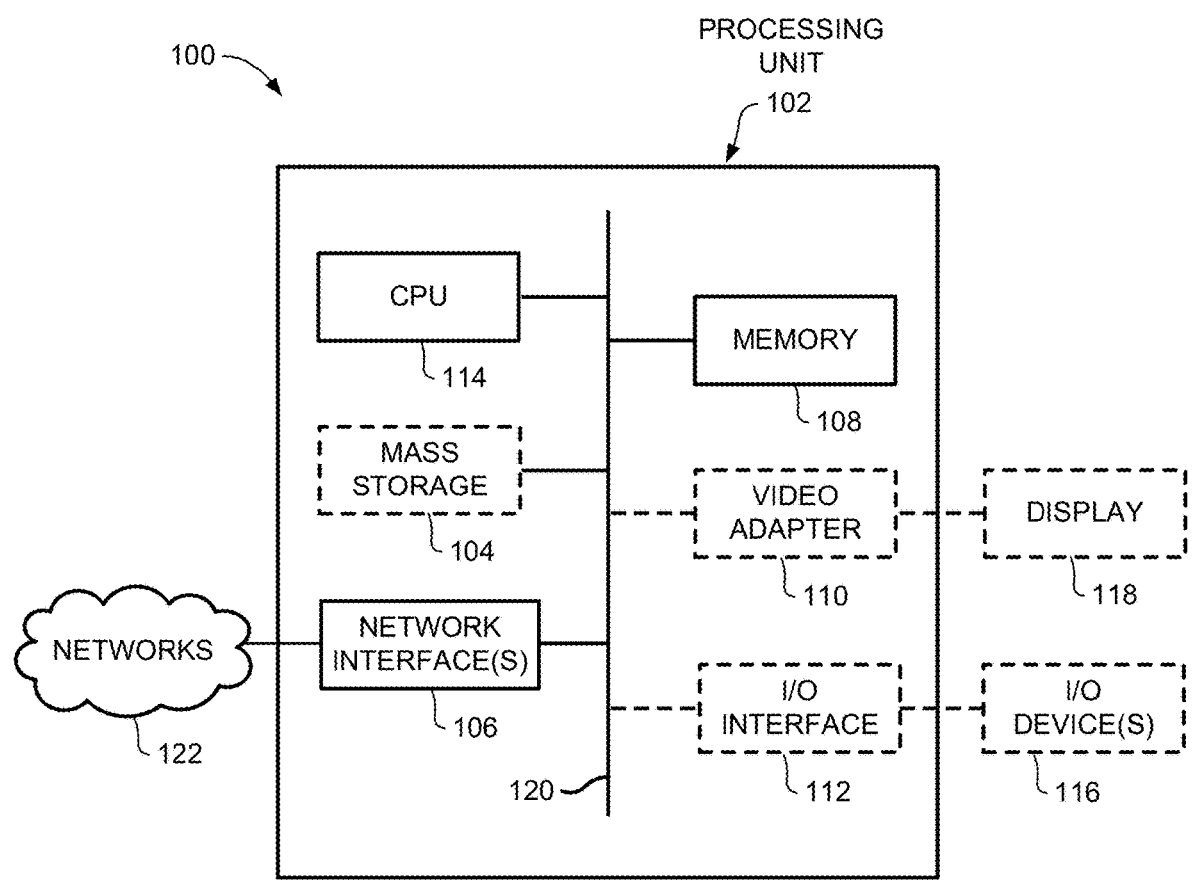
FIG. 1 is a block diagram of a computing system 100 that may be used for implementing devices and methods in accordance with representative embodiments of the present invention.

FIG. 1 is a block diagram of a computing system 100 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 100 includes a processing unit 102. Processing unit 102 may also be referred to as an Electronic Device (ED). In some embodiments, processing unit 102 may be a User Equipment (UE), while in other embodiments it may be a computing platform such as a computing server within a data center environment. The processing unit 102 typically includes a central processing unit (CPU) 114, a bus 120 and a memory 108, and may optionally also include a mass storage device 104, a video adapter 110, and an I/O interface 112 (shown in dashed lines). Those skilled in the art will appreciate that CPU 114 is representative of a processing capability. In some embodiments, in place of a conventional CPU, a specialized processing core may be provided. For example, a Graphic Processing Unit (GPU) or other so-called accelerated processors (or processing accelerators) may be provided in addition to or in place of the CPU.

The CPU 114 may comprise any type of electronic data processor. The memory 108 may comprise any type of non-transitory system memory such as static random access memory (SRAM), dynamic random access memory (DRAM), synchronous DRAM (SDRAM), read-only memory (ROM), or a combination thereof. In an embodiment, the memory 108 may include ROM for use at boot-up, and DRAM for program and data storage for use while executing programs. The bus 120 may be one or more of any type of several bus architectures including a memory bus or memory controller, a peripheral bus, or a video bus.

The mass storage 104 may comprise any type of non-transitory storage device configured to store data, programs, and other information and to make the data, programs, and other information accessible via the bus 120. The mass storage 104 may comprise, for example, one or more of a solid state drive, hard disk drive, a magnetic disk drive, or an optical disk drive.

The video adapter 110 and the I/O interface 112 provide optional interfaces to couple external input and output devices to the processing unit 102. Examples of input and output devices include a display 118 coupled to the video adapter 110 and an I/O device 116 such as a touch-screen coupled to the I/O interface 112. Other devices may be coupled to the processing unit 102, and additional or fewer interfaces may be utilized. For example, a serial interface such as Universal Serial Bus (USB) (not shown) may be used to provide an interface for an external device.

The processing unit 102 may also include one or more network interfaces 106, which may comprise wired links, such as an Ethernet cable, and/or wireless links to access one or more networks 122. The network interfaces 106 allow the processing unit 102 to communicate with remote entities via the networks 122. For example, the network interfaces 106 may provide wireless communication via one or more transmitters/transmit antennas and one or more receivers/receive antennas. In an embodiment, the processing unit 102 is coupled to a local-area network or a wide-area network for data processing and communications with remote devices, such as other processing units, the Internet, or remote storage facilities.

Figure 2:
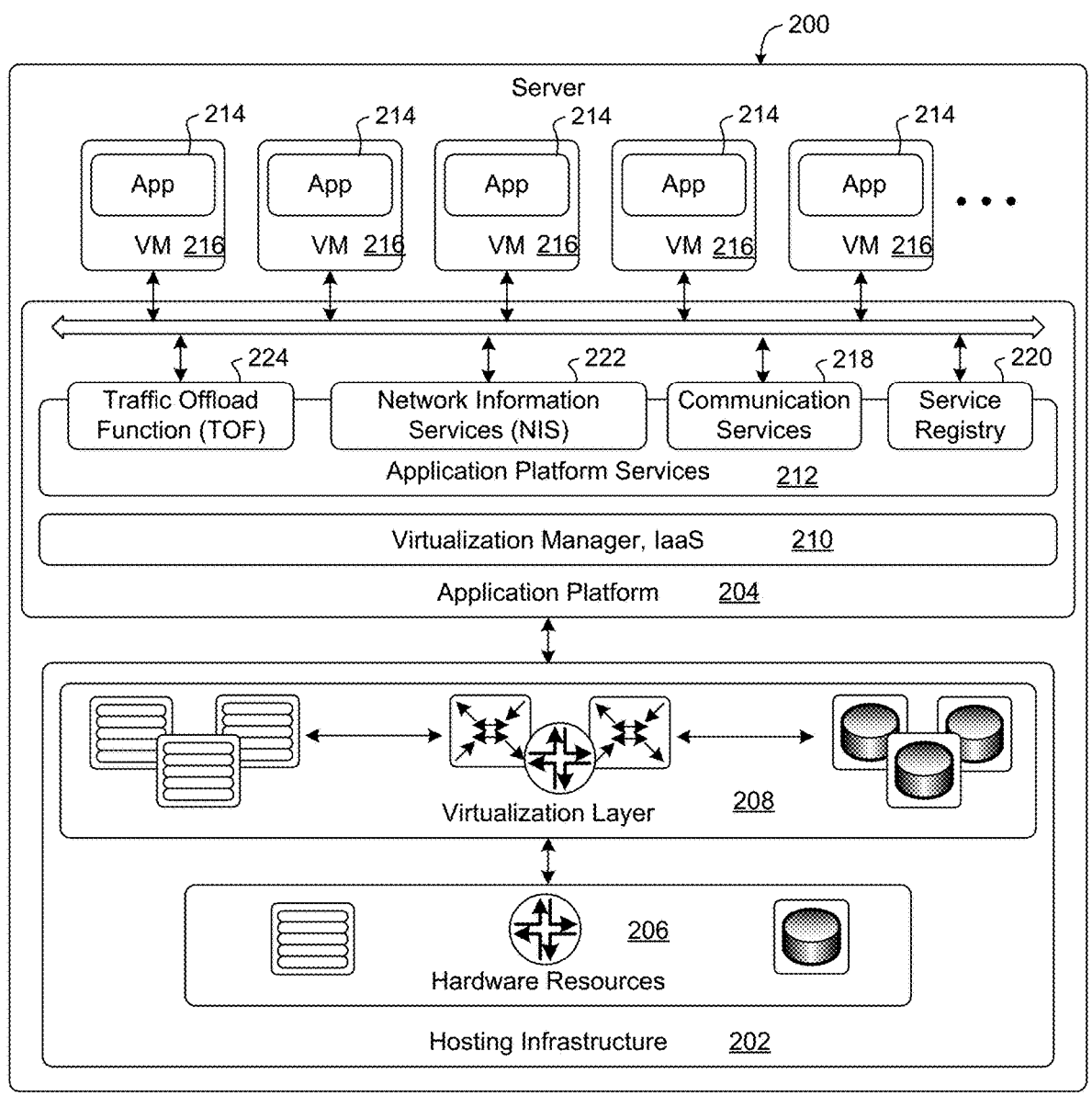
FIG. 2 is a block diagram schematically illustrating an architecture of a representative server usable in embodiments of the present invention.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2A shows a representative functional architecture of a server 200, it being understood that this functional architecture may be implemented using any suitable combination of hardware and software.

As maybe seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216, or as a virtualized container, that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANO and SONAC (and its various functions such as SDT, SDP, and SDRA) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A Service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside mobile network elements, and also facilitates leveraging of the available real-time network and radio information. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 224 in various ways, including: A Pass-through mode where (uplink and/or downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

Figure 3A:
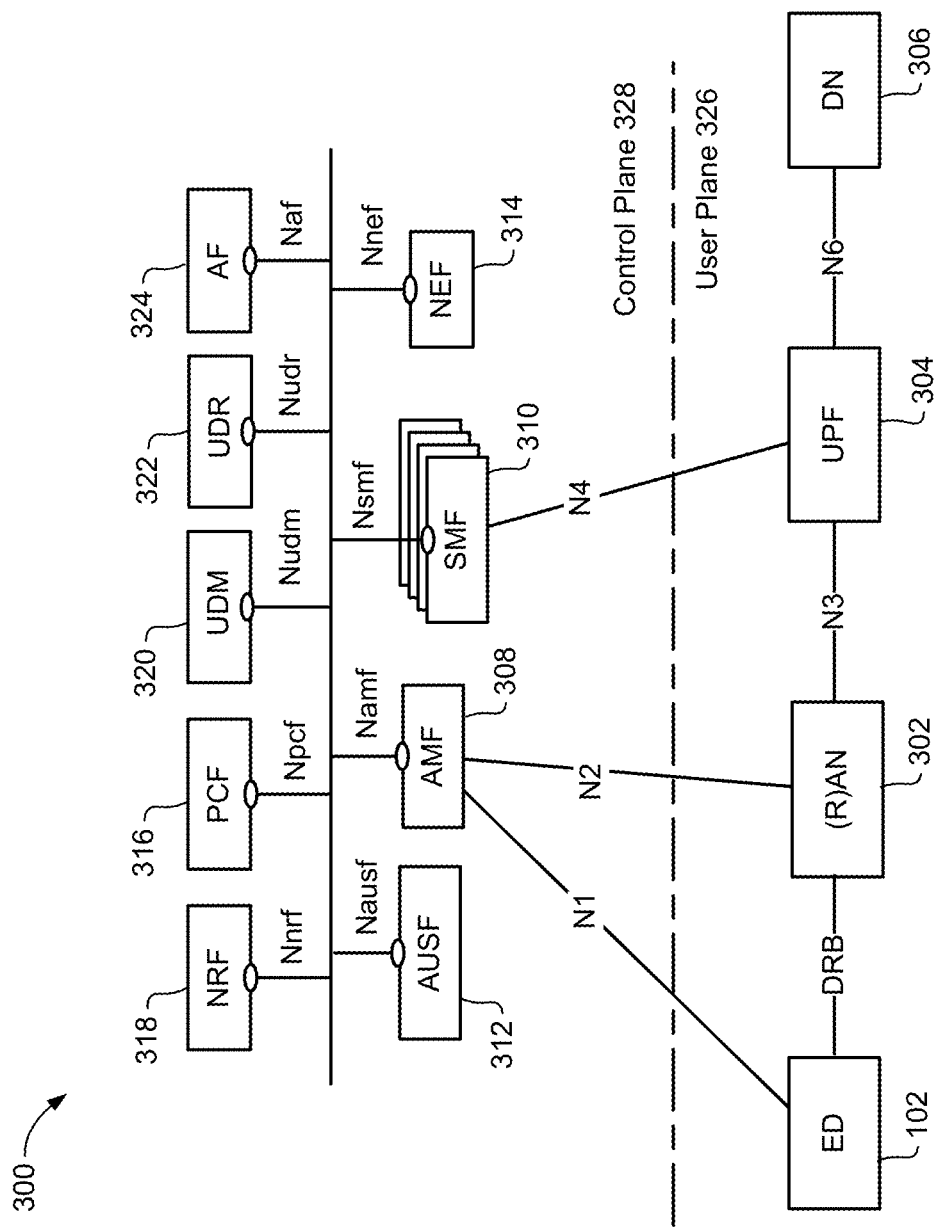
FIG. 3A is a block diagram illustrating a service-based view of a system architecture of a 5G Core Network.

FIG. 3A illustrates a service-based architecture 300 for a 5G or Next Generation Core Network (5GCN/NGCN/NCN). This illustration depicts logical connections between nodes and functions, and its illustrated connections should not be interpreted as direct physical connections. ED 102 forms a radio access network connection with a (Radio) Access Network ((R)AN) node 302 (which may, for example, be an gNodeB (gNB)), which is connected to a User Plane (UP) Function (UPF) 304 such as a UP Gateway over a network interface providing a defined interface such as an N3 interface. UPF 304 provides a logical connection to a Data Network (DN) 306 over a network interface such as an N6 interface. The radio access network connection between the ED 102 and the (R)AN node 302 may be referred to as a Data Radio Bearer (DRB).

DN 306 may be a data network used to provide an operator service, or it may be outside the scope of the standardization of the Third Generation Partnership Project (3GPP), such as the Internet, a network used to provide third party service, and in some embodiments DN 306 may represent an Edge Computing network or resource, such as a Mobile Edge Computing (MEC) network.

ED 102 also connects to the Access and Mobility Management Function (AMF) 308 through a logical N1 connection (although the physical path of the connection is not direct). The AMF 308 is responsible for authentication and authorization of access requests, as well as mobility management functions. The AMF 308 may perform other roles and functions as defined by the 3GPP Technical Specification (TS) 23.501. In a service based view, AMF 308 can communicate with other core network control plane functions through a service based interface denoted as Namf.

The Session Management Function (SMF) 310 is a network function that is responsible for the allocation and management of IP addresses that are assigned to an ED as well as the selection of a UPF 304 (or a particular instance of a UPF 304) for traffic associated with a particular session of ED 102. It will be appreciated that there will typically be multiple SMFs 310 in the network 300, each of which may be associated with a respective group of EDs 102, (R)AN nodes 302 or UPFs 304. The SMF 310 can communicate with other core network functions, in a service based view, through a service based interface denoted as Nsmf. The SMF 310 may also connect to a UPF 304 through a logical interface such as network interface N4.

The Authentication Server Function (AUSF) 312, provides authentication services to other network functions over a service based Nausf interface.

A Network Exposure Function (NEF) 314 can be deployed in the network to allow servers, functions and other entities such as those outside a trusted domain to have exposure to services and capabilities within the network. In one such example, an NEF 314 can act much like a proxy between an application server outside the illustrated network and network functions such as the Policy Control Function (PCF) 314, the SMF 310, the UDM 320, and the AMF 308, so that the external application server can provide information that may be of use in the setup of the parameters associated with a data session. The NEF 314 can communicate with other network functions through a service based Nnef network interface. The NEF 314 may also have an interface to non-3GPP functions.

A Network Repository Function (NRF) 318, provides network service discovery functionality. The NRF 318 may be specific to the Public Land Mobility Network (PLMN) or network operator, with which it is associated. The service discovery functionality can allow network functions and EDs connected to the network to determine where and how to access existing network functions, and may present the service based interface Nnrf.

PCF 314 communicates with other network functions over a service based Npcf interface, and can be used to provide policy and rules to other network functions, including those within the control plane. Enforcement and application of the policies and rules is not necessarily the responsibility of the PCF 314, and is instead typically the responsibility of the functions to which the PCF 314 transmits the policy. In one such example the PCF 314 may transmit policy associated with session management to the SMF 310. This may be used to allow for a unified policy framework with which network behavior can be governed.

A Unified Data Management Function (UDM) 320 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 320 may employ an interface, such as Nudr to connect to a User Data Repository (UDR) 322. The PCF 314 may be associated with the UDM 320 because it may be involved with requesting and providing subscription policy information to the UDR, but it should be understood that typically the PCF 314 and the UDM 320 are independent functions.

The PCF 314 may have a direct interface to the UDR 322 or can use Nudr interface to connection with UDR 322. The UDM 320 can receive requests to retrieve content stored in the UDR 322, or requests to store content in the UDR 322. The UDM 320 is typically responsible for functionality such as the processing of credentials, location management and subscription management. The UDR 322 may also support any or all of Authentication Credential Processing, User Identification handling, Access Authorization, Registration/Mobility management, subscription management, and Short Message Service (SMS) management. The UDR 322 is typically responsible for storing data provided by the UDM 320. The stored data is typically associated with policy profile information (which may be provided by PCF 314) that governs the access rights to the stored data. In some embodiments, the UDR 322 may store policy data, as well as user subscription data which may include any or all of subscription identifiers, security credentials, access and mobility related subscription data and session related data.

The Application Function (AF) 324 represents the non-data plane (also referred to as the non-user plane) functionality of an application deployed within a network operator domain and within a 3GPP compliant network. The AF 324 interacts with other core network functions through a service based Naf interface, and may access network capability exposure information, as well as provide application information for use in decisions such as traffic routing. The AF 324 can also interact with functions such as the PCF 314 to provide application specific input into policy and policy enforcement decisions. It should be understood that in many situations the AF 324 does not provide network services to other NFs, and instead is often viewed as a consumer or user of services provided by other NFs. An application outside the 3GPP network, can perform many of the same functions as AF 324 through the use of NEF 314.

The ED 102 communicates with network functions that are in the User Plane (UP) 326, and the Control Plane (CP) 328. The UPF 304 is a part of the CN UP 326 (DN 306 being outside the 5GCN). (R)AN node 302 may be considered as a part of a User Plane, but because it is not strictly a part of the CN, it is not considered to be a part of the CN UP 326. AMF 308, SMF 310, AUSF 312, NEF 314, NRF 318, PCF 314, and UDM 320 are functions that reside within the CN CP 328, and are often referred to as Control Plane Functions. AF 324 may communicate with other functions within CN CP 328 (either directly or indirectly through the NEF 314), but is typically not considered to be a part of the CN CP 328.

Those skilled in the art will appreciate that there may be a plurality of UPFs connected in series between the (R)AN node 302 and the DN 306, and multiple data sessions to different DNs can be accommodated through the use of multiple UPFs in parallel.

Figure 3B:
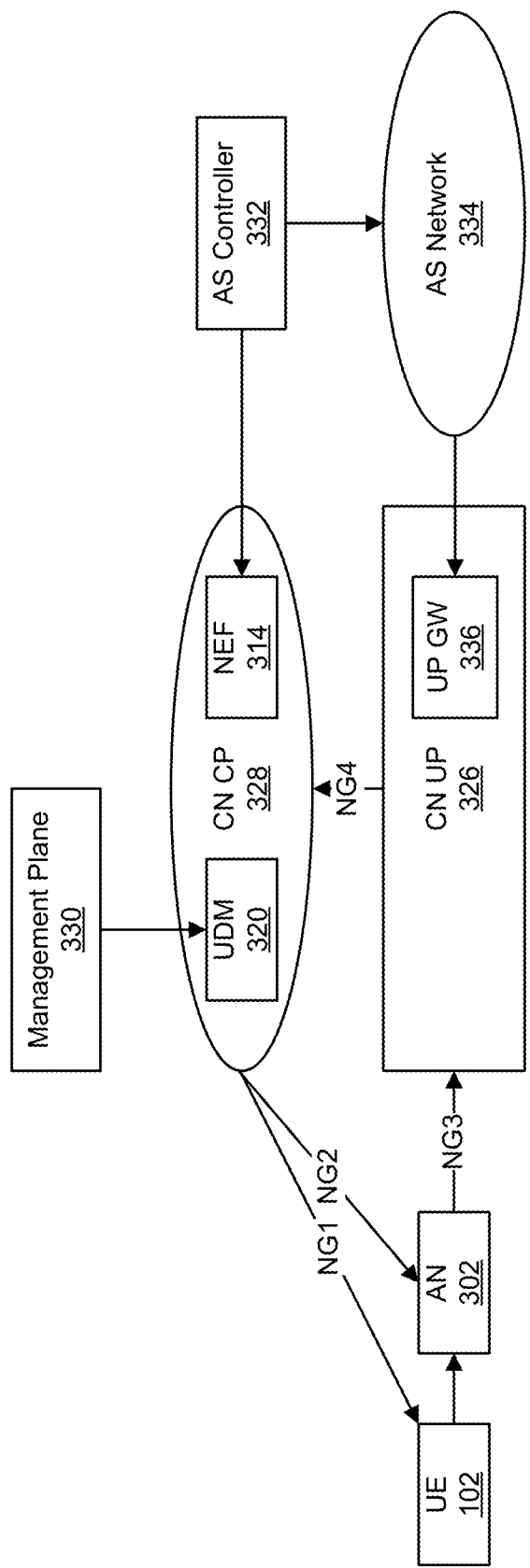
FIG. 3B illustrates an embodiment of an Application System controller responsible for locating, relocating, selecting, or reselecting an AS within an AS network.

FIG. 3B illustrates a portion of the wireless communication network 300 in which UE 102 is connected to the Core Network (CN) Control Plane (CP) 328 and to the CN User Plane (UP) 326 via Access Node (AN) 302. CN CP 328 includes Unified Data Management (UDM) function 320, which communicates with the Management Plane 330.

An Application System (AS) controller 332 is responsible for locating, relocating, selecting, or reselecting an AS within an AS network 334. The AS controller 332 is connected to the CN CP 328 through the Network Exposure Function (NEF) 314.

The CN CP 328 is operative to manage the logical location of resources within the 3GPP domain. An Application Server, or Application System of the AS network 334 is managed by the AS controller 332. The traffic steering capability, or interconnection quality (e.g. measured by throughput, delay, loading such as PDU sessions), between the CN UP 326 and the AS is provided to the CN CP 328 by network functions within the management plane 330 and information associated with these capabilities and connection quality parameters can be stored in the UDM 320. The traffic steering capability information may be used by the CP 328 to establish an efficient end-to-end path between communicating parties.

The CN CP 328 communicates with a connected UE 102 through an interface NG1, and to the AN 302 that provides connectivity through interface NG2. The AN 302 communicates with the CN UP 326 through interface NG3. The CN UP 326 is controlled by the CN CP 328 through interface NG4. The interfaces NG1, NG2, NG3, and NG4 are described in more detail, and are defined by the 3GPP mobile broadband standards. Those skilled in the art will appreciate that variations to the specific definition of these interfaces can be made without departing from the invention disclosed herein. Specific terms of definition of these interfaces can be found in publicly accessible documents (see, for instance, www.3gpp.org for historical and current standard documents).

The CN CP 328 is responsible for configuring traffic steering at the User Plane (UP) Gateway (GW) 336 for routing UpLink (UL) application traffic to the proper AS location, possibly taking into account possible intrasession AS (re)location.

The AS network 334 is responsible for steering Down-Link (DL) application traffic to the proper UP GW 336 possibly taking into account possible intrasession UP (re)selection.

The traffic steering conducted by the AS network 334 may be configured by the AS controller 332. In some embodiments, the traffic steering conducted by the AS network 334 may be configured by, or realized through, upper level mobility management mechanisms within the AS network 334 itself. In the example of FIG. 3B, the line connecting the UP GW 336 to the AS network 334 indicates a linkage connecting the CN UP 326 to the AS network 334 which is realized through traffic steering. The following signalling diagrams in this application describe implementations which are focussed on the interaction between the CN UP 326 and the AS network 334 to enable application aware PDU session management for application traffic using an efficient end-to-end path.

The network architecture illustrated in FIG. 3B, provides the interface that may be necessary to enable interaction between the CP 328 (or nodes and functions within the CP) and the AS controller 332. This interface can be used to enable application aware PDU session management for the application traffic that requires efficient end-to-end pathing.

In broad terms embodiments of the present invention provide methods by which User Plane (UP) management information can be exchanged between an Application Function (AF) supporting one or more applications and a Session Management Function (SMF). The AF is typically a function outside a 3GPP-compliant network (in some examples this may be a server or set of servers providing a service to UEs connected to the 3GPP compliant network, while in other examples the AF may be a function instantiated within a Mobile Edge Computing environment outside the 3GPP compliant Core Network or outside a 3GPP compliant RAN). In some embodiments, the AF is referred to as an AS controller. An AF may be a function outside the scope of a 3GPP standard. An AF may be instantiated on an Application Server outside the 3GPP core network, and may operate as a controller responsible for functions such as AS (re)location (or, AS (re)selection) within the local DN.

The SMF is a 3GPP compliant network function, typically within a Control Plane (CP), configured to manage traffic flows which are typically within a given slice of the network. In simple terms, the exchange of UP management information associated with a particular traffic flow may be initiated from either the AF associated with the traffic flow or the SMF. In the case of AF-initiated information exchange, the UP management information provided by the AF may comprise traffic requirements of applications supported by the AF. In the case of SMF-initiated information exchange, the UP management information provided by the SMF may comprise operator policy information or events, and the AF may respond with information of traffic requirements of applications supported by the AF. In some embodiments, other network entities may trigger this process by transmitting a message to the SMF, and the SMF may initiate the process in response to receipt of such a request.

An Application Function may send requests to influence SMF routing decisions for traffic of PDU sessions. The AF requests may influence UPF (re)selection and allow routeing user traffic to a local access to a Data Network (identified by a Data Network Access Identifier (DNAI)).

The Application Function issuing such requests is assumed to belong to the PLMN serving the UE. The Application Function may issue requests on behalf of applications not owned by the PLMN serving the UE.

If the operator does not allow an Application Function to access the network directly, the Application Function shall use the NEF to interact with the 5GC. This operation may follow provisions of relevant technical standards, such as, for example, clause 6.2.10 of 3GPP Technical Standard TS 23.501 V0.3.1 (March 2017). In embodiments where the AF does not access the network directly, a NEF may be provided to provide an interface to allow the AF to access the CP functions of the network. While a trusted AF may be provided the ability to interact with CN CP functions, it is likely that there will be too many functions in some networks to provide access to CP functions to each of them. Instead, the NEF may serve as a proxy for AFs outside the CN to exchange information with CP functions. Through the use of an NEF, an AF can be provided with a pathway to communicate with a CP function, but may not directly know the address or network name of the function with which it is communicating.

The Application Function may be in charge of the (re)selection or relocation of the applications within the local DN. For this purpose, the AF may request to receive notifications about events related with PDU sessions.

In some embodiments, for an AF allowed to interact directly with the 5GC NFs, AF requests regarding on-going PDU sessions of individual UEs, may be sent to the PCF via N5. In some embodiments, the AF requests may be sent via the NEF. Requests that target multiple UE(s) may be sent via the NEF and may target multiple PCF(s). The PCF can then transform the AF requests into policies that apply to PDU sessions. Those skilled in the art will appreciate that the transformation of an AF request into policy may be achieved in a number of different ways including the generation of a policy that can be transmitted by the PCF to a UPF or a set of UPFs that governs the handling of traffic associated with identified flows within a session, the generation of the policy being performed in accordance with the received AF request. When the AF has subscribed to SMF notifications, such notifications may be sent to the AF directly or via the NEF. The PCF may also subscribe to such notifications.

Such AF requests may contain at least:

Information to identify the traffic to be routed. The traffic can be identified in the AF request by:

Either a Data Network Number (DNN) or other sort of DN identifier and possibly slicing information (e.g. Single Network Slice Selection Assistance Information (S-NSSAI) or an AF-Service-Identifier.

When the AF provides an AF-Service-Identifier i.e. an identifier of the service on behalf of which the AF is issuing the request, a 5G Core Network Function (e.g. the NEF or PCF) may map this identifier into a target DNN and slicing information (S-NSSAI)

When the NEF processes the AF request the AF-Service-Identifier may be used to authorize the AF request.

an application identifier or traffic filtering information (e.g. an IP address 5-tuple). The application identifier refers to an application handling UP traffic and may be used by the UPF to detect the traffic of the application. The AF may also associate Packet Filter Descriptions (PFDs) with the application identifier, but this association may be done via a separate request.

Information about the N6 traffic routing requirements for traffic identified by the information above. It should be understood that N6 refers to the interface between a UPF and a DN external to the CN. This information about the traffic routing requirements may be provided in the form of a list of routing profile ID(s) that each corresponds to a single host location of the application in the local DN, when applications are instantiated statically (i.e. the routing profile IDs each correspond to a DNAI). When the DNAI(s) where applications are instantiated may vary dynamically then, this may be provided in the form of a list of DNAIs and associated N6 routing information. Based on the information about the N6 traffic routing requirements, which in some embodiments may comprise the routing profile IDs, the PCF determines a list of traffic steering profiles ID(s) that each corresponds to a steering behaviour which is preconfigured on the SMF or UPF. The PCF transmits the traffic steering policy ID(s) to the SMF. The traffic steering policy ID(s) are related to the mechanism enabling traffic steering to the DN. If the AF interacts with the PCF via the NEF, it may indicate the DNN and/or the host location(s), in the form of address(es) or name(s), of the application, and the NEF may map the information to routing profile ID(s). In an embodiment, the SMF is operative to receive the traffic steering policy ID(s) and to determine which of the traffic steering policy ID(s), and the corresponding traffic steering behaviors, should be applied. The SMF passes the selected traffic steering policy ID(s) to the UPF. In an embodiment, the UPF is operative to identify corresponding traffic steering parameters that are pre-configured and are associated with the selected traffic steering policy ID(s). The UPF is further operative to apply the corresponding traffic steering parameters when handling data traffic.

The N6 traffic routing requirements are related to the mechanism enabling traffic steering in the local access to the DN. They are expected to correspond to local rules configured in the UPFs in order to support traffic steering. The routing profile IDs may refer to a pre-agreed policy between the AF and the 5GC, or in an alternate embodiment they may simply refer to a predefined routing requirement. This policy may refer to different steering policy ID(s) sent to the SMF. In some implementations, the policies may be based on other conditions, such as temporal conditions (e.g. based on time of the day, etc.)

Potential locations of the applications towards which the traffic routing should apply. The potential location of an application is, or may be, expressed as a list of DNAI(s). In some embodiments, when the AF interacts with the PCF via the NEF, the AF may provide the PCF or NEF with a list of host address(es) or host name(s) of the applications, which is translated to a list of DNAI(s) by the NEF. In some embodiments, when the AF interacts with the PCF via the NEF, the NEF may map the AF-Service-Identifier information provided by the AF to a list of DNAI(s). In either case, the DNAIs may, for example, be used for UPF (re)selection.

AF requests may also contain:

Information on the UE(s) for which traffic is to be routed. This may correspond to Individual UEs identified using either an External Identifier such as those defined in TS23.682, or a MSISDN as described in TS23.003, or an IP address/Prefix, or may correspond to a group of UEs identified by a Group Identifier, e.g. an External Group Identifier such as those defined in TS23.682, or any UE that the request applies to that is accessing a combination of DNN, S-NSSAI, and DNAI(s), as may be identified by an indicator. In a case or an embodiment in which the PDU type is IP, when the AF provides an IP address/Prefix of a UE this allows the PCF to identify the PDU-CAN session for which this request applies, and the AF request applies only to the current PDU-CAN session of that UE. In this case, additional information such as the UE identity may also be provided to help the PCF to identify the correct PDU-CAN session.

Otherwise the request may apply to any future PDU session that matches the parameters in the AF request.

When the AF request targets any UE or a group of UE, the AF request is likely to influence multiple PDU sessions possibly served by multiple SMFs and PCFs.

When the AF request targets a group of UEs it provides one or several Group Identifiers in its request. In some embodiments members of the group have the group information in their subscription (i.e. a Group Identifier) stored in the UDM. In an implementation, the group information may be retrieved by the SMF, for instance over N10 interface, and passed to the PCF, for instance over N7 interface, at PDU-CAN session setup. This implementation allows the Group Identifier to also be provided to the AMF, for instance over N8 interface. In some embodiments, the Group Identifier may be stored in the UDR (acting as a Subscription Profile Repository "SPR") as PCF non-standard data. In some embodiments a UE can belong to multiple groups.

Information on when the traffic routing is to apply (e.g., a temporal validity condition). Use of a temporal validity condition allows for an expiry time to be associated with the AF request, or allows for the condition to apply during defined time windows. These defined time windows can be repeating or one-off.

Information on where (spatial validity condition) the UE(s) are to be when the traffic routing applies. In an embodiment, this is provided in the form of geographic or topological identifiers such as RAN node identifiers, indicating the possible serving RAN nodes of the UE(s) when the traffic routing applies. If the AF interacts with the PCF via the NEF, it provides, or in some embodiments may provide, a list of geographic zone identifier(s), and the NEF maps the information to RAN node identifiers. In an embodiment, spatial validity conditions can be provided in the form of area(s) of interest. Area(s) of interest may include, for instance, a geographical area or as a topological area defining the area of interest with respect to a network topology. An area of interest may be specified using a spatial identifier such as a tracking area ID, (R)AN node ID, cell ID, etc. If the AF interacts with the PCF via the NEF, it may provide a list of geographic zone identifier(s) and the NEF can map the information to areas of interest based on pre-configured information. The pre-configuration may be done by a management plane function. The pre-configuration may include the mapping of zone ID→zone information/configuration→area of interest (or RAN node ID(s) or cell ID(s)).

Alternatively, in a separate procedure that happened previously, the AF may provide the information of mapping of Zone ID→zone info/configuration to the NEF, and the management plane function configures the NEF with information of RAN node or cell location information or pre-defined areas of interest information. The NEF can use the information provided by the AF and the information provided by the management plane (both are pre-configured information) to do the mapping.

AF subscription to following events.

Notifications about UP path management events: A change of DNAI for the UPF serving the UE at the time of the change of the UPF. The corresponding notification about a change from source DNAI to target DNAI sent by the SMF to the AF includes the Identity of the target DNAI and the address of the anchor UPF. In some embodiments, the notification may also include the IP address/prefix of the UE, the UE identity information (e.g. either an External Identifier or a MSISDN) and the N6 routing information related to the core network.

In some embodiments, the UE identify information and/or the N6 routing information related to the core network may not be required if the PDU session type is IP.

The subscription can be for early notification and/or late notification. In case of a subscription for early notification, the SMF sends the notification before executing the UPF (re)selection. In case of a subscription for late notification, the SMF sends the notification when the UPF (re)selection has completed.

An Application Function may send requests to influence SMF routing decisions, for event subscription or for both.

The PCF, based on information received from the AF, operator's policy, etc. authorizes the request received from the application function and determines the traffic steering policy. The traffic steering policy may indicate a list of suitable traffic steering profiles configured in SMF, and in some embodiments the traffic steering policy may include the N6 routing information, for example, in cases where the N6 routing information associated with the application is explicitly provided by the AF. A traffic steering profile may include the routing profile ID it supports and/or the corresponding Data Network Access Identifier (DNAI). The DNAIs are related to the information considered by SMF for UPF selection, e.g. for diverting (locally) some traffic matching traffic filters provided by the PCF.

The PCF acknowledges the request to the AF or to the NEF.

In the session establishment procedure, the UE may provide application identifiers in the session request, indicating that the PDU session is intended or dedicated for the application identified by the application identifier(s). When the DNN in the session request points to a local DN and when an application identifier is included in the session request, the SMF may initiate 3$^{rd}$ party authentication/authorization, as described in clause 5.6.6, TS23.501, to validate the application access.

Figure 28A:
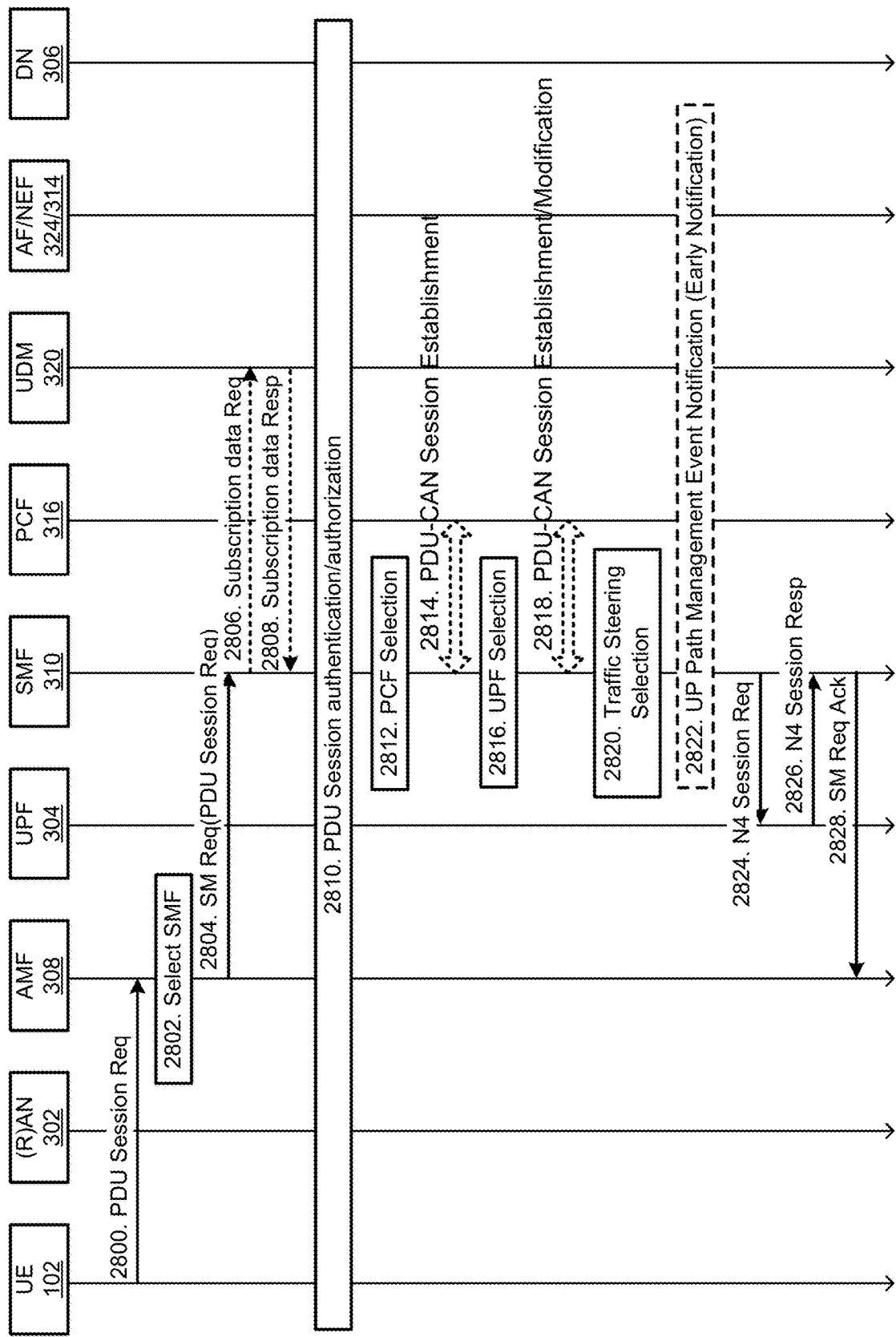
FIGS. 28A and 28B show a call flow diagram illustrating an alternative process for UP path management notification to an AF in accordance with an example embodiment of the present invention.

During the PDU session establishment procedure (an embodiment of which is shown in FIG. 28A), the SMF may obtain subscription group information (e.g. IMSI-Group Identifier) from the UDR via the UDM (e.g. steps 2806 and 2808). The SMF provides the application identifier (if available) and the subscription group the information to the PCF (e.g. step 2814 or 2818) for applying operator policy.

For PDU-CAN sessions that correspond to the AF request, the PCF provides the SMF with PCC rules that may contain application information (i.e. application identifier), and/or information about the DNAI(s) towards which the traffic routing should apply, and/or a list of traffic steering profile IDs, and/or spatial validity conditions, and/or information on AF subscription to SMF events. In embodiments where the N6 routing information associated to the application is explicitly provided in the AF request, the PCF may also provide the N6 routing information to the SMF as part of PCC rules. This is done by providing policies at PDU-CAN session set-up or by initiating a PDU-CAN Session Modification procedure. In some embodiments, the PCF periodically evaluates the temporal validity condition of the AF request and informs the SMF to activate or deactivate the corresponding PCC rules according to the evaluation result.

If the activated PCC rules contain spatial validity conditions, the SMF subscribes to receive UE mobility information from the AMF, associated with the UE entering or leaving the areas of interest specified in the spatial validity conditions. The SMF uses the UE mobility information and the spatial validity conditions to determine whether the PCC rules are valid for the application.

When the PCC rules are valid, the SMF may, based on local policies, take the information in the PCC rules into account to:

(re)select UPF(s) for PDU sessions. The SMF is responsible to handle the mapping between the UE location (TAI/Cell-Id) and DNAI(s) associated with UPF and applications. The SMF is responsible of the selection of the UPF(s) that serve a PDU session. This operation may follow provisions of relevant technical standards, such as, for example, clause 6.3.3 of 3GPP Technical Standard TS 23.501 V0.3.1 (March 2017)

activate mechanisms for traffic multi-homing or enforcement of an UL Classifier (UL CL). Such mechanisms may follow provisions of relevant technical standards, such as, for example, clause 5.3.5 of 3GPP Technical Standard TS 23.501 V0.3.1 (March 2017). This may include providing the UPF with traffic forwarding (e.g. break-out) rules and the associated N6 routing information if the N6 routing information is part of the PCC rules. A traffic forwarding rule may include an application identifier and a traffic steering policy ID. The application identifier refers to application traffic detection rules configured at the UPF. In an embodiment, an application header may be used to associate the application identifier with the application traffic detection rules.

inform the Application Function of the (re)selection of the UP path (e.g. change of DNAI and PDU session location).

The SMF may configure the UPF to report detection of application traffic. According to the configuration, upon application traffic detection the UPF notifies the SMF about the respective application identifier. The SMF may use the reported application identifier and other information to obtain PCC rules from the PCF to apply AF influence on traffic routing to the PDU session. Accordingly, the SMF may apply a configuration to the UPF to configure traffic handling policies based upon rules and configurations associated with the AF as identified by the reported application identifier. In some embodiments, the SMF may reselect a new UPF and configure the new UPF for handling the application traffic.

In some embodiments, when the UE provides an application identifier during the establishment of a PDU session, the SMF may be operative to transmit the application identifier to the DN. In some implementations, the SMF may be operative to transmit the application identifier to the authentication/authorization entity for the DN. A network node, entity, or function within the DN may be operative to perform application-specific authentication/authorization based on the received application identifier. In alternative embodiments, the application identifier is not provided by the SMF to network node, entity, or function within the DN as an input. Instead, the network node, entity, or function within the DN returns a list of application identifiers to the SMF. In this case the SMF must verify the application identifier provided by the UE against the application. These embodiments differ in that the application identifier is provided to the DN as an input to the authentication/authorization process. As a result, the authentication/authorization may be application-specific identifier list returned by the DN in order to provide application-specific authorization.

Figure 4:
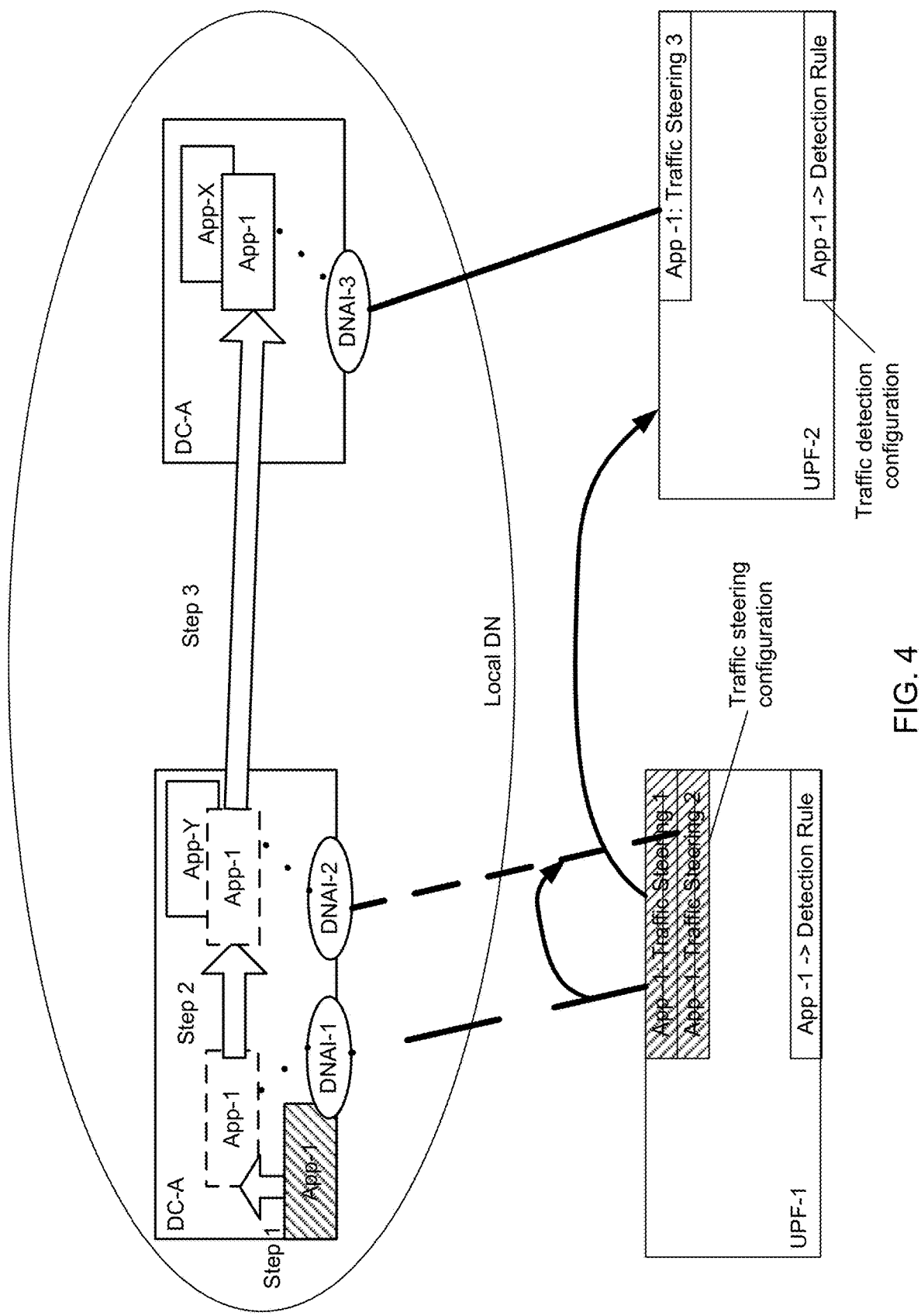
FIG. 4. is a block diagram schematically illustrating application relocation.

FIG. 4 illustrates a scenario of application relocation within a virtualized environment, where the application App-1 (e.g. an video streaming application) is relocated in three steps, for example, due to loading issues. The first step takes place within the DNAI-1 and is invisible to the 5GC. The 5GC reselects DNAI-2 (changing from the initial DNAI-1) in response to the relocation step 2, and then the 5GC reselects UPF-2 (changing from UPF-1) and DNAI-2 (changing from DNAI-2) with respect to the application relocation step 3. The third step happens across the Data Center-A and the Data Center-B. The moving of the application function to the second data center is an event that can trigger UPF reselection.

Two embodiments for triggering UPF/DNAI reselection are discussed below.

In a first embodiment, a DNAI is used without AF influence on traffic routing. In this case, AF influence on traffic routing (i.e. UPF reselection/traffic steering reconfiguration) may be realized after detection of application traffic at the UPF or in the DN. That is, the UPF or the AF may transmit a notification towards a control plane function indicating that a session contains data traffic associated with the application ("application traffic detection") by transmitting, for example, a traffic steering reselection request. In some embodiments, this may be performed by an AF transmitting a request or notification towards the SMF, optionally through interaction with the NEF. In other examples a UPF may transmit the request or notification in response to detection of traffic in a session with an application function within a DN accessed through the UPF. In response\ to receipt of the traffic steering reselection request, the control plane entity can either request or invoke a traffic steering reselection process (sometimes referred to as "triggering" traffic steering reselection). In some embodiments, the AF may further transmit a UPF reselection request to the control plane entity of the control plane to reselect the UPF (sometimes referred to as "triggering" UPF reselection). End-to-end path efficiency is thus applied to only portion of the traffic associated with the PDU session.

In a second embodiment, DNAI is used with AF influence on traffic routing. In this embodiment, the UE provides an application identifier to the SMF as a part of the session request. This application identifier may be associated with a PDU session identifier, indicating that the PDU session is intended for or dedicated to traffic associated with the application. This identifier may be used to indicate to functions in the UP path that particular traffic handling policies or rules, or a particular traffic routing policy should be applied. This allows a UPF function to be configured by a control plane function by sending a traffic handling policy indicating how any or all traffic flows with a particular identifier should be handled For example, a traffic routing policy may be defined that ensures that data traffic associated with the PDU session is routed through a defined path through the CN towards, or away from, the DN associated with the application.

End-to-end path efficiency may therefore offered to the application traffic from the very beginning of the relocation process. In some embodiments, if the UE uses the same PDU session for both the identified application and another application, the UP path may be not be optimally efficient for the other application. In these cases improved path efficiency can be achieved after detection of the application traffic associated with the other application. In some such embodiments, the UPF or the AF, may determine that the session contains traffic associated with another application (or application function) and a control plane function (such as the SMF) may be notified of the detected application traffic to trigger the control plane function to reselect traffic steering, as described in the first embodiment.

As an example, the second embodiment may be applied when the UE wants to access an application in a local DN that has strict requirement on end-to-end path efficiency. The first embodiment, for instance, may be applied in other scenarios (i.e. where the application's end-to-end path efficiency requirements fall below a pre-determined threshold).

When an application identifier is provided by the UE, the SMF may initiate 3rd party authentication/authorization for the use of the PDU session for the application. $3^{rd}$ party authentication/authorization may be useful as application-specific UP management can be applied to the PDU session in accordance with the application identifier. The $3^{rd}$ party authentication/authorization may avoid situations in which the information received from the UE (e.g. the application identifier) cannot be relied upon. For instance, a 3rd party authentication/authorization mechanism described in 5.6.6, TS23.501 uses the user plane for information exchange or communication between the SMF and the 3rd party authentication/authorization function. In an embodiment, the present application proposes to extend the mechanism to allow 3rd party authentication/authorization to be carried out via the NEF (which may allow for the $3^{rd}$ party authentication/authorization, to be carried out in an extended control plane). By allowing access through the NEF, depending upon the level of access provided, the 3rd party authentication/authorization function may be able to perform equivalent functions to an AF. This embodiment provides additional functionality to support cases where the 3rd party authentication/authorization function is not located in the DN. In an implementation, the NEF provides the interface and functionality to provide the $3^{rd}$ party authentication/authorization function with the capability to act as an AF.

At the establishment of a PDU Session to a DN:
   In some embodiments, the UE may be authenticated/authorized by a third party, which may be located in the DN, e.g. a DN-AAA server.

If the UE provides authentication/authorization information during the establishment of the PDU session, and the SMF determines that third-party authentication/authorization of the PDU session establishment is required based on the DN policy or local configuration, the SMF passes the authentication/authorization information of the UE to the third party. In an embodiment, if the third party is located in the DN, the information can be passed to the third party in the DN through the UPF. In an embodiment, if the third party is not in the DN, the information can be passed to the third party via the NEF. When the NEF is used, the third party can behave as an AF. If the SMF determines that third party authentication/authorization of the PDU session establishment is required but the UE has not provided authentication/authorization information, then the SMF may reject the PDU session establishment.

In an implementation, the third party may authenticate/authorize the PDU session establishment and return the authentication/authorization result to the SMF via the UPF. In an implementation, the third party may authenticate/authorize the PDU session establishment and return the authentication/authorization result to the SMF via the NEF.

If the UE provides to the SMF an application identifier during the establishment of the PDU session, the SMF can pass the application identifier to the third party. The third party may perform application-specific authentication/authorization according to the application identifier.

The SMF may determine whether to use the UPF or the NEF for third party authentication and/or authorization according to DN policy, local configuration, and/or the application identifier provided by the UE.

Such DN authentication and/or authorization takes place for the purpose of PDU session authorization in addition to:

The 5GC access authentication handled by AMF (In an embodiment the authentication may be performed according to the method described in clause 5.2 of TS 23.501).

The PDU session authorization with regard to subscription data retrieved from UDM enforced by SMF.

Based on local policies the SMF may initiate DN authentication and/or authorization as a part of the PDU session establishment.

If the UE provides an application identifier during the establishment of the PDU session and if the UPF is used for third-party authentication/authorization, the traffic steering at the UPF can be configured according to the application identifier. If the UE provides an application identifier during the establishment of the PDU session and if the NEF is used for third-party authentication/authorization, the SMF transmit the DNN, the S-NSSAI and the application identifier to the NEF, at which point the NEF can select the AF (e.g. the third-party authentication/authorization function) according to the information transmitted by the SMF (e.g. the received DNN, S-NSSAI, and the application identifier).

The UE may provide, over NAS, SM information required to support user authentication by the third party.

In some embodiments, when SMF adds an PDU session anchor (such as the PDU session anchor defined in clause 5.6.4 of TS 23.501) to a PDU session third-party authentication and/or authorization may not be carried out. In some embodiments, SMF policies may require the SMF to notify the third party when a new IP address has been added to or removed from a PDU session, or when an existing IP address associated with a session has been changed through the modification or replacement of a prefix.

An indication of PDU session establishment rejection can be transmitted by SMF to the UE via NAS SM.

In some embodiments, a third party may revoke the authorization for a PDU session. In some embodiments, the third party may revoke the authorization for a PDU session at any point in time.

Figure 5:
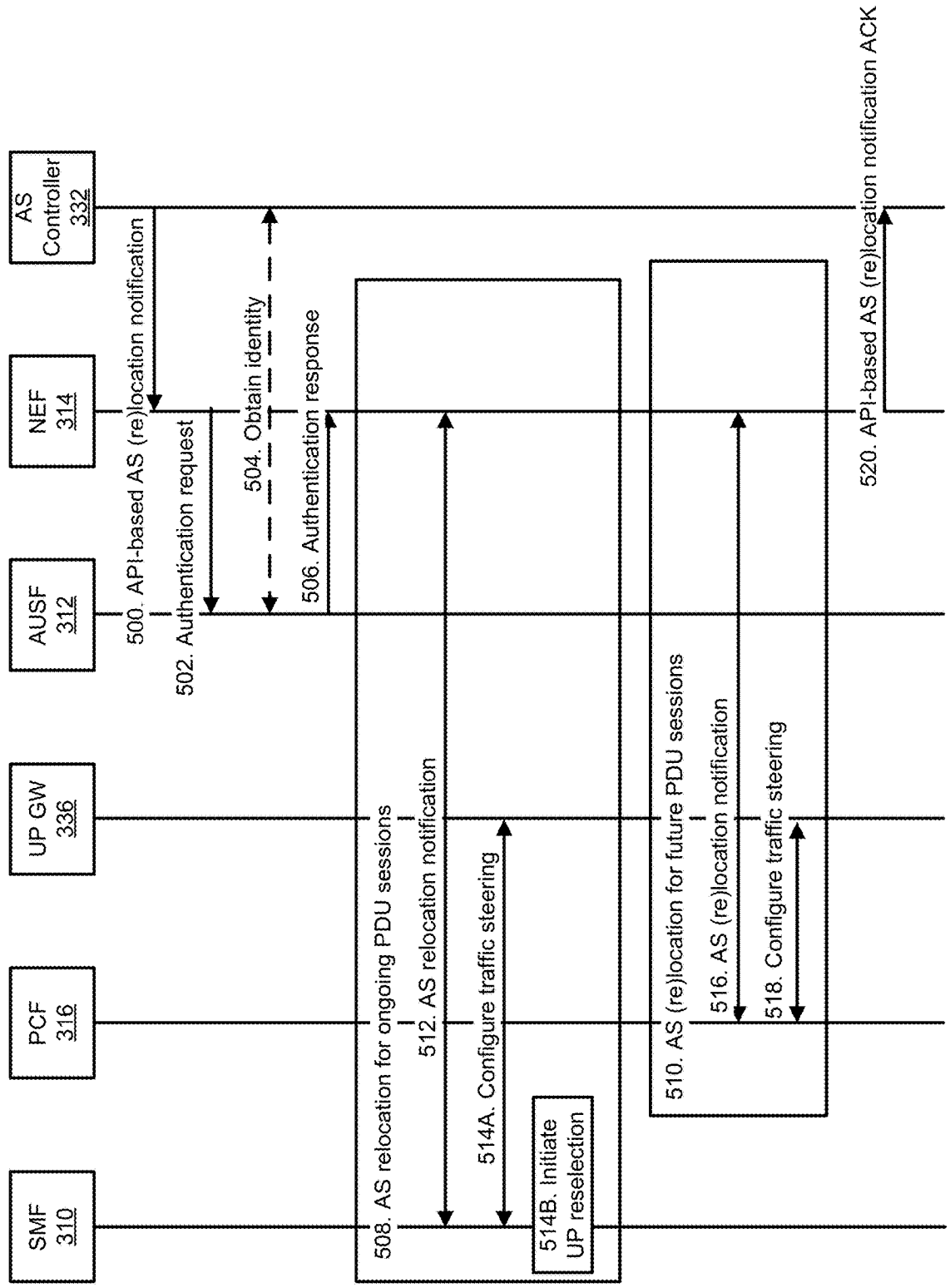
FIG. 5 presents a signalling diagram illustrating an embodiment of AS location or relocation notification.

Referring to FIG. 5, a signalling diagram is presented illustrating an embodiment of AS location or relocation notification.

In step 500 the NEF 314 receives an application program interface (API)-based AS location, or relocation, notification from the AS controller 332. In the figures the term (re)location refers to either a location notification or a relocation notification. The term (re)selection similarly refers to either selection, or reselection, as the case may be.

The notification may include the AS location(s) suitable for use in, and that may be to be taken in account during, UP selection, or reselection as the case may be. In the case of an AS relocation for an existing session, the notification may indicate the new AS location(s) to be used from this point forward. The notification may include some or all of the following features:

The AS location(s), which may be specified using network addresses such as IP address, MAC address, or some other type of known address identifying information.

A traffic steering indicator, which indicates whether the traffic steering from UP 326 to the AS should be configured by the CP or is handled by the AS network 334.

Time information indicating when the AS (re)location is applied. In one, non-limiting, embodiment, the time information is empty, which implies that the AS (re)location proceeds immediately.

UE location information indicating that the AS (re)location is applied when the UE 102 is present within the specified location (e.g., geographic location). In one, non-limiting, embodiment, the location information is empty, which implies that the AS (re)location proceeds without considering the UE location.

A traffic filter that indicates the traffic to which the AS (re)location may apply. The traffic may belong to ongoing PDU sessions (ongoing traffic) or future PDU sessions (future traffic). The traffic filter includes an application indicator, which indicates the application to which the traffic is associated, and a UE indicator, which identifies the UE 5 to which the traffic is associated.

The UE indicator may be the IP address associated with the traffic. In this case, the traffic is ongoing traffic, and the AS controller 332 learns the IP address from the AS. The UE indicator may also be a UE ID that is allocated by the CP 328 and exposed to the AS controller 332 through the NEF 314. In this case, the traffic may include both ongoing traffic and future traffic.

Optionally, the UE indicator indicates more than one UE 102. Furthermore, the traffic filter may not include any UE indicator, which implies that the AS (re)location applies to traffic of any (i.e. all) UE 102 that meets the criteria defined by the traffic filter.

In an implementation, the received location information may comprise a geographic location. The NEF 314 may be operative to convert the received geographic location into a location associated with the network topology, such as a corresponding cell ID, and to forward to the SMF 310 or the PCF 314 the cell ID as the UE location through the AS (re)location notification. In an implementation, the NEF 314 may be operative to forward the geographic location to the SMF 310 or the PCF 314 as the UE location.

Next, in step 502 the NEF 314 sends an authentication request to the Authentication Service Function (AUSF) 312 if the AS controller 332 is not located in the trusted domain. The authentication request may include the identity information of the AS controller 332 if the AS controller identity information is provided by the AS controller 332 in the API-based AS (re)location notification step 500.

In optional step 504 (shown with a dashed line), the AUSF 312 obtains the identity of the AS controller 332. Step 504 is performed if the authentication request in step 502 does not include the AS controller identity.

In step 506 the AUSF 314 authenticates the AS controller 332 and sends an authentication response to the NEF 314. The authentication response indicates the authentication result.

If the authentication is successful, the NEF 314 validates the notification and performs the next steps, which are determined based on whether the AS relocation applies to ongoing traffic or to future PDU sessions.

In an implementation, the procedure includes only one of procedure 508 (AS relocation for ongoing PDU sessions) and procedure 510 (AS (re)location for future PDU sessions). In one implementation, procedure 508 is not utilised, and procedure 510 is implemented for AS relocation made to ongoing PDU sessions, future PDU session, or a combination of both ongoing and future PDU sessions. In the case where procedure 510 is implemented for ongoing PDU sessions, the PCF 314 triggers the SMF 310 to perform UP reselection by transmitting a UP reselection trigger to the SMF 310 in order to reselect the corresponding UP for the ongoing PDU sessions. In an alternate implementation, procedure 510 is not employed, and only procedure 508 is used. In the alternate implementation, the SMF 310 is operative to perform AS relocation for future PDU sessions based upon receipt of an AS relocation notification sent, for instance, by the NEF 314.

In general, procedure 508 may be performed in the case of AS relocation for ongoing PDU sessions (i.e. ongoing data traffic). First, the NEF 314 identifies the PDU sessions associated with the traffic and the SMF 310 managing the identified PDU sessions, generates an AS relocation notification based on the API-based AS relocation notification, and in step 512 sends the AS relocation notification to the identified SMF 310. In an implementation, the NEF 314 may identify the SMF 310 by interacting with the Network Function Repository Function (NRF) 318.

After receiving the AS relocation notification, the SMF 310 can determine whether to perform UP reselection for the impacted traffic, according to the new AS location(s), operator policy, and Session and Service Continuity (SSC) mode of the PDU sessions.

In step 514A, if the SMF 10 determines UP reselection is not required, and if the AS relocation notification indicates the need of traffic steering configuration, the SMF 310 configures traffic steering by updating traffic steering at the UP GW 336. Alternatively, in step 514B, if the SMF 310 determines that UP reselection is required, the SMF 310 initiates the UP reselection procedure. The SMF 310 may further configure traffic steering at the re-selected UP GW 336 if necessary.

In general, procedure 510 is performed in the case of AS (re)location applying to future traffic. In step 516 the NEF 314 identifies the Policy Control Function (PCF) 314 that is responsible for operator policy for the future traffic, generates an AS (re)location notification based on the API-based AS (re)location request, and sends the AS (re)location notification to the PCF 314. The NEF 314 may identify the PCF 314 by interacting with the NRF 318. In optional step 518 the PCF 314 configures traffic steering with the UP GW 336. In an implementation, the configuration may be applied to all UP GWs 336 that may potentially be used to support the requested PDU session (currently, or in the future). In particular, based on the AS (re)location notification, subscription data, and current operator policies, the PCF 314 may generate UP selection policy and traffic steering policy for the traffic. In an implementation optional step 518 is not performed, as the traffic steering may be separately configured during UP (re)selection (i.e. steps 514 or 516).

In one embodiment, in which the AS (re)location notification indicates the possibility of AS relocation in the future, the PCF 314 may generate a session and service continuity (SSC) mode selection policy, such as, for example, any PDU session associated with the application should have an SSC mode not equal 1.

As would be readily appreciated by a worker skilled in the art, there are instances in which the AS (re)location can impact both ongoing traffic flows and future traffic flows. In such a case, both procedure 508 and procedure 510 may take place.

In step 520, NEF 314 sends an API-based AS (re)location notification acknowledgment back to the AS controller 332, either acknowledging acceptance of the AS (re)location notification, or rejecting the AS (re)location notification. In the case of a rejection, the message includes an error code indicating the reason for rejection. In an implementation, the response includes a transaction token identifying the AS (re)location notification. The transaction token can be used by the AS controller 332 to later update the AS (re)location notification without providing full detail and/or to request notification of UP (re)selection impacted by the AS (re)location notification.

Figure 6:
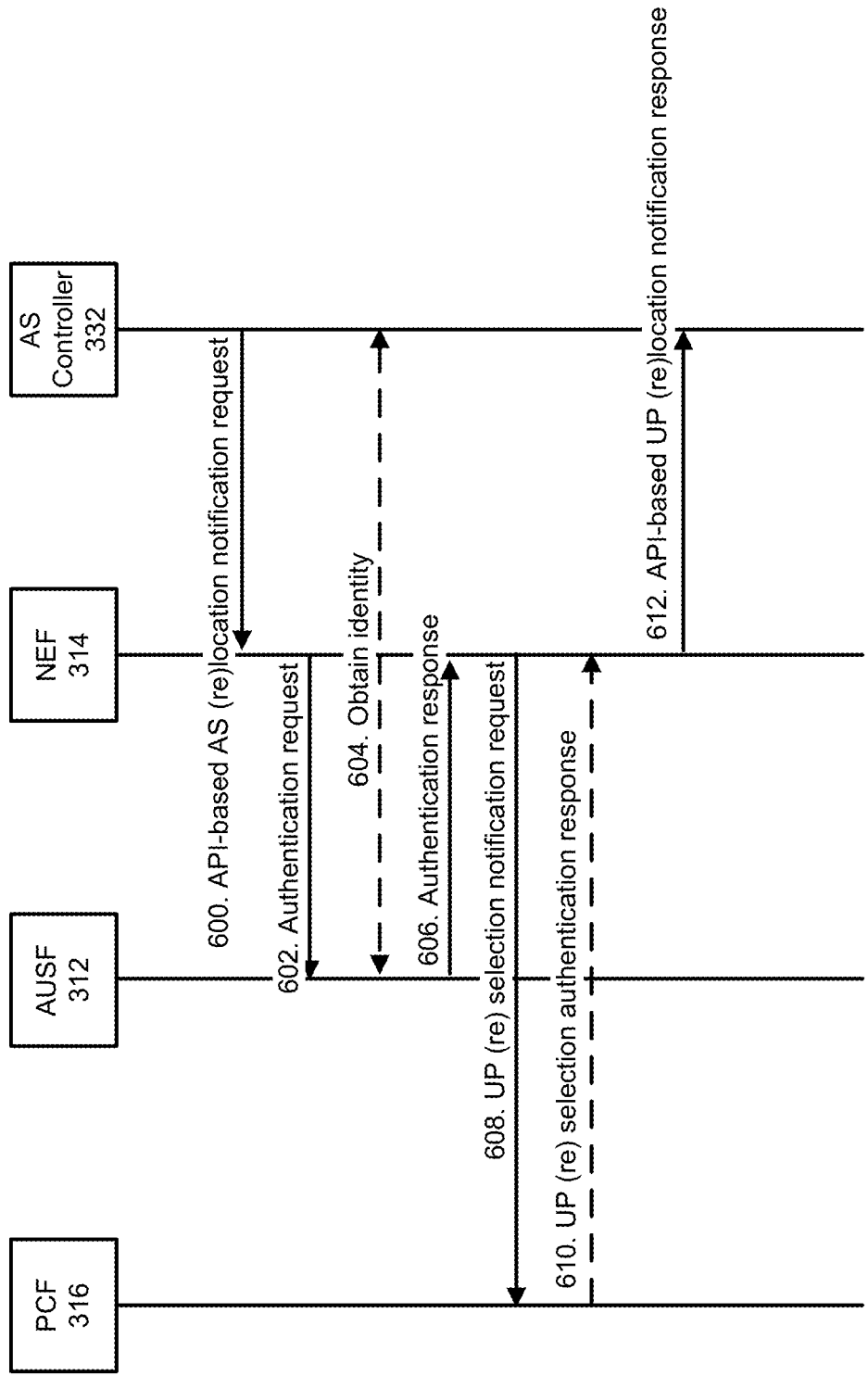
FIG. 6 presents a signalling diagram illustrating an embodiment of an UP (re)selection notification request procedure.

FIG. 6 illustrates an UP (re)selection notification request procedure. In step 600 the NEF 314 receives an API-based UP (re)selection notification request from the AS Controller 332. The API-based UP (re)selection notification request may include a transaction token from a previous AS (re)location notification procedure. The token may indicate that the current request corresponds to any UP (re)selection procedure impacted by that AS (re)location notification. Alternatively, the request may include some or all of the following information:

Time information, indicating when the notification request applies. The time information may be empty, indicating that the notification request proceeds immediately.

UE location information, indicating that the notification request applies when the UE 5 is present within the specified location (e.g., geographic location). The UE location information may be empty, implying the notification request proceeds without being concerned with UE location.

Traffic filter, indicating the data traffic to which the notification request may apply. The traffic may belong to ongoing PDU sessions (ongoing traffic) or future PDU sessions (future traffic). The traffic filter may also include an application indicator indicating a specific application associated with the data traffic.

The traffic filter optionally includes a UE indicator that indicates the UE 102 associated with the data traffic. The UE indicator may be an IP address associated with the data traffic. In this case, the data traffic is ongoing traffic, and the AS controller 332 learns the IP address from the AS. The UE indicator may also be a UE ID that is allocated by the CN CP 328 and exposed to the AS controller 332. In this case, the data traffic may include both ongoing traffic and future traffic. The UE indicator may indicate more than one UE 102. When the traffic filter does not include a UE indicator, it indicates that the notification request applies to data traffic of any UE 102 that meets the criteria defined by the traffic filter.

Following receipt of the API-based UP (re)selection notification request, in step 602 the NEF 314 sends an authentication request to the AUSF 312 if the AS controller 332 is not located in the trusted domain. The authentication request may include identifying information of the AS controller 332 if the information is provided by the AS controller 332 in the API-based UP (re)selection notification request.

In optional step 604, the AUSF 312 obtains the identity of the AS controller 332. This step is performed if the authentication request 602 does not include the identifying information of the AS controller 332.

In step 30406, the AUSF 312 authenticates the AS controller 332 and sends an authentication response to the NEF 314 indicating the authentication result.

It should be noted that each of the authentication request, obtaining identify, and the authentication response steps are optional if the API-based UP (re)selection notification request includes a transaction token.

In the step 608 the NEF 314 generates a UP (re)selection notification request based on the API-based UP (re)selection notification request and sends it to the PCF 314. The PCF 314 may validate the request and, if the request is valid, the PCF 314 may generate a UP (re)selection notification policy based on the received UP (re)selection notification request. In optional step 610 the PCF 314 may transmit a UP (re)selection authentication response to the NEF 314 indicating the validation result.

In step 612, the NEF 314 sends an API-based UP (re)location notification response back to the AS controller 332, either acknowledging acceptance of the AS (re)location notification, or rejecting the AS (re)location notification. In the case of a rejection, the message includes an error code indicating the reason for rejection. In an implementation, the response includes a transaction token identifying the AS (re)location notification. The transaction token can be used by the AS controller 332 to later update the AS (re)location notification without providing full detail and/or to request notification of UP (re)selection impacted by the AS (re)location notification.

Figure 7:
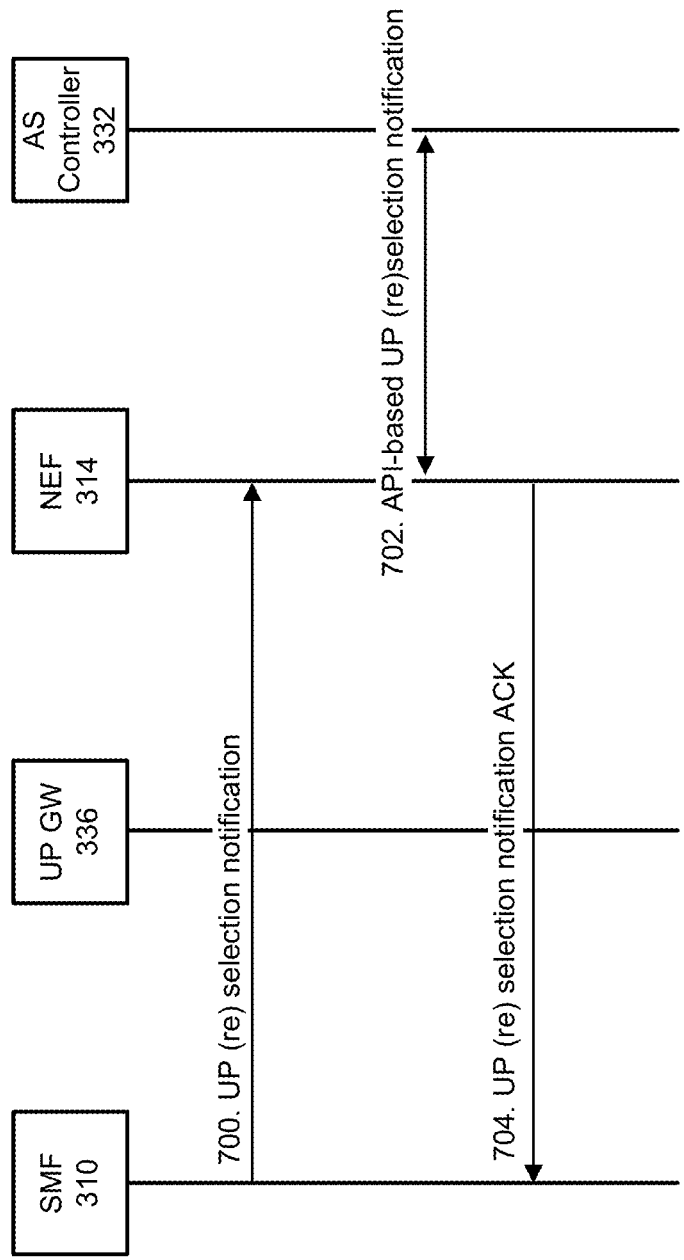
FIG. 7 presents a signalling diagram illustrating an embodiment of an UP (re)selection notification procedure.

FIG. 7 illustrates an UP (re)selection notification procedure. The SMF 310 initiates an UP (re)selection notification procedure if UP (re)selection notification is needed as a result of a UP (re)selection notification request procedure (for example, as described above), after performing UP (re)selection.

In step 700 the SMF 310 sends a UP (re)selection notification to the NEF 314. The UP (re)selection notification may include a transaction token of the corresponding UP (re)selection notification request, an indication of the AS location, and/or an indication of the location of UP GW 336. The location information may, for instance, be in the form of a network address.

In step 702 the NEF 314 generates an API-based UP (re)selection notification based on the UP (re)selection notification and transmits it to the AS controller 332. The AS controller 332 communicates to the NEF 314 an acknowledgement of receipt of the API-based UP (re)selection notification. Before sending the acknowledgement, the AS controller 332 may perform the necessary steps for the AS (re)location or AS state (re)location procedure, which may include releasing resources and data structures, configuring traffic steering, etc.

In step 704, the NEF 314 transmits a UP (re)selection notification acknowledgement to the SMF 310 confirming receipt of the API-based UP (re)selection notification acknowledgement received from the AS controller 332.

Figure 8:
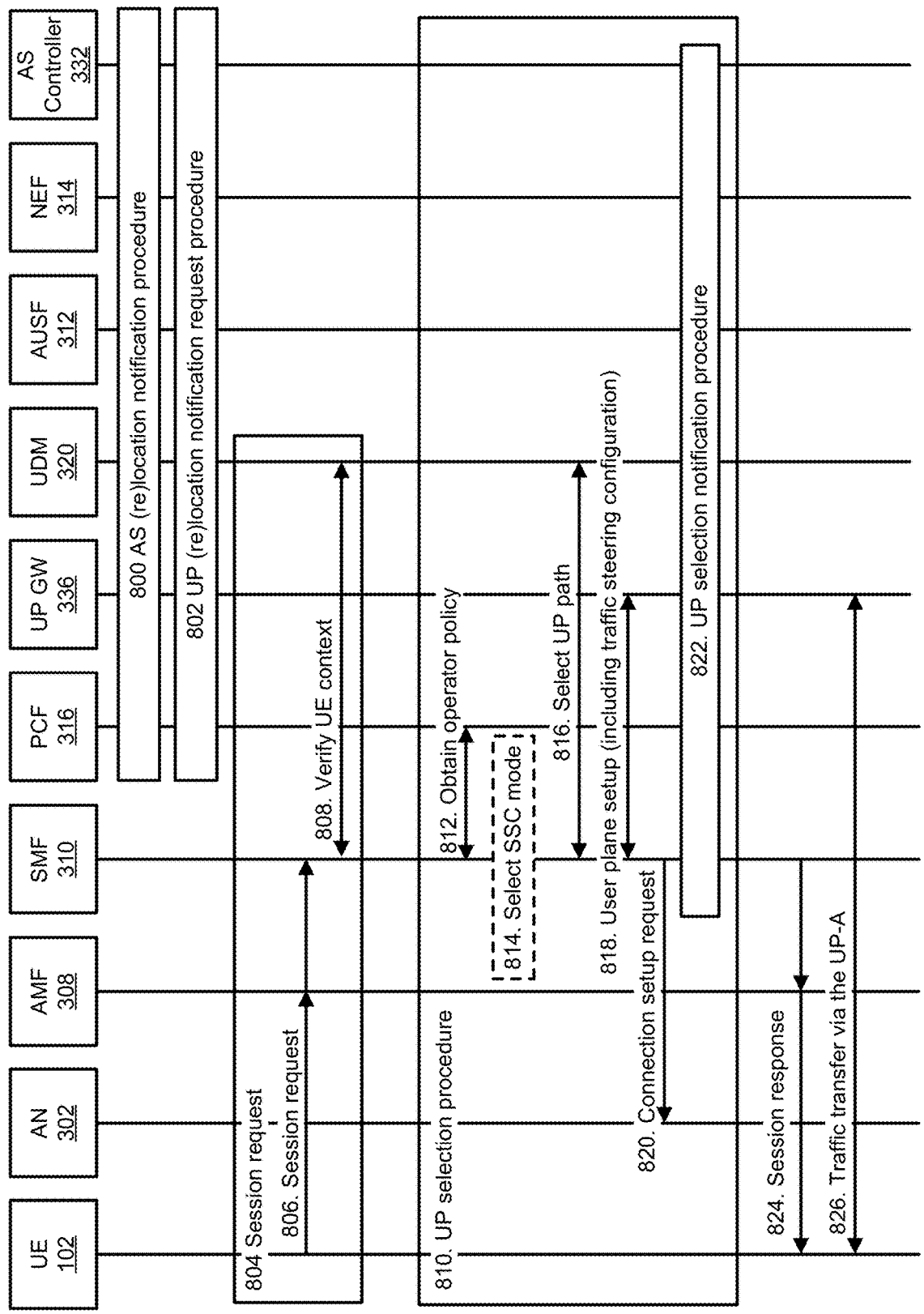
FIG. 8 presents a signalling diagram illustrating an embodiment of a procedure for an application-friendly PDU session establishment.

FIG. 8 illustrates a procedure for an application-friendly PDU session establishment. In step 800 the AS controller 332 initiates an AS (re)location notification procedure with the CP 328 for future traffic associated with the UE 102 and to a specified application that generates an application-aware UP selection policy and traffic steering policy.

In step 802 the AS controller 332 also initiates a UP (re)location notification request procedure with the CP 328 for the future traffic associated with the UE 102 and to the specified application that generates the application-aware UP selection policy and traffic steering policy.

In procedure 804, the UE 102 can initiate a session setup procedure when it has application traffic to transmit or receive from the application. In step 806 the UE 102 sends a session request to the SMF 310 via the Core Access and Mobility Management Function (AMF) 308. The session request may include the session ID and the preferred SSC mode (optional). The session request may also include an application identifier indicating it is a dedicated session request for the application. In step 808 the SMF 310 verifies the UE context with the UDM 320 and authorizes the session request according to the user subscription data.

If the session request is authorized, the SMF 310 initiates a UP selection procedure 810. In the first step 812, SMF 310 obtains operator policies from the PCF 314, including the application-friendly policies resulting from the AS (re)location notification procedure 800. In optional step 814, the SMF 310 selects an SSC mode for the PDU session according to the session request, the operator polices, the UE type, and other necessary information. For example, if the request includes the application identifier but no preferred SSC mode and if the operator polices indicate potential future AS relocation, the SMF 310 may set the SSC mode of the PDU session to 2 or 3 to allow UP reselection for efficient end-to-end pathing.

In step 816 the SMF 310 interacts with the UDM 320 to obtain the traffic steering capability between candidate UP GWs 336 and the AS locations and selects the UP path for the PDU session with respect to the operator policies based on the information provided by the UDM 320. In step 818 the SMF 310 triggers UP setup and, if the operator policies indicate the need of traffic steering configuration, configures traffic steering at the UP GW 336.

In step 820, SMF 310 transmits a connection setup request to the AN 302 to connect to the UP 326. At this step, the AN 302 may allocate RAN resources for the PDU session.

If the operator polices indicate the need of UP (re)selection notification, in step 822 the SMF 310 notifies the AS controller 332 about the UP selection through a UP selection notification procedure.

In step 824 the SMF 310 transmits a PDU session request response to the UE 102 via the AMF 308. The response includes the SSC mode selected for the PDU session, if the UE 102 did not provide preferred SSC mode in the session request. In step 826 traffic transfer occurs from UE 102 via the UP GW 336.

Figure 9:
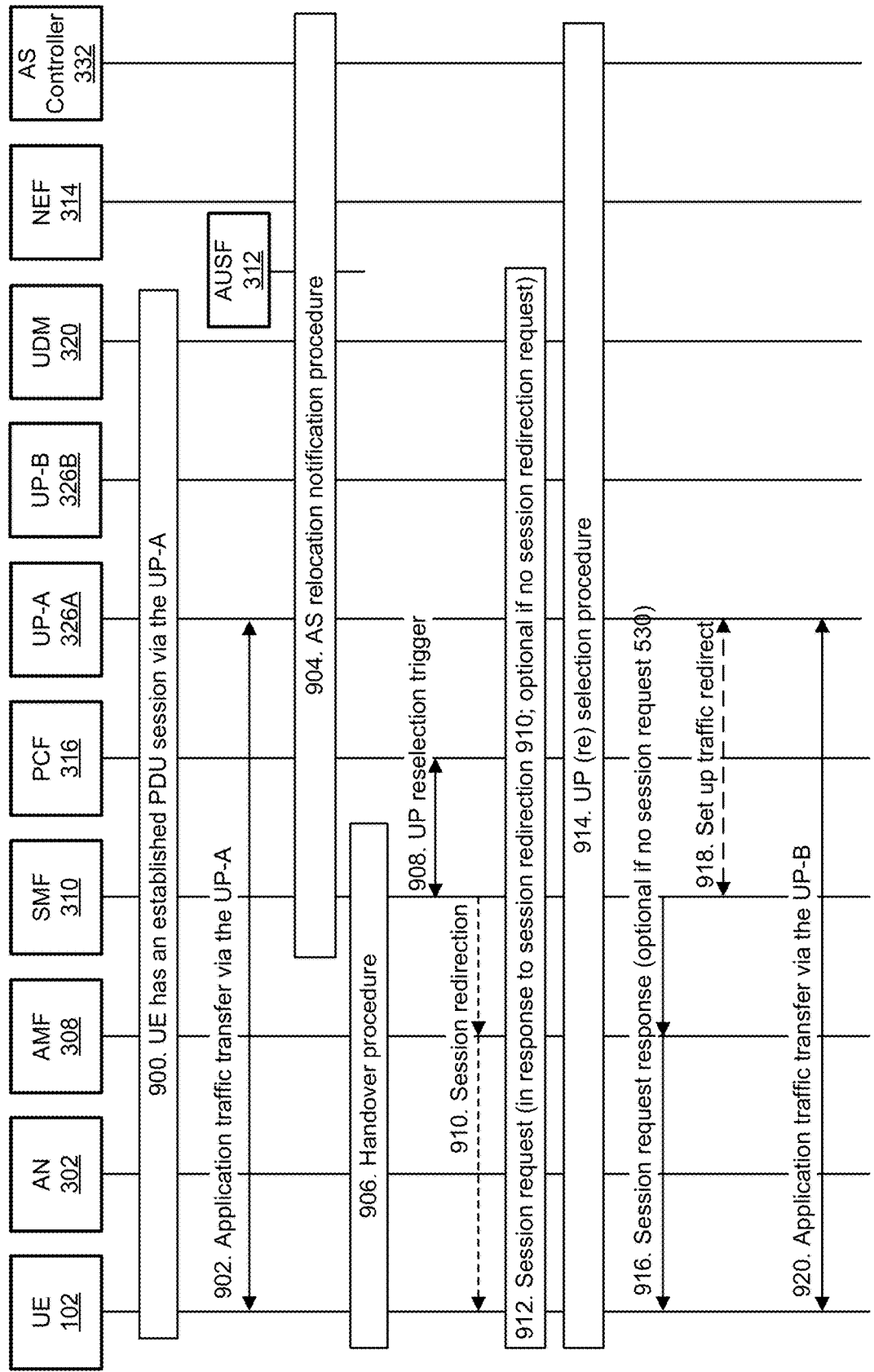
FIG. 9 presents a signalling diagram illustrating an embodiment of an application-friendly UP reselection procedure for PDU session modification.

FIG. 9 illustrates an application-aware UP reselection procedure for PDU session modification. In this procedure, in step 900 the UE 102 has an established PDU session that is carrying the application traffic via the UP-A 326A. As shown in FIG. 9, application traffic transfer 902 is via the UP-A 326A.

The SMF 310 receives a trigger for UP reselection for the application traffic carried by the PDU session. The trigger can be from: an AS relocation notification procedure 904, indicating a new AS location; a handover procedure 906, indicating a new serving AN; or a policy trigger 908 from PCF 314 indicating a policy change that impacts the UP selection of the PDU session.

In response to receiving the trigger, in step 910 the SMF 310 sends a session redirection message to the UE 102 via the AMF 308. This step is optional if the established PDU session is to be pre-served or re-used according to the SSC mode configuration.

In step 912, the UE 102 transmits a session request for setting up a new session in response to receiving the session redirection. Note that this step is also optional, as it only occurs if a session redirection message is received from the SMF 310.

In step 914 the SMF 310 establishes the UP-B 326B for the application traffic using an UP (re)selection procedure. Step 914 is similar to the UP selection procedure shown in FIG. 7 and described above.

In the case that the step 912 is optional, if the PDU session is not a dedicated PDU session for the application and has an SSC mode of 3, the SMF 310 may insert a branching point into the UP path such that the UP-A 326A and the UP-B 326B are two branches of the UP path. The SMF 310 instructs the branching point to steer the traffic associated with the application to the UP-B 326B, for example, according to the destination address or the combination of destination address and port number.

In step 916 the SMF 310 sends a session response to the UE 102 via the AMF 308 to close the session request sent in step 912. If the ongoing PDU session is not a dedicated PDU session for the application and has an SSC mode of 3, the response should indicate the application traffic to be redirected to the new PDU session, e.g., through the destination address or the combination of destination address and port number). The UE 102 will perform traffic redirection according to the redirection indication in the session response.

In step 918, the SMF 310 sets up traffic redirection from the UP-A 326A to the UP-B 326B for leftover traffic. In step 920 future application traffic continues, now via the UP-B 326B.

In an embodiment, a system and method for application-influenced SSC and UP management for edge computing is provided. In the embodiment, it is assumed that the applications (i.e. AS) are deployed in the operator's local network, i.e. local DN.

Figure 10:
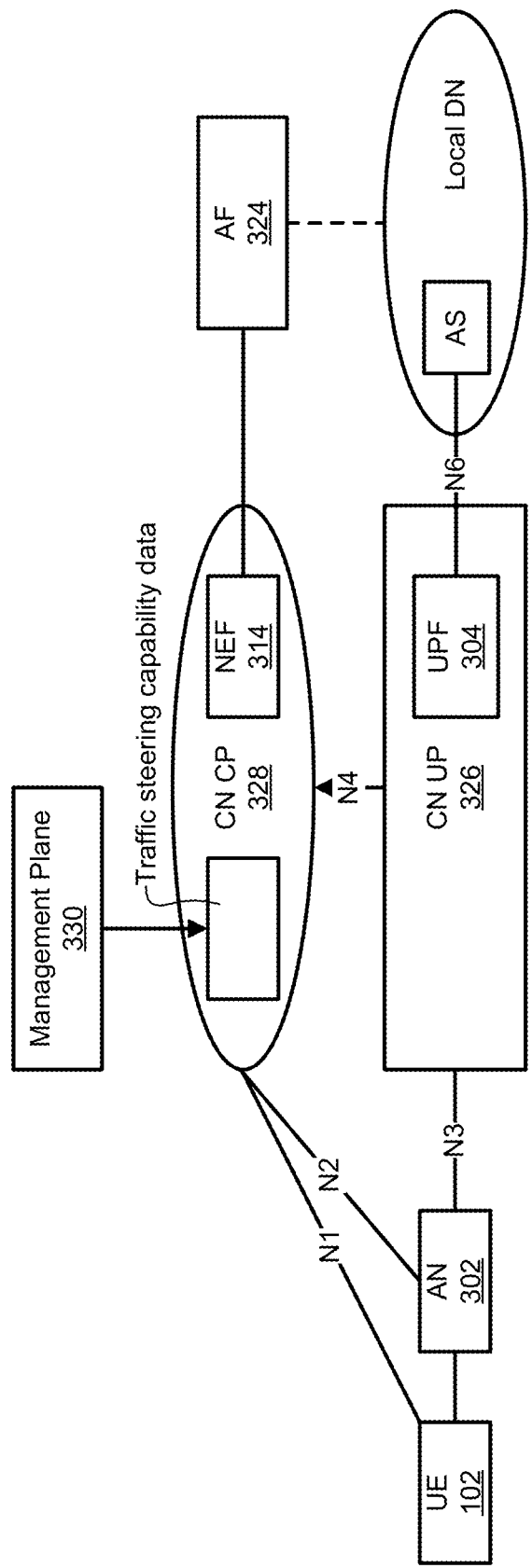
FIG. 10 is a block diagram illustrating an embodiment of a network architecture.

Referring to FIG. 10, an application function (AF) 324 (a non-3GPP function) is responsible for AS (re)location (or, AS (re)selection) within the local DN. The application function 324 interacts with the CP 328 through the NEF 314. The behaviour of the application function 324 and the actual relocation of the application or application context are not yet defined under the current standard, and are not relevant to the present application.

The CN CP 328 has information about the traffic steering capability between the UPFs 304 and the AS locations. The information is provided by a network management component, such as a network manager in the management plane 330 and used by the NEF 314 to determine UPFs 304 suitableness or preference for the application.

The SMF 310 is responsible for configuring traffic steering at UPFs 304 for routing UL traffic to the proper AS location in the face of AS (re)location.

The local DN is responsible for steering DL traffic to the proper UPF 304 in the face of UP (re)selection. The UPF 304 recognizes the UE IP address associated the DL traffic as a valid IP address. To ensure that the UPF 304 recognizes the UE IP address, in some embodiments, each of the UPFs 304 may make use of the same private IP address space.

The DL traffic steering may be configured by the application function 324, or realized through upper level mobility management mechanisms within the local DN. The UPF 304 can recognize the UE IP address in the DL traffic as a valid identifier. This can be for example achieved by applying the same private IP address space at the UPFs 304. As noted above, in embodiments where IP addressing is not used, other address types or identifiers can be employed. The behaviour of the local DN for steering DL traffic is not germane to the following discussion.

The interface marked by a dashed line in FIG. 10 is not yet defined under the current standard and how it is structured is not germane to the following discussion.

This section describes the interaction necessary between the CP 328 and the application function 324 to enable application-friendly UP management for the application that requires efficient end-to-end path.

In this example embodiment, it is assumed that the NEF 314 authenticates and validates the information received from the application function 324. As will be understood by those skilled in the art, this responsibility can be moved to another functions, with the commensurate changes in the control signalling.

Figure 11A:
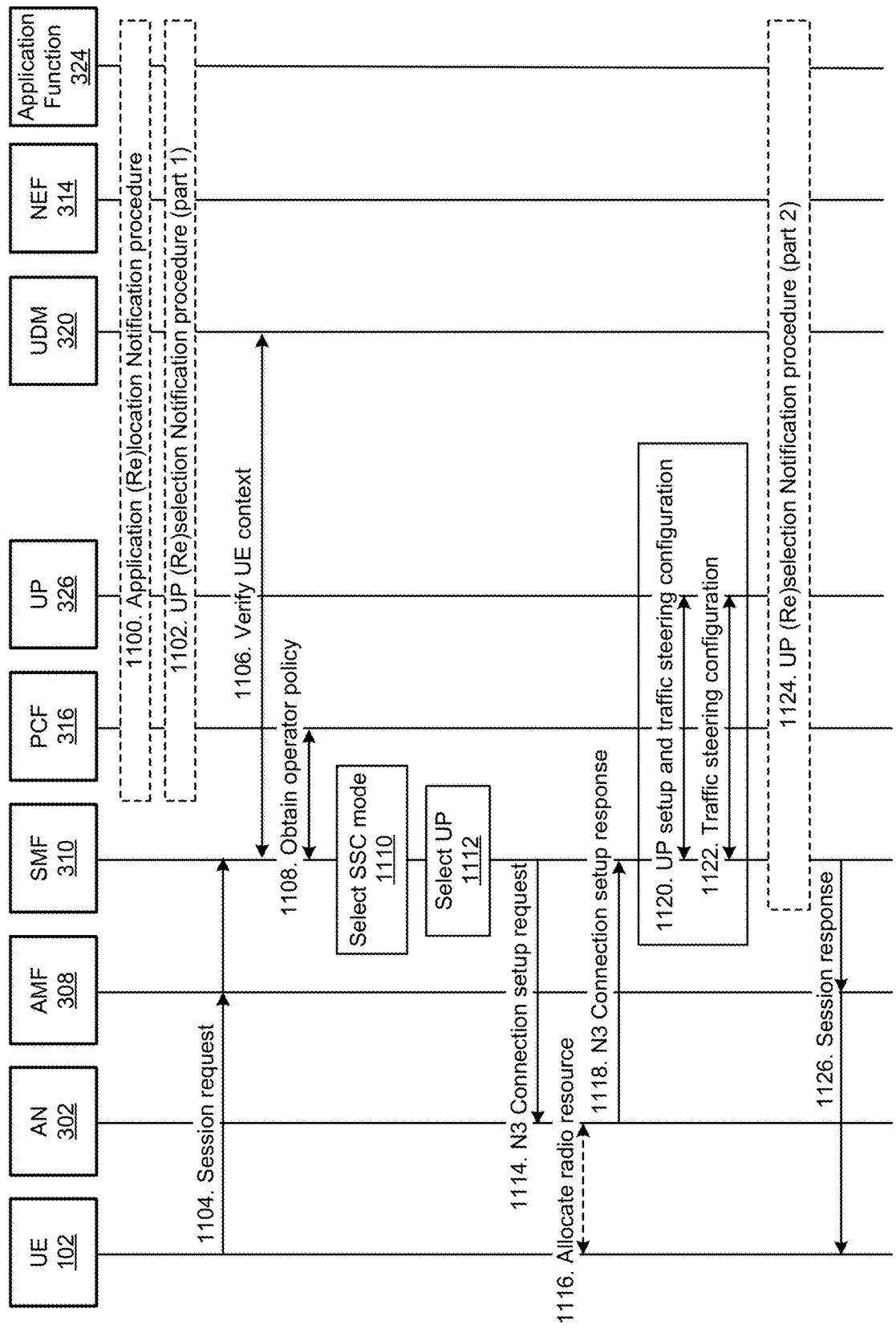
FIGS. 11A and 11B are signalling diagrams illustrating an embodiment of application-influenced UP selection performed by the SMF as part of session establishment.

Referring to FIG. 11A, a signalling diagram is presented illustrating an embodiment of application-influenced UP selection performed by the SMF 310 as part of session establishment. In step 1100 the application function notifies the network of the application location(s) for the future application traffic associated with the UE 102 through the procedure of 'Application (Re)location Notification' service of the NEF 314, where UP selection policy and traffic steering rule are generated by the PCF 314. In an implementation, the procedure of Application (Re)location Notification' service of the NEF 314 may be implemented using any number of different methods including some of those described elsewhere in this application.

In step 1102, the application function 324 can subscribe to UP 326 (re)selection notification for the future application traffic associated with the UE 102 through the procedure (part 1) of 'UP (Re)selection Notification' service of the NEF 314, where UP (re)selection notification policy is generated by the PCF 314. In an implementation, the procedure of 'UP (Re)selection Notification' service of the NEF 314 may be implemented. Step 1102 is an optional step, which may be determined by the application function 324. In some implementations, steps 1100 and 1102 may operate independent from each other.

In step 1104 the UE 102 sends a session request to the SMF 310, which includes the local DN identifier. The request may include the application identifier, indicating it is a dedicated PDU session for the application. The local DN identifier and the application identifier may be two parts of an integrated identifier (as local DN identifier or application identifier) or be two separate identifiers.

In step 1106 the SMF 310 verifies the UE context and authorizes the session request according to the user subscription data. In step 1108 the SMF 310 obtains operator policies from the PCF 314, including the application-influenced UP management policy resulting from steps 1100 and 1102. In step 1110 the SMF 310 selects an SSC mode for the PDU session according to the session request, the operator polices, the UE type, and other necessary information. If the session request includes the application identifier and if the operator policies indicate application mobility (i.e. potential application relocation), the SMF 310 may select the SSC mode 2 for the PDU session. If the session request does not include the application identifier and if the operator polices indicate that the applications potentially accessed by the UE have mobility, the SMF 310 may select the SSC mode 3 for the PDU session.

In step 1112 the SMF 310 can select an end-to-end UP path for the PDU session with respect to the operator policies. This end-to-end path in the UP 326 may include the application location selected for the PDU session.

In step 1114 the SMF 310 requests the AN 302 to set up N3 connection. In optional step 1116, the AN 302 may allocate RAN resource for the PDU session.

In step 1118 the AN 302 responds to the SMF 310, indicating the completion of N3 connection setup.

In step 1120 the SMF 310 sets up the UP path. In step 1122 the SMF 310 can configure the traffic steering over the N6 interface at the anchor UPF 304 of the UP 326. In some embodiments, steps 1120 and 1122 may be combined in a single integrated configuration step in which the UP setup and traffic steering configuration are performed together.

In step 1124 the SMF 310 can notify the application function 324 about the end-to-end UP path selection through the procedure (part 2) of 'UP (Re)selection Notification' service of the NEF 314. The notification indicates the PDU session location and the application location. In some embodiments, the PDU session location can be used as the anchor UPF IP address. In other embodiments, the UE IP address can be used for the PDU session location. Step 1124 is optional, if the step 1102 does not exist or if step 1102 does not indicate the need for of UP (re)selection post notification.

In step 1126 the SMF 310 sends a session response to the UE 102 via the AMF 308. The manner in which PDU Session establishment is carried out can vary in different implementations. Those skilled in the art will appreciate that this procedure may be subject to standardization and the details of such a procedure are not necessarily germane to the present application.

Figure 11B:
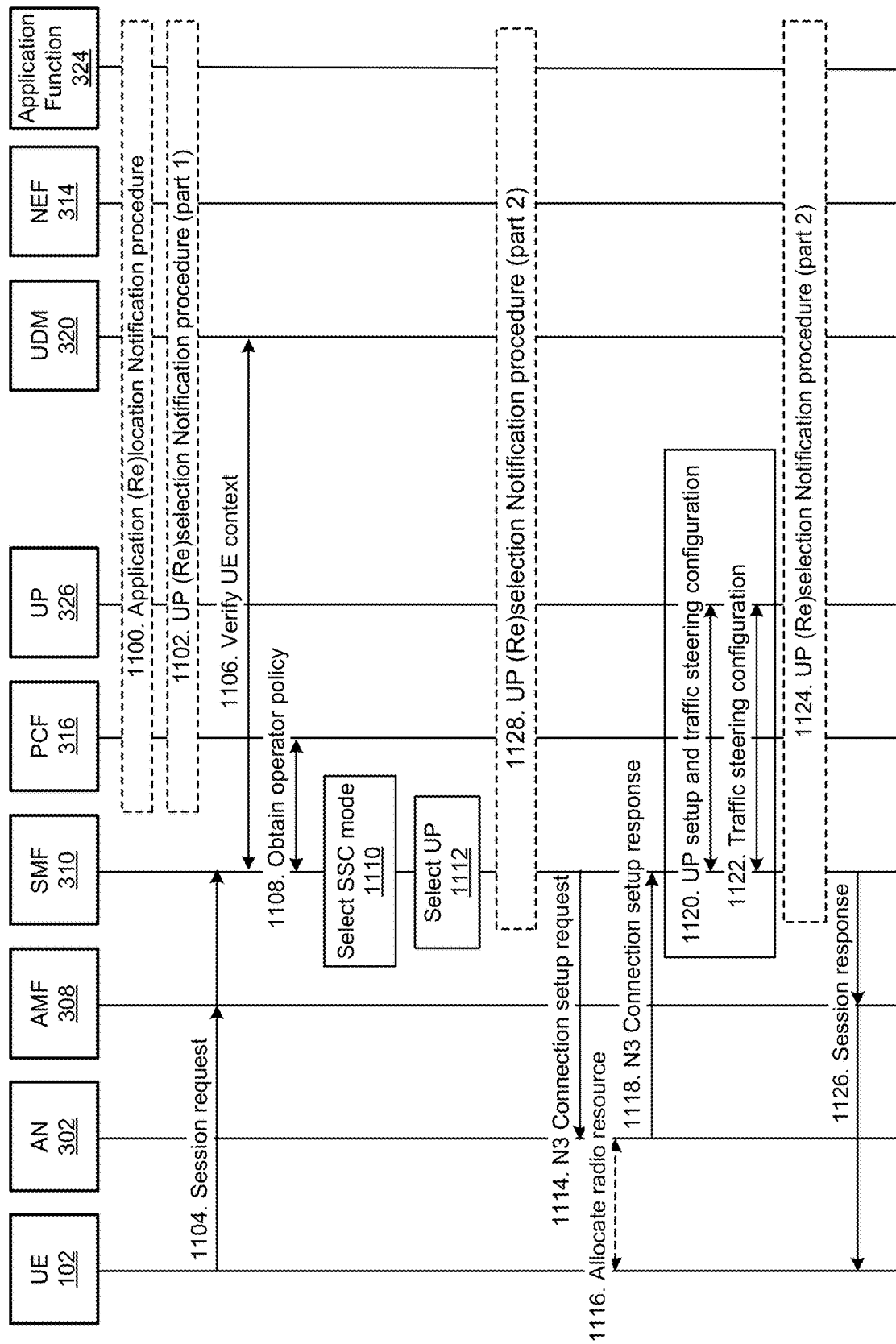

FIG. 11B illustrates an alternate embodiment including the an additional optional step 1128. In step 1128 the SMF 310 notifies the application function 324 about the end-to-end UP path selection through the procedure (part 2) of 'UP (Re)selection Notification' service of the NEF 314. The notification indicates the PDU session location and the application location. In some embodiments, the PDU session location is the anchor UPF IP address. In other embodiments, the IP address of the UE can be used as the PDU session location. Step 1128 is a pre-notification step that is optional, for instance if step 1102 does not exist or if step 1102 does not indicate the need of UP (re)selection pre-notification.

Figure 12A:
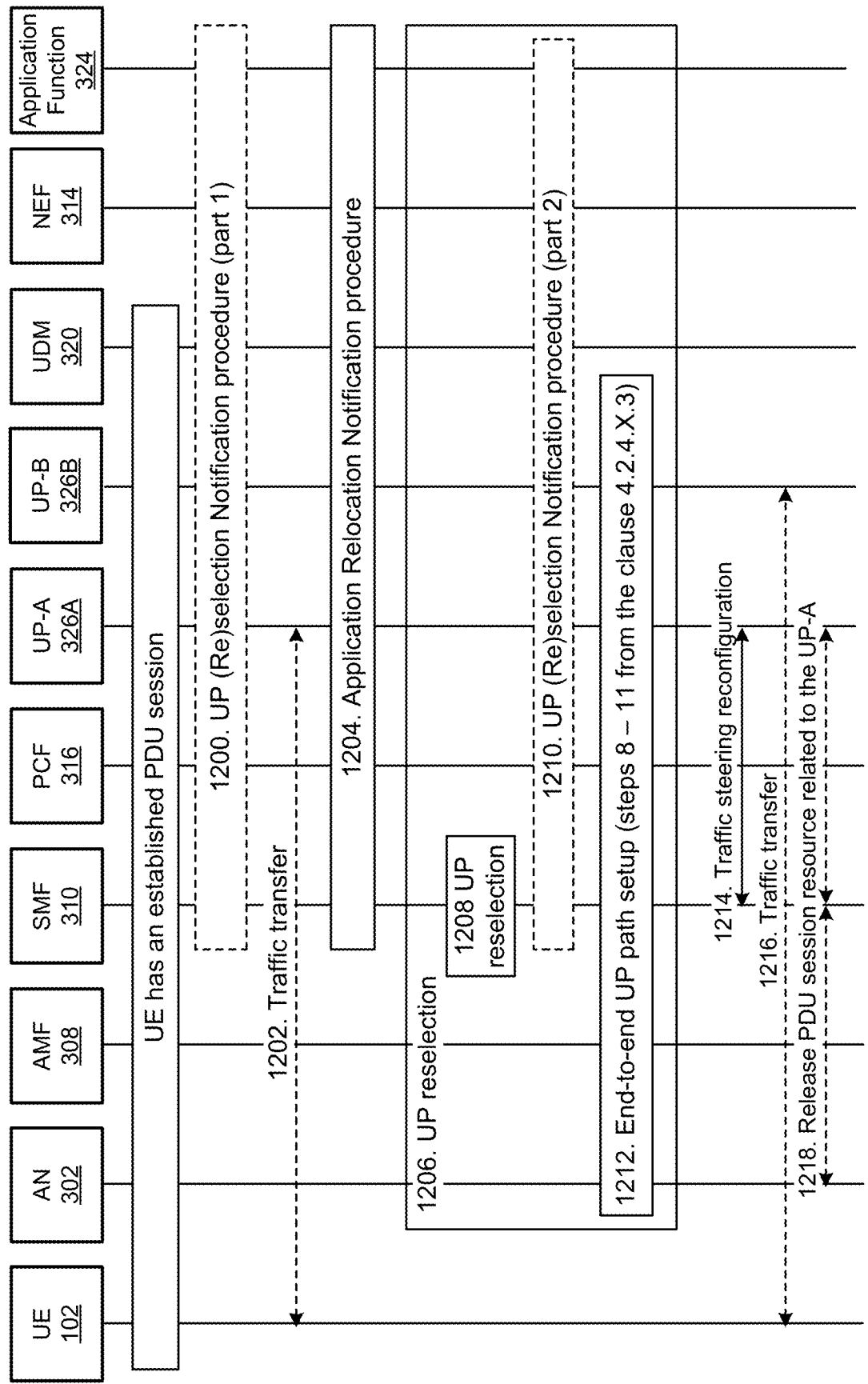
FIGS. 12A and 12B are signalling diagrams illustrating embodiments of an application-influenced UP reselection procedure.
Figure 12B:
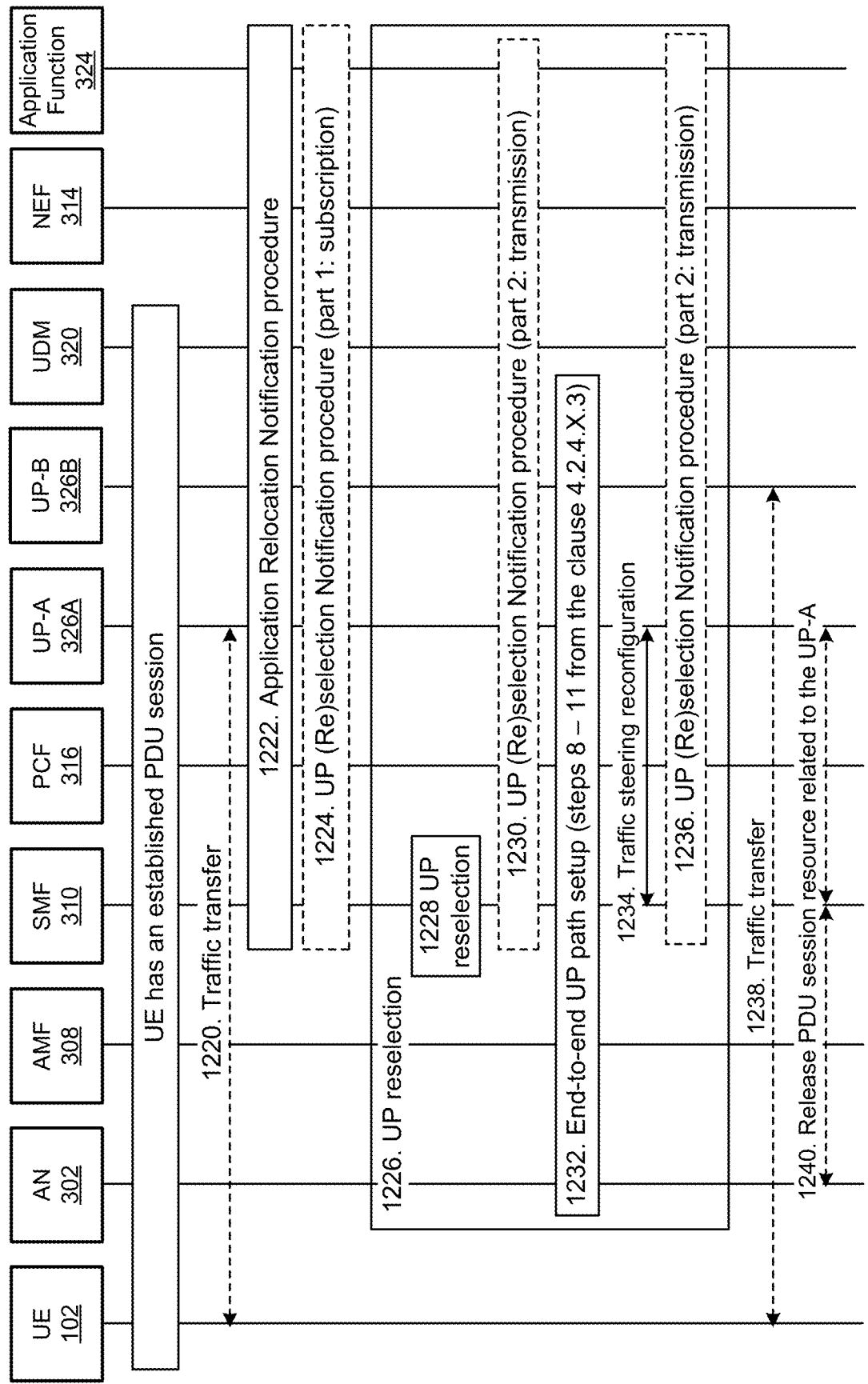

FIGS. 12A and 12B are signalling diagrams illustrating embodiments of an application-influenced UP reselection procedure. This procedure does not change the UE IP address and is therefore transparent to the UE 102. The embodiment of FIGS. 12A and 12B assume that the UE 102 already has an established PDU session via the UP-A 326A.

Referring to FIG. 12A, in step 1200 the application function 324 subscribes to UP (re)selection notification from the network for the application traffic associated to the PDU session through the procedure (part 1) of "UP (Re)selection Notification" service of the NEF. Step 1200 is optional, depending upon the requirements of the application function 324.

In step 1202 traffic transfer between the UE 102 and the UP-A 326A may proceed.

In step 1204 the application function 324 can notify the network about application relocation through the procedure of "Application (Re)location Notification" service of the NEF 314. Steps 1200 and 1204 can be independent of each other. Notification of the network can include the application function 324 transmitting a notification message to one or more network nodes that can, in turn, provide a notification to core network functions that are not otherwise reachable by the application function 324.

The SMF 310 can modify the end-to-end UP path according to the application relocation and local policy when necessary or desirable.

In procedure 1206, the SMF 310 modifies the end-to-end UP path where UP reselection is required. In step 128 the SMF 310 reselects the UP-B 326B and the traffic steering (over the N6 interface) for the PDU session. If the SSC mode of the PDU session is 2, the UP-B 326B is selected to replace the UP-A 326A. If the SSC mode of the PDU session is 3, the SMF 310 inserts a branching UPF or a UL CL UPF into the UP path such that the UP-A 326A and the UP-B 326B are two branches of the UP path.

In step 1210 the SMF 310 notifies the application function 324 about the UP reselection through the procedure (part 2) of 'UP (Re)selection Notification' service of the NEF. Step 1210 is optional, if step 1200 does not exist or if the application function 324 has been notified about a UP (re)selection with the same content.

In step 1212 the SMF 310 modifies the end-to-end UP path according the UP reselection decision. This can be carried out using any of a number of different methods. The particulars of such method may be subject to standardization, such as described for steps 8-11 in the clause 4.3.5.X.2 of the current standard. In step 1212, the N3 connection can be modified, the branching UPF or the UL CL UPF (if any) can be configured to steer the application traffic to UP-B 326B, and the N6 interface (i.e. traffic steering) at the anchor UPF of UP-B is configured. The traffic steering at the branching UPF or the UL CL UPF may be based on the destination IP address, the destination port number, the source IP address, or a combination of any of them.

In step 1214 the SMF 310 reconfigures the traffic steering in cases where UP reselection is not required. The SMF 310 reconfigures the N6 interface at the anchor UPF of UP-A 326A so as to steer the application traffic to the new application location.

In step 1216 traffic transfer between the UE 102 and the UP-B 326B may proceed.

In step 1218 the SMF 310 releases the PDU session resources related to the UP-A 326A, if step 1206 takes place and the SSC mode of the PDU session is 2.

Referring to FIG. 12B, in an alternate embodiment step 1200 from FIG. 12A may be performed after 1204. In step 1220 traffic transfer between the UE 102 and the UP-A 326A may proceed.

In step 1222 the application function 324 notifies the network about application relocation through the procedure of "Application (Re)location Notification" service of the NEF 314. Steps 1200 and 1222 can be independent of each other.

In step 1224 the application function 324 subscribes to a UP (re)selection notification from the network for the application traffic associated to the PDU session through the procedure (part 1) of "UP (Re)selection Notification" service of the NEF 314. Step 1224 is optional, depending upon the requirements of the application function 324.

In step 1226, The SMF 310 performs end-to-end UP path reselection, including UP reselection and/or application location reselection, according to the application relocation and the local policy.

In step 1228 the SMF 310 reselects the end-to-end UP path for the PDU session. If UP reselection is needed, the SMF 310 reselects the UP-B 326B for the PDU session. If the SSC mode of the PDU session is 2, the UP-B 326B is selected to replace the UP-A 326A. If the SSC mode of the PDU session is 3, the SMF 310 inserts a branching UPF or a UL CL UPF into the UP path such that the UP-A 326A and the UP-B 326B are two branches of the UP path.

In step 1230 the SMF 310 notifies the application function 324 about the end-to-end UP path reselection through the procedure (part 2) of 'UP (Re)selection Notification' service of the NEF 314. The notification indicates the anchor UPF location and the new application location. This step is a pre-notification step. It is optional, if step 1224 does not exist or if step 1224 does not indicate the need of UP (re)selection pre-notification.

In step 1232 the SMF 310 modifies the end-to-end UP path according to the decision of step 1228. In the case that UP-B 326B is selected for the PDU session, the SMF 310 modifies the end-to-end UP path, as described by the steps 8-11 in the clause 4.3.5.X.2 of the current standard. In step 1232, the N3 connection is modified, the branching UPF or the UL CL UPF (if any) is configured to steer the application traffic to the UP-B, 326B and the N6 interface (i.e. traffic steering) at the anchor UPF of UP-B 326B is configured. The traffic steering at the branching UPF or the UL CL UPF may be based on the destination IP address, the destination port number, the source IP address, or a combination of any of them.

In the case that UP reselection is not needed, in step 1234 the SMF 310 reconfigures the N6 interface at the anchor UPF of UP-A 326A so as to steer the application traffic to the new application location.

In step 1236 the SMF 310 notifies the application function 324 about the end-to-end UP path reselection through the procedure (part 2) of 'UP (Re)selection Notification' service of the NEF 314. Step 1236 is a post-notification step. It is optional, if the step 1224 does not exist or if the step 1224 does not indicate the need of UP (re)selection post-notification.

In step 1216 traffic transfer between the UE 102 and the UP-B 326B may proceed.

In step 1240 the SMF 310 releases the PDU session resources related to the UP-A 326A, if the SSC mode of the PDU session is 2 and the UP-B is selected for the PDU session at step 1228.

Figure 13:
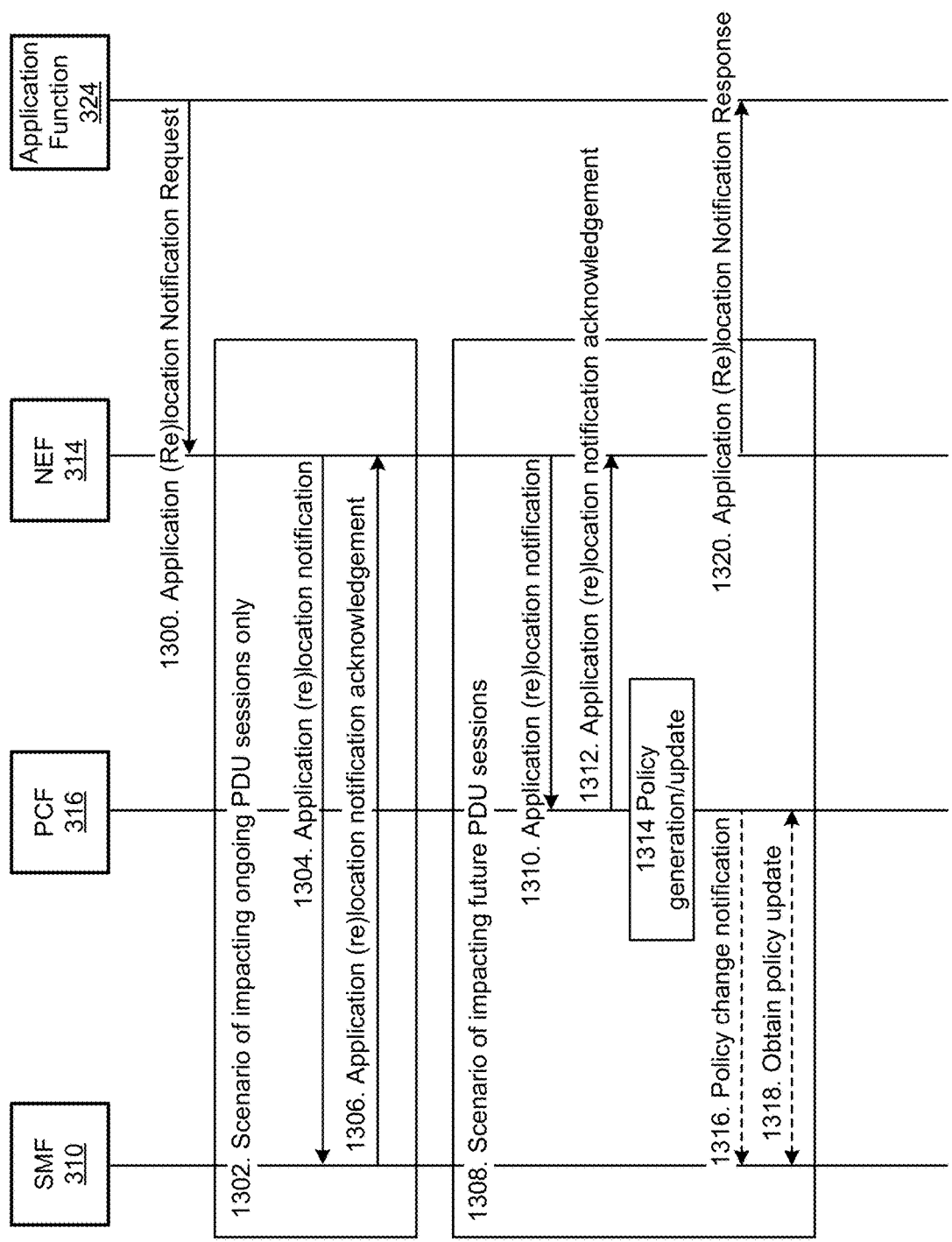
FIG. 13 is a signalling diagram illustrating an embodiment of application (re)location notification service procedure.

FIG. 13 is a signalling diagram illustrating an embodiment of application (re)location notification service procedure.

In step 1300 the NEF 310 receives an Application (Re)location Notification Request (application identifier, application location information, temporal validity condition, spatial validity condition, traffic filter, requester information) message from the application function 324. The application location information indicates the (new) application location(s) and the status of the (new) application location(s). The application location(s) are specified using IP address. The temporal validity condition indicates when the notified application (re)location will proceed. Void of the temporal validity condition implies the application (re)location proceeds immediately. The spatial validity condition indicates the application (re)location applies only to the traffic associated to UEs located within specified Location(s). Void of the spatial validity condition implies the notified application (re)location applies without being concerned with UE location.

The traffic filter indicates the traffic that the application (re)selection applies to, which may belong to ongoing PDU sessions or future PDU sessions. Void of the traffic filter implies the application (re)selection applies to all traffic associated to the application.

The traffic filter may explicitly indicate whether the traffic including ongoing traffic and/or future traffic. The traffic filter may be described using the IP address associated to the traffic. It may also be described using UE ID that is recognized both by the application function and by the network. The requester information includes requester identifier.

The NEF 314 notifies the application (re)location to the selected CP function, i.e. SMF 310 or PCF 314. The notification includes the Application (Re)location Notification Service transaction identifier, the application identifier, the (new) application location(s), the identifiers of the anchor UPFs suitable for selection for each of the (new) application location(s), and the temporal and spatial validity conditions, the traffic filter. Depending on the nature the Location information in the spatial validity condition, the NEF 314 may need to translate the Location information into information that is understandable by the CP functions. The traffic filter may be translated traffic filter described using PDU session identifiers. The NEF 314 determines the anchor UPFs suitable for selection according to the traffic steering capabilities between the UPFs and the notified application locations, which is provided by the management plane.

In procedure 1302, the notification relates to the case where the impacted traffic belongs to ongoing PDU sessions only. In step 1304 the NEF 314 identifies the PDU sessions associated to the impacted traffic and the SMF 310 managing the PDU sessions, and sends the notification to the SMF 310. The NEF 314 identifies the SMF 310 by interacting with the UDM 320. In step 1306 the SMF acknowledges the receipt of the notification to the NEF.

In procedure 1308, the notification can indicate that the impacted traffic belongs to future PDU sessions (and also possibly to ongoing PDU sessions). In step 1310 the NEF 314 identifies the PCF 314 that is in charge of operator policy for the PDU sessions and sends the notification to the PCF 314. The NEF 314 identifies the PCF 314 by interacting with the NRF 318 and/or the UDM 320. In step 1312 the PCF 314 acknowledges the receipt of the notification to the NEF 314. In step 1314 the PCF 314 generates or updates UP management policies according to the notification. If the impacted traffic belongs to ongoing PDU sessions, in step 1314 the PCF 314 identifies the serving SMF 310 of the traffic and notifies the SMF 310 about the policy change. In step 1318 the SMF 310 obtains the policy update from the PCF 314.

In step 1320 the NEF 314 sends an Application (Re)location Notification Response (Result Code) message to the application function 324. The result code indicates the acceptance of the request or its rejection.

Figure 14:
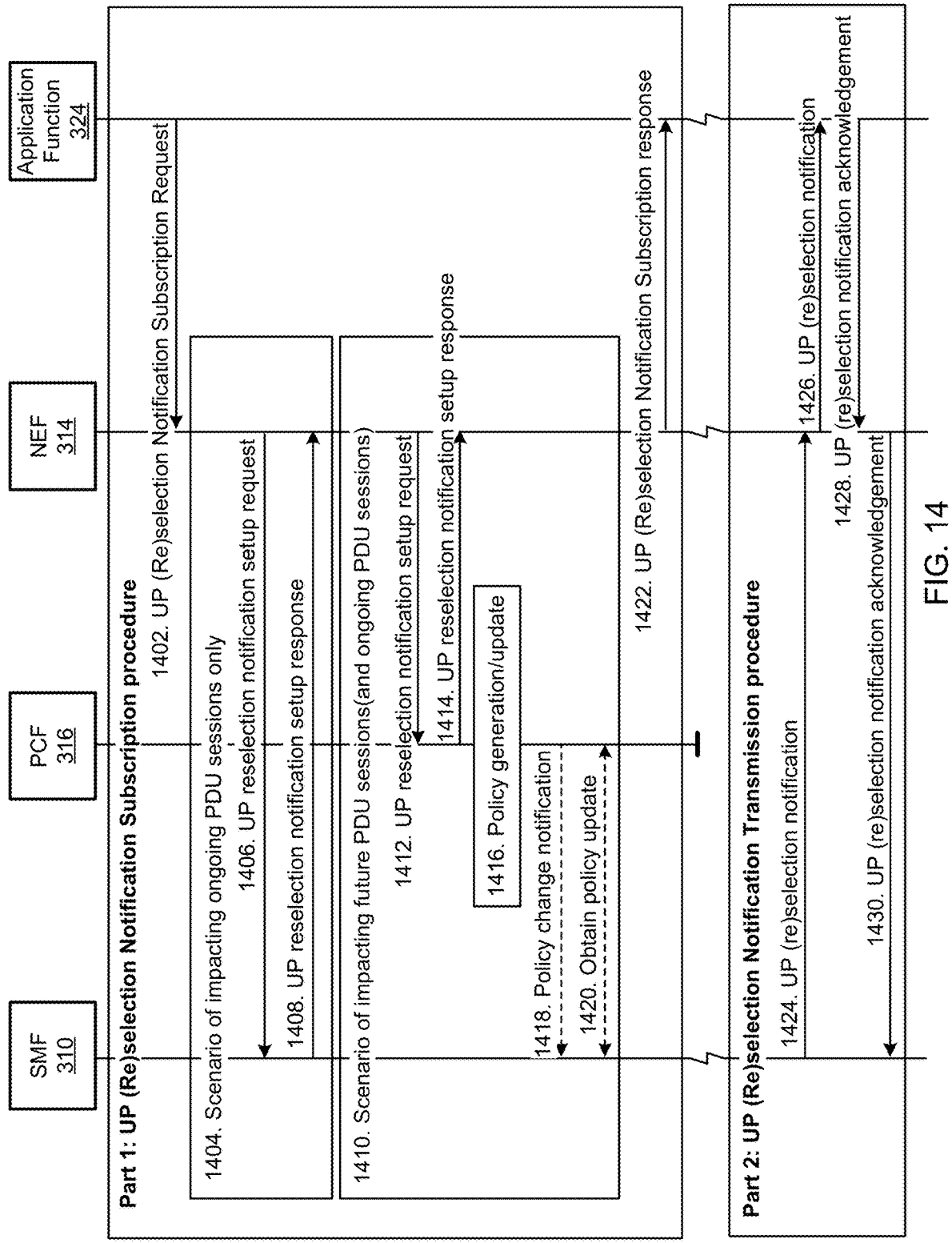
FIG. 14 is a signalling diagram illustrating an embodiment of a UP (Re)selection Notification Service.

FIG. 14 is a signalling diagram illustrating an embodiment of a UP (Re)selection Notification Subscription Service.

In step 1402 the NEF 314 receives the UP (Re)selection Notification Subscription Request ([Transaction Identifier] or [application identifier, temporal validity condition, spatial validity condition, traffic filter], Notification Type, requester information]) message from the application function 324.

Alternative A [Transaction Identifier]: the subscription request corresponds to an existing Application (Re)location Notification Service transaction. The transaction identifier of the existing Application (Re)location Notification Service transaction, implies that the subscription request applies to any UP (re)selection impacted by the existing Application (Re)location Notification Service transaction. The NEF 314 can perform simplified authentication and validation by verifying the transaction identifier.

Alternative B [application identifier, temporal validity condition, spatial validity condition, traffic filter, requester information]: the subscription request is independent of existing Application (Re)location Notification Service transactions. The temporal validity condition indicates when the subscription may be effective. Void of the temporal validity condition implies the subscription becomes effective immediately. The spatial validity condition indicates the subscription is effective only to the traffic of UEs located within specified Location(s). Void of the spatial validity condition implies the subscriptions become effective without being concerned with UE location. The traffic filter indicates the traffic that the subscription may apply to, which may belong to ongoing PDU sessions or future PDU sessions. Void of the traffic filter implies the subscription applies to all traffic associated to the application. The traffic filter may explicitly indicate whether the traffic including ongoing traffic and/or future traffic. The traffic filter may be described using the IP address associated to the traffic. It may also be described using UE ID that is recognized both by the application function and by the network. The Notification Type indicates either Pre-Notification, Post-Notification, or both Pre-Notification and Post-Notification are requested. Pre-Notification implies notification is to be sent before the end-to-end UP path is configured; Post-Notification implies notification is to be sent after the end-to-end path configuration. The requester information may include: requester identifier, requester IP address, and requester port number.

The NEF 314 requests the selected CP function, i.e. SMF 310 or PCF 314, to set up UP (re)selection notification. The request may include the UP (Re)selection Notification Subscription Service transaction identifier, the NEF identifier, and the subscription information in the request message except for the requester information. Depending on the nature of the Location information in the spatial validity condition, the NEF 314 may need to translate the Location information into information that is understandable by the CP functions. The traffic filter may be translated traffic filter described using PDU session identifiers.

In procedure 1404 the impacted traffic belongs to ongoing PDU sessions only. In step 1406 the NEF 314 identifies the PDU sessions that the impacted traffic is associated to and the SMF 310 managing the PDU sessions, and sends the request to the identified SMF 310. In step 1408, the SMF 310 responds to the NEF 314, indicating the acceptance of the request. The NEF 314 identifies the SMF 310 by interacting with the UDM 320.

In procedure 1410 the impacted traffic belongs to future PDU sessions (and also ongoing PDU sessions). In step 1412 the NEF 314 identifies the PCF 314 that is in charge of the operator policy for the PDU sessions that the impacted traffic is associated to and sends the request to the identified PCF 314. In step 1414, the PCF 314 responds to the NEF 314, indicating the acceptance of the request. The NEF 314 identifies the PCF 314 by interacting with the NRF 318 and/or the UDM 320. In step 1416 the PCF 314 generates or updates UP management policies according to the request. If the impacted traffic belongs to ongoing PDU sessions, in step 1418 the PCF 314 identifies the serving SMF 310 of the traffic and notifies the SMF 310 about the policy change. In step 1420 the SMF 310 obtains the policy update from the PCF 314.

In step 1422 the NEF 314 sends an UP (Re)selection Subscription Response (Result Code) message to the application function 324. The result code indicates the acceptance of the request or its rejection.

After performing end-to-end UP (re)selection for the impacted traffic, in step 1424 the SMF 310 notifies the NEF 314 about the UP (re)selection. The notification can include information such as the UP (Re)selection Notification Subscription Service transaction identifier, the Notification Type, the PDU session location the anchor UPF location and the application location. The PDU session location can, in some embodiments be one of the anchor UPF address or the UE address for the PDU session. In some embodiments, these addresses are IP addresses. The application information may be in the form of an IP address or another such identifier.

In step 1426 the NEF 314 sends the UP (re)selection information to the application function 324 using the requester IP address and the requester port number.

In step 1428 the application function 324 responds to the NEF 314 to acknowledge the delivery of the notification. The response indicates whether the network should continue the end-to-end path configuration, if the Notification Type is Pre-Notification.

Upon a pre-notification, the application function 324 can perform the necessary steps for the application (re)location or application state (re)location procedure, which can include releasing resources and data structures, etc. If the application function 324 wants to cancel the application (re)location, the application function 324 uses the response message to inform the network. If the Notification Type is Post-Notification, the application function 324 knows that the end-to-end UP path is ready for use, and can start to steer DL traffic to the path.

In step 1430 the NEF 314 responds to the SMF 310 to acknowledge the delivery of the notification. The response includes the information received from the application function 324 in step 1428.

In some embodiments application functions may influence traffic routing.

Information on the UE whose traffic is to be routed

The information to identify UE 102 can be either fixed identifiers or dynamic identifiers Fixed Identifiers SUPI, PEI described in Clause 5.9 of TS 23.501: Since the edge computing applications may be located in untrusted domains, these identifiers should not be disclosed to 3rd party edge computing applications.

MSISDN: Can be used for 3rd party edge computing

External Identifier: Can be assigned either by operators or by edge computing application Dynamic Identifiers Temporary identifier: Assigned during UE mobility registration procedure IP address: assigned during session establishment procedure The above two identifiers can be used to identify the UE 102 having active PDU sessions. However, these identifiers may be changed due to UE mobility or UPF reselection. Additionally, it the PDU session is non-IP type, the IP address is inapplicable. Thus, these dynamic identifiers may be not suitable for edge computing applications.

Proposal 1: Either External Identifier or MSISDN is used to identify the UE whose traffic is to be routed.

2 Identifiers for Group of UEs

In some scenarios, the traffic routing updates may be applied to a group of UEs. If there are a large number of UEs and the UE identifiers are included in the message sent from edge computing application to the CN, this message would be large. Some alternative methods should be proposed. Some possible methods are given below.

Geographical areas: the coverage of PLMN can be divided into zones, each zone has a zone identifier (ZID). The operator can inform the edge computing application about the mapping between geographical location and ZID. There is no need to standardize the ZID.

IP prefix: It is possible that the group of UEs for a given application may be assigned a range of IP addresses. The IP range may be reserved to indicate the group of UEs. However, this solution is inapplicable to non-IP traffic type.

Domain Network Name (DNN): Each edge computing application may have a unique name recognized by CN. The DNN can indicate the UE who can access the DNN.

Application Identifier (AID): If a DN provides multiple applications, each application may have an Application Identifier. The Application Identifier can be represented by the port of application server for IP traffic.

Combinations of any above attributes can be used to identify group of UEs.

Proposal 2: A combination of DNN, AID and ZID can be used to identify a group of UEs.

3. Information on where to route the traffic: This can be either DNN of local data network and/or IP address of the application server.

Proposal 3: Either DNN of local data network or IP address of the application server can be used to indicate the routing destination.

4. Potential locations of the application to where the traffic routing should apply: The potential locations of the application can be either DNNs of local data networks hosting application server.

Alternatively, the IP addresses of application server can be used. The network management entities can configure the CP about the capabilities of transportation link between the UPF(s) and application servers. There is a separate contribution to clarify this issue.

Proposal 4: Either the DNNs of local data networks or IP addresses of application servers can be used to indicate potential locations of application for traffic routing.

5. Information to identify the traffic to be routed

Once the UE 102 has been identified, additional information can be used to identify the traffic to be routed.

DN provides 1 application: If the DN provides only one application, the DNN can be used to identify a PDU session.

DN provides multiple applications: Each application should have an Application Identifier (AID). For IP traffic, the AID can be the port number of application server.

Proposal 5: The DNN can be used to identify PDU sessions if the DN provides one edge computing application. If the DN provides multiple application, each the DNN and AID are used to identify PDU sessions.

The application function request may be routed to the SMF by another control function such as the NEF or the PCF.

a. In EPC, the Rx Interface between PCRF and Application Function is used to support 3rd party applications:
Examples: IMS and public safety Application Functions, SCEF
Security: Those applications are considered located in 3GPP trusted domain. There are no major security issues.
The information received over Rx interface is intended for PCRF. It means the PCRF processes the received information to make policy decision.
b. Edge computing applications in 5G CN
Security: Edge computing application control function may be located in non-trusted domains. Thus, the request from application control function should be authenticated and authorized. The current agreed functionalities of NEF include authentication/authorization functionalities, but not PCF.

For edge computing applications, the information from application control function may be intended for SMF for possible re-selection of UPF; the PCF does not process this information. Hence application control function should not send its request to PCF.

Proposal 6: The NEF is used as the interface between application control function and CN CP functions.

An application function may send requests via NEF to influence SMF routing decisions for traffic of PDU session. This may influence UPF selection and allow routing user traffic to a local access to a Data Network Such requests may contain at least:

In some implementations, the requests may include information to identify the traffic to be routed. The DNN can be used to identify PDU sessions if the DN provides one edge computing application. If the DN provides multiple application, the DNN and AID (Application Identifier) are used to identify PDU sessions.

In some implementations, the port number of application server may be used as an AID. Information on where to route the traffic. Either DNN of local data network or IP address of the application server can be used to indicate the routing destination. Potential locations of the application to where the traffic routing should apply. Either the DNNs of local data networks or IP addresses of application servers can be used to indicate potential locations of application for traffic routing. The traffic can be identified by the DNN when the Application Function is the only Application Function hosted in the local DN, or if there is otherwise no opportunity for confusion; otherwise, a combination of DNN and an application identifier or traffic filtering information can be used to identify the application traffic.

NOTE 1: Mapping between application identifier and traffic filtering information (such as IP address of the Application Function receiving the traffic) can be configured in the NEF.

In some implementations, the requests may include information on where to route the traffic, such as the DNN (e.g. if all traffic of the PDU session is routed to the Application Function) or the IP address of the Application Function.

In some implementations, the requests may include potential locations of the application to where the traffic routing should apply. The potential locations of the AFs can be indicated using an IP address of the traffic handling AF that the NEF (or the AF if it is trusted by the operator as described in clause 6.2.X) maps to specific PDU session anchors to the local DN.

NOTE 2: The IP address used to identify the instance of the traffic handling AF can be different from the IP address of the same AF instance used by the UE to interact with it.

In some implementations, the requests may include information on the UE(s) whose traffic is to be routed. Individual UEs can be identified using either External Identifier or MSISDN. Groups of UEs can be identified by the DNN with which they have an active PDU session, possibly together with an application identifier or traffic filtering information. Additionally, to restrict the group to UE(s) within a certain geographic area, zone identifiers can also be included.

NOTE 3: A zone identifier can be mapped to a geographic area. The mapping is configured in both NEF and AF. Either External Identifier or MSISDN is used to identify individual UEs. The DNN, AID (Application Identifier) and ZID (Zone Identifier) or a combination of any of them can be used to identify a group of UEs In some implementations, the requests may include information on when (time indication) the traffic routing is to apply.

The application function 324 issuing such requests is assumed to belong to the PLMN serving the UE 102. The application function 324 may issue requests on behalf of other applications not owned by the PLMN serving the UE 102.

SMF 310 may, based on local policies, take this information into account to:

(re)select UPF(s) for PDU sessions.

activate mechanisms for traffic multi-homing or enforcement of an UL Classifier (UL CL). Such mechanisms are defined in sub-clause 5.3.5. This may include providing the UPF with traffic forwarding (e.g. break-out) rules.

inform the application function of the (re)selection of the UP path.

According to certain implementations of the invention, methods and systems for traffic routing are provided in which a spatial validity condition is added as part of the information provided by the AF.

The AF 324 may provide information to one or more nodes or functions within the CN to influence UP path (re)selection decisions including for edge computing scenarios. However, consideration typically is made whether the information provided by AF is identical to the information used in the CN for UP path (re)selection, in other words, whether information mapping/processing is needed. The following table compares the pros and cons when mapping/processing is and is not needed.

may be different. In such an embodiment, the NEF 314 may be configured to perform the information processing/mapping.

(2) In the case of an AF 324 interacting with the Core Network Functions directly, the AF 324 may implement the NEF's information processing functionality and provide information to the CN functions in a format that can be used in the Core Network.

In some applications, such as, for example, an MTC application including an event monitoring application or a crowd-sensing application, UL data associated with the application may need to be routed to the same application location for collection, processing, and decision-making. For instance, the data may be routed to the same application location in order to process the data, identify any data correlations, perform information aggregation, and either make a decision or output a result to allow an operator or a $3^{rd}$ party to review and take action. In such a case, the AF influence on traffic routing may be subject to a spatial validity check, for instance that the location of the UE(s) satisfies a spatial constraint when the traffic routing applies.

Accordingly, in accordance with some embodiments, a spatial validity condition is included in the information provided by the AF to the CN, which is independent from the conditions influencing UP (re)selection.

In accordance with some embodiments, the interaction between the CP and the application environment may be defined or regulated as a policy so as to benefit from the unified policy framework. In some embodiments, the result of the interaction between the CP and the application envi-

|  | Pros | Cons |
| --- | --- | --- |
| Mapping is needed | The impact from application environment on the architecture design is minimized. The Core Network is application agnostic. Any change in application environment is masked by the processing NF that performs the processing/mapping. The processing NF can be configured to support unlimited types of application environments without impacting the system architecture. The architecture is thus extensible. | A processing NF is needed between the AF and the Core Network Functions. This creates additional complexity. |
| Mapping is not needed | AF generates information understandable to Core Network Functions. Simplified architecture. | The impact from application environment on the architecture design is maximized. The Core Network is extended to the application domain. Additional standardization work is needed for the extension, for example, on the nature of application location, the inter connection between UPF and application location. When the application environment changes, 3GPP standards need to be updated. Or, the standards need to cover all possible application environments. |

Based on the information provided in the above table, some embodiments include one or both of the following two alternatives for AF influence on traffic routing:

(1) In the case of an AF 324 interacting with the Core Network Functions via a NEF 314, the information provided by the AF 324 and the information used in the Core Network ronment is a policy generation or policy update. The policies are UP management policies which include traffic routing policies. The PCF-based approach allows the PCF to maintain a global view of the UP management and, thus, address global consistency optimality in UP management.

An AF may send requests to influence SMF routing decisions for traffic of one or more PDU sessions. In some implementations, the AF sends requests to the PCF to influence these SMF routing decisions. This may influence the UPF selection process and allow routing of user traffic to a local access to a Data Network (DN). Those skilled in the art will appreciate that reference in this document to routing of traffic a local access to a DN can be understood to include transmitting traffic to a local access point that can provide access to the DN in question. This local access point may be local to the CN (or segment of the CN) or it may be local to the DN. Topologically the local access serves as a connection into the DN.

In some implementations, an AF may be in charge of, or a party to decisions about, the (re)selection or relocation of the applications within the local DN. In some implementations, such an AF may receive notifications about events related to PDU sessions (and in some embodiments may receive information associated with applications that have live PDU sessions or that have the authorization to initiate a PDU session through or with the AF).

In some implementations, an AF may send the (re)selection or relocation requests, associated with a DN hosted application, independently from one another. The AF issuing such requests is assumed to belong to the network (e.g. the PLMN) serving the UE. The AF may issue requests on behalf of other applications not owned or hosted by the network (e.g. PLMN) serving the UE.

If the AF is within the trust domain of the CN, it may interact with the PCF directly. If the AF is outside the trust domain, it may interact with the PCF via the NEF, and the NEF can in turn interact with the PCF and behave as an AF within the trust domain on behalf of the actual AF outside the trust domain. In some embodiments, the NEF may act as an AF on behalf of an actual AF that is resident within the trust domain.

In scenarios in which the AF interacts with the PCF via the NEF, the information provided by the AF and the information used in the 5G Core (5GC) Network may be of a different format or different in nature (e.g. contain different information elements). In some implementations, the NEF may be configured to perform information conversion/mapping. In the case in which the AF interacts with the PCF directly, the AF may provide information usable by the 5GC without the need for information conversion.

Requests to influence SMF routing decisions for traffic of PDU session may be sent by an AF. An Application Function can send an Application Location Notification message to the PCF. The message may contain at least:

Information to identify the traffic to be routed. The traffic may be identified, for instance, by the DNN and an application identifier or traffic filtering information. In some implementations, the traffic can be identified in the AN request by the DNN. The DNN may be used to identify the traffic of a PDU session, and the Application Identifier, to indicate a particular service of a PDU Session. In case of IP traffic, in some embodiments traffic filtering information (e.g., IP 5-tuple which may contain source and destination addresses as well as port numbers at each of the source and destination, as well as a protocol being used) may be included. In some implementations, slicing information (e.g., S-NSSAI) may be part of the traffic filtering information or be a separate element in the AN request.

Information on where to route the traffic. If the AF interacts with the PCF directly, it may indicate a routing profile including a list of Dynamic Network Access Identifiers (DNAIs), each of which may comprise a local access to the DN, and N6 traffic routing parameters related to each DNAI. If the AF interacts with the PCF via the NEF, it may indicate the DNN and/or the address of the application in its communications. In an embodiment, the N6 traffic routing parameters may be configured in UPFs for supporting the traffic steering mechanism or implementation in the local DN.

Potential locations of the AFs which may be used to determine where the traffic routing should apply. The potential locations of the AFs may, for example, be used for UPF selection. If the AF interacts with the PCF directly, the information associated with potential locations of the AFs (either in absolute terms or in topological terms) can be provided by the DNAIs in the routing profile described above. If the AF interacts with the PCF via the NEF, the information regarding potential locations of the AFs can be provided by the host address(es) of the application.

Information about the UE(s) whose traffic is to be routed. This may correspond to individual UEs, all UEs, groups of UEs a subset of the connected UEs, or another such grouping. The UE or grouping of UEs may be identified using any one of, or a combination of any of, an External Identifier, External Group Identifier, MSISDN, an IP address, or IP address prefix Temporal validity information to indicate when the traffic routing is to apply. In some implementations, the absence of the temporal validity information may imply that the traffic routing shall apply immediately. It should be understood that other default conditions may apply if the temporal validity information is omitted.

Spatial validity information indicating any location-based criteria (e.g. geographic location(s) within which the UE(s) should be located) that should be used to determine whether to apply the traffic routing. If absent, a default condition may apply.

In some implementations, the AF may interact with the PCF via the NEF. In this case the NEF may be configured to convert the 'information on potential locations of the applications to where the traffic routing should apply' and the 'information on where to route the traffic' in the message into a routing profile and provides this routing profile or an indication of the routing profile, to the PCF. If the routing profiles can be ordered and placed into an indexed list, only the index needs to be provided.

In some implementations, the PCF, based on received information (for instance received from the AF or the NEF), a, possibly pre-defined, operator's policy, and/or inputs from other entities (e.g., user subscription, user's quota, user's current RAT, network load status, time of day, UE location, APN . . . which may be received from other network entities such as a CSM entity, an HSS, a traffic engineering function or from any number of control and management plane entities), can authorize a request received from the AF and in accordance with the request determine a traffic steering policy. The traffic steering policy may indicate a suitable traffic steering profiles from a set of profiles. Each of the profiles may specify the UPF providing the traffic steering and the N6 traffic routing parameters. This may implicitly indicate a unique DNAI, to be configured in the UPF.

In an implementation, the PCF can provide the SMF with the traffic steering policy. The SMF may, based on local policies, take this information into account to:

(re)select UPF(s) for PDU sessions. The SMF can perform traffic steering profile selection at the time of (re)selecting UP path. Because a traffic steering profile may implicitly map to a unique DNAI (via the N6 traffic routing parameters in the profile), traffic steering profile selection may imply mapping UE location (TAI/Cell-Id) to DNAI(s) in addition to UPF selection;

activate mechanisms for traffic multi-homing or enforcement of an UL Classifier (UL CL). This may include providing the UPF with traffic forwarding (e.g. break-out) rules; and/or configure N6 traffic routing in the anchor UPF according to the selected traffic steering profile.

Figure 15:
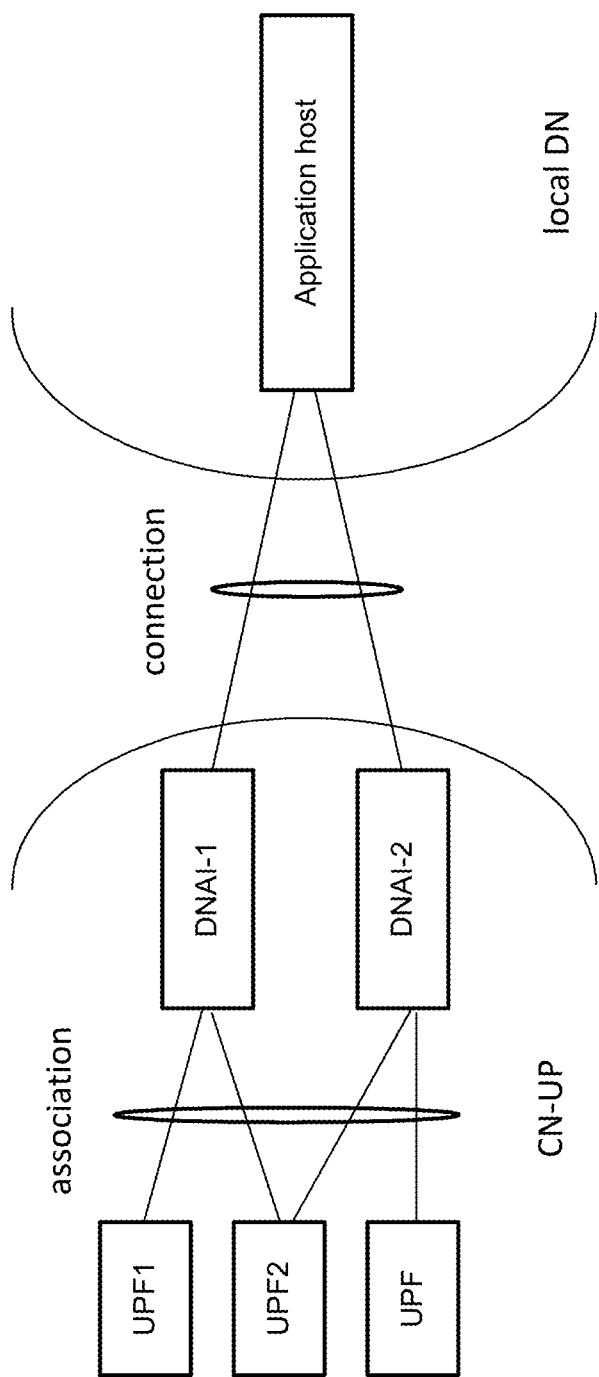
FIG. 15 is a block diagram illustrating relationships between User Plane Functions, Dynamic Network Access Identifiers, and the application host to indicate the (possibly) implicit selection of a user plane function resulting from the selection of a Dynamic Network

With reference to FIG. 15, in an embodiment of an application (re)location notification procedure, the connection information (including connection quality e.g., number of hops, performance e.g., delay, delay jitter, throughput, or attributes e.g. protocols supported and protocol parameters including protocol headers) between a DNAI (e.g., DNAI-1 or DNAI-2) and individual application hosts may be configured in the NEF 314 by a management plane entity, such as a network manager, slice manager or service manager. Alternatively, the connection information may be provided by the AF 324 to the NEF 314. The connection information for a DNAI with an application host, in some embodiments, may also be referred to as routing requirements or routing profile. In other embodiments, this connection information may be part of the routing profile.

If the AF 324 is not in the trust domain (e.g not within the CN or a network trusted by the CN), the AF 324 may interact with the PCF 316 via the NEF 314. In this case, the AF 324 may provide the potential host location of the application (or a set of locations associated with the application) to the NEF 314 in a message, such as an Application Location Notification message. The NEF 314 can select suitable DNAIs to be associated with the application in accordance with the information and the connection information described above. In some implementations, the NEF 314 can also perform the selection in accordance with QoS requirements associated with the application toward the end-to-end connection (either on a permanent basis or based on a particular session). The QoS requirements may be provided by the AF 324 at the same time other data such as the Application Location Notification message, or it may be transmitted separately. The NEF 314 may indicate the selected DNAI(s) and the respective connection information (selected portions or in full) to the PCF 316. In some implementations, the connection information (or routing profile, or routing requirement) indicated by the NEF 314 may be configured in the PCF 316 by a management plane function such as network manager, slice manager, or service manager. In such a case, the NEF may only be required to indicate a connection identifier (or routing requirement identifier, or routing profile identifier) to the PCF. In accordance with the provided connection identifier, the PCF 316 may identify the detail from its local configuration. In some implementations, the PCF 316 may obtain the connection information (or routing profile, or routing requirement profile) upfront from the NEF. In some implementations, the NEF 314 obtained the connection information (or routing profile, or routing requirement profile) from an AF 324.

Where a management plane function acts to configure a CP function, for example a configuration change to be applied to an NEF 314, the configuration may be changed after receipt of a request transmitted by an AF 324. In some implementations, a management plane function can utilize an alternative path to configure a CP function. Where conventionally a management plane function would configure CP functions through an 'Element Management' system in the management plane, in embodiments of the present invention, configuration information can be sent to a CP function through the NEF 314. In such a scenario, the management plane function can be considered to be acting as an AF that sends messages to the NEF. This allows the NEF 314 to forward configuration information or instructions without use of an Element Management system interface.

A DNAI may be associated with one or multiple UPFs 304. The association can be based on the service area of the UPFs 304 or the service area of the DNAI. For example, a UPF 304 may be associated with the DNAIs that are located within the service area of the UPF 304. In other examples, UPFs 304 located within the service area of a DNAI are associated to the DNAI. It should be understood that the service area may be defined in terms of geographic area, or it may be determined by a topological function associated with an area of the mobile network. In some embodiments, the association of a UPF 304 and a DNAI may be based on virtualization. In this case, the DNAI may be associated with a virtualization environment or platform (in some embodiments the DNAI itself may form the environment or platform). In such embodiments, the virtual UPFs instantiated within the virtualization embodiment associated with the DNAI are associated with the DNAI. A UPF 304 may be associated to one or multiple DNAIs.

Because the association between UPFs 304 and DNAIs may be pre-defined, when the NEF 314 transmits an indication of the suitable DNAIs to the PCF 316, it implicitly indicates the suitable UPFs 304. In some scenarios, the selection of a DNAI may result in the implicit selection of a subset of the available UPFs 304.

A traffic steering profile may be defined between a DNAI and each of the UPFs 304 associated with it. This traffic steering profile can be used to describe the traffic steering behavior (including the traffic steering performance such as delay, throughput, maximum PDU sessions allowed, etc., and/or routing parameters including protocol headers) of the UPF traffic toward the DNAI. The profile may be configured in PCF 306 by a management plane entity such as network manager, slice manager, or service manager. In some embodiments, a traffic steering profile may be configured in UDM 320 (Unified Data Management) or DSF (Data Storage Function—e.g. UDR 322) and the PCF 316 needs to obtain it by indicating the DNAI and the UPF 304 to the UDM 320 or DSF (e.g. UDR 322).

According to the routing profiles, the PCF 316 may select traffic steering profiles (e.g., those providing matching QoS performance or desired protocol support). The selected profiles (sometimes referred to as the suitable traffic steering profiles, or the selected suitable traffic steering profiles) or an indication of the selected profiles can be transmitted by the PCF to the SMF. The SMF may enforce, or begin to enforce, the received traffic steering policy during session establishment or session modification (or in response to session establishment or session modification). If the traffic steering profiles are also configured in the SMF, the PCF, in some embodiments, will only need to indicate the traffic steering profile identifiers. If the traffic steering profiles are not configured in the SMF, the PCF 316 may need to provide the content of the traffic steering profiles to the SMF. In some embodiments, the SMF 310 is indicated by the traffic steering profile identifiers transmitted by the PCF 316 and an indicated SMF 310 can obtain the traffic steering profile content form a 3rd CP function, such as UDM 320 or DSF (e.g. UDR 322).

An AF 324 may send requests to subscribe to UP path (re)selection notification from the SMF. The subscription can be for early notification and/or late notification. In the case of a subscription for early notification, the SMF 310 sends the notification before executing the UP path (re)selection. In the case of a subscription for late notification, the SMF 310 sends the notification after the UP path (re)selection has completed.

The AF 324 requests for subscription to UP path (re)selection notification from the SMF may contain at least:

In an implementation, traffic identifying information related to the subscription may be provided. In an implementation the traffic can be identified by the DNN if the AF is the only AF hosted in the local DN; otherwise, a combination of DNN and traffic filtering information may be used to identify the application traffic. In an implementation, the DNN may identify traffic based on: an AF request, an application identifier, and/or traffic filtering information. In an example, the DNN may be used to identify the traffic of a PDU session, and the Application Identifier may be used to indicate a particular service of a PDU Session. In the case of IP traffic, in some embodiments, traffic filtering information (e.g. an IP 5-tuple as discussed above) may be included Information on the UE(s) whose traffic is related to the subscription. This may correspond to Individual UEs, all UEs, groups of UEs, identified using either an External Identifier, External Group Identifier, MSISDN, an IP address, or an IP address prefix.

Information on when (temporal validity condition) the subscription is to apply. The absence of this information may imply the subscription shall apply immediately.

Information regarding any spatial validity condition (the geographic location(s) within which the UE(s) should be located) to determine whether the subscription applies. Absence of this information may imply that a default configuration is to be used In some embodiments, the PCF 316, based on information received from the AF (or the NEF), operator's policy and inputs from other entities (e.g., user subscription, user's quota, user's current RAT, network load status, time of day, UE location, APN . . . ), can authorize the request received from AF and either provide or select a UP path (re)selection event notification policy.

In some embodiments, the PCF 316 may provide the SMF 310 with the UP path (re)selection event notification policy. The SMF 310 may, based on local policies, take this information into account to inform the AF 324 of the (re)selection of the UP path (change of traffic steering).

UP (re)selection notification subscription may happen in a chain, for example, when an AF subscribes to NEF, which in turn subscribes to at least one of the SMF and PCF. The CP function in the middle of such a subscription chain (e.g in the above example, the NEF) will transmit a notification (in some examples this may be relaying the received notification) along the chain. The CP function may maintain its role in the subscription chain to maintain the mapping between subscription context with the prior CP function and that of the next CP function in the chain. Before relaying a notification, the CP function may process the notification and may enhance or enrich the information in the notification, reduce or simplify the information in the notification, or translate/convert the information in the notification.

The SMF 310 may notify the subscriber network function about the UP (re)selection notification (together with a subscription identifier in the UP (re)selection notification policy provided by the PCF). In other embodiments where such a notification is either not required or in embodiments where the subscriber network function can obtain the information through other functions, the SMF 310 may be configured to not transmit the notification message.

In some implementations, the subscriber network function identifier may indicate a network address associated with the subscriber network function. In some implementations, the SMF interacts with the subscriber network function using the subscriber network function identifier directly (e.g., through IP routing in the case the identifier is an IP address). In some implementations, the SMF maps the subscriber network function identifier to some routing information (e.g. tunneling information) and uses that inform to interact with the AF. In some implementations, the SMF maintains such mapping, e.g., by a configuration from the management plane functions; in some embodiments, the SMF obtains the mapping by interacting with a third CP function, e.g., the NRF or the UDM, by providing the subscriber network function identifier to the third CP function and obtaining the mapping in response.

In the case in which the AF 324 is in the trust domain (i.e., when the AF interacts with the PCF directly):

In some embodiments, the subscriber network function that the SMF 310 sends notification to is the AF 324, and the notification contains the identifier of the selected anchor UPF of the PDU session. In some embodiments, the UPF identifier indicates an address of the UPF 304.

In some embodiments, the subscriber network function that the SMF 310 sends notification to is the PCF 316, and the notification indicates the selected traffic steering profile (e.g., by the traffic steering profile identifier). The PCF 316 then identifies the corresponding DNAI and indicates the DNAI (together with a subscription identifier in UP (re)selection notification request message)—the PCF 316 is performing information translation—to the subscriber AF 324. In some embodiments, the DNAI is indicated in the format of network address.

In the case in which the AF 324 is not in the trust domain (i.e., when the AF interacts with the PCF via the NEF):

In some embodiments, the subscriber network function that the SMF sends notification to is the NEF, and the notification indicates the identifier of the selected UPF of the PDU session. The NEF can determine the address of the UPF to be exposed and the corresponding application host and can transmit the information to the subscriber AF (in some embodiments this can be done together with a subscription identifier in UP (re)selection notification request message received from the AF). In this case, the NEF can be considered to be performing at least one of information translation and information enrichment.

In some embodiments, the subscriber network function that the SMF sends notification to is the PCF, and the notification indicates the selected traffic steering profile (e.g., by the traffic steering profile identifier). The PCF can then identify the corresponding DNAI and provide an indication of the DNAI (together with a subscription identifier) to the subscriber NEF, which can then determine the address of the DNAI to be exposed and the corresponding application host and notifies the subscriber AF about the information (together with a subscription identifier in UP (re)selection notification request message received from the AF)—the PCF and in some embodiments the NEF, can be considered to be performing at least one of information translation and information enrichment.

An AF may send the above two types of requests independently. In some implementations, the AF issuing such requests is assumed to belong to the PLMN serving the UE. The AF may issue requests on behalf of other AFs not owned by the PLMN serving the UE. The core network of a 5G network can make use of a network exposure function to expose network information and capabilities to allow the AF to interact with CNFs for the purpose of influencing UP path management and traffic routing, either directly or via a NEF.

In the case of the AF interacting with the CNFs via a NEF, the information provided by the AF and the information used in the CN may be differently formatted or organized. In such a case, the NEF can be configured to perform the information processing/mapping.

In the case of the AF interacting with the CNFs directly, the AF can provide information usable by the CNFs without processing/mapping.

The information provided by the AF is converted to application-influenced UP management policies including N6-related traffic routing rules by the PCF and then routed to SMF. The SMF may, based on local policies, take this information into account to:
(re)select UPF(s) for PDU sessions.
activate mechanisms for traffic multi-homing or enforcement of an UL Classifier (UL CL). This may include, for instance, providing the UPF with traffic forwarding (e.g. break-out) rules.
inform the Application Function of the (re)selection of the UP path.

An AF may request that it be notified about the Location Information of UE(s).

In some embodiments, a system and method is provided for routing application traffic between PDU session anchors and traffic-handling AFs that supports edge computing.

When an edge computing application includes mobility functionality (e.g. the ability to move through the edge computing resources, typically to track the UE associated with the application), the network address of the application in the PDU header may not be the same as the address of the location where the application is hosted. This is because application relocation is a network behaviour not necessarily known to the UE. Because a PDU header cannot be used for enabling routing (over the N6 interface) in this case, it is equivalent to an unstructured PDU in the UL. In addition to this, use of unstructured PDUs may be application dependent, and may happen to any edge computing application. Accordingly, in some embodiments edge computing application traffic is treated as unstructured PDUs to have a unified edge computing framework.

In some embodiments, the local DN may be responsible for routing application traffic between PDU session anchors and traffic-handling AFs. In particular, the local DN may implement the N6 interface to ensure session and service continuity in the presence of UE/application mobility. In some embodiments, the local DN provides N6 related traffic routing information to the Core Network for being configured in PDU session anchors, i.e., anchor UPFs of PDU sessions associated to edge computing applications.

Edge computing enables operator and 3rd party services to be hosted in the local data networks, close (physically and/or logically (topologically)) to the UE's attachment (R)AN. The close location of the edge computing services allows for efficient service delivery as service traffic is limited to the links between the UE attachment point (e.g. the Access Node) and the edge computing resources. This leads to lower end-to-end latency for traffic between the application and the UE. Additionally, the overall transport network may experience reduced load as cross-network service traffic is reduced.

In some embodiments, there is provided a method in which the UE requests dedicated PDU sessions for traffic associated with edge computing applications. In some implementations, the UE may transmit a request to the SMF to select whether a dedicated PDU session may be used for a single edge computing application or shared by multiple edge computing applications. In some implementation, the UE may transmit the request to the SMF during the PDU session establishment procedure.

A 5G CN function can select a UPF close to the UE and executes the traffic steering from the UPF to the local Data Network via a N6 interface. The selection may be based on the UE's subscription data, location, policy or other related traffic rules.

Due to user or AF mobility, the service or session continuity may be required based on the requirements of the service or the 5G network.

The local Data Networks are responsible for proper implementation of the N6 interface to ensure service or session continuity in the presence of UE mobility and/or AF mobility and provides N6 related traffic routing information to the network.

The 5G core network may employ a network function that allows exposure of network information and capabilities to an edge computing AF.

It is noted that, depending on the operator deployment, certain AFs can be allowed to interact directly with the Control Plane Network Functions with which they need to interact, while the other AFs need to use the external exposure framework via the NEF.

In some embodiments, the functionality supporting edge computing may include, for example:
Local Routing: a core network function can select a UPF to route the user traffic to the local Data Network and configure the UPF with N6-related traffic routing information.
Traffic Steering: a core network function can select the traffic to be routed to the Application Functions in the local Data Network.
Session and service continuity to enable UE and AF mobility.
User plane selection and reselection, e.g., based on input from AF.
Network capability exposure: many core network functions can exchange information with and an AF (e.g. information about the capabilities of the functions) via a NEF.
QoS and Charging: PCF provides rules for QoS Control and Charging for the traffic routed to the local Data Network.

An AF may send requests to influence SMF routing decisions for traffic of PDU session. This may influence UPF (re)selection and allow routing user traffic to a local access to a Data Network In some embodiments, requests to influence SMF routing decisions for traffic of PDU session may contain some or all of the following:
Information to identify the traffic to be routed. The traffic can be identified by the DNN, and an application identifier or traffic filtering information.
Information on where to route the traffic, such as the DNN (e.g. if all traffic of the PDU session is routed to the application) and/or the address of the application.
Potential locations of the application to where the traffic routing should apply. The potential locations of the traffic handling AFs are used for UPF (re)selection.
N6-related traffic routing information to be configured in UPFs. The information may include, for instance, the address of the end of N6 interface in the local DN and the protocol parameters used for the N6 interface.
Information on the UE(s) whose traffic is to be routed. Individual UEs identified using a UE identifier, such as an External Identifier or MSISDN, all UEs, or selected groups of UEs.

Information on when (time indication) the traffic routing is to apply.

In the above discussion, the AF issuing such requests is assumed to belong to the PLMN serving the UE. The AF may issue requests on behalf of other applications not resident within the PLMN serving the UE.

In some embodiments, the SMF may, based on local policies, take this information into account to:
(re)select UPF(s) for PDU sessions.
activate mechanisms for traffic multi-homing or enforcement of an UL Classifier (UL CL). This may include, for instance, providing the UPF with traffic forwarding (e.g., break-out) rules.
inform the AF of the (re)selection of the UP path.

In some embodiments, an AF may request to be notified about the Location Information of UE(s). The notifications may be any or all of: one-time, in response to the AF notification request, periodic, or in response to a change in state. The change in state may be, for instance, the arrival or departure of a UE from a geographic location that that either satisfies or fails a spatial validity condition.

In an embodiment, (1) the NEF is configured with the information to allow mapping between application identifier and the IP address of application. The configuration can be performed by a management plane component, e.g. network manager, slice manager, service manager.

In an embodiment, (2) the NEF is configured with the information to allow mapping between a zone identifier and a geographic area. The configuration can be done by a management component, e.g. network manager. In some embodiments, it can be done by a third party function such as an application function or an application server. This may require interaction between the NEF and the 3rd party for the configuration. This can be used to provide customized zoning (in contrast to unified zoning in the case of configuration by the management plane).

In an embodiment, (3) The NEF translates UE location information (e.g. zone identifier, or uncoded zone information) received from the application into information (e.g. IDs) identifying the ANs that serve the geographic zone.

In an embodiment, (4) The NEF provides translated information to the selected CPF such as SMF or PCF.

In an embodiment, (5) the AF implements the NEF functionality. This can be thought of as an NEF embedded within the AF. In such cases, the interaction between NEF and CPFs takes place between CPFs and the AF, and the interaction between NEF and AF becomes AF's internal logic. In illustrated figures, this could be described as drawing a box around the NEF and AF.

In an implementation, a method is provided for connecting a UE to a network. The method including the UE providing a DNN and an application identifier in a session request; a SMF obtaining from a PCF application-influenced operator policy using UE location the DNN and the application identifier. The operator policy may be indexed in PCF by using, one of DNN, application identifier, UE identifier, location, or a combination of any or all of the choices. In some implementations, the policy may be associated with a spatial validity condition. In an implementation, according to the policy the SMF has sufficient information to allow for the selection of a UP path (e.g. anchor UPFs). The SMF may setup the UP path and configure traffic steering at the anchor UPF (e.g. traffic destined to the IP address of the application is routed to a particular location in the local DN) The SMF can configure the traffic steering because it is configured with the mapping between application identifier and the IP address of application.

In an implementation, the NEF is configured with information to enable mapping between application identifier and an address, such as an IP address, associated with the application. The configuration can be done by a management plane component, e.g. network manager, slice manager, service manager.

In an implementation, the NEF is configured with information to enable mapping between a zone identifier and a geographic area. The configuration can be done by a management component, e.g. network manager. In some embodiments, it can be done by a third party function such as an application function, an application server. This may require interaction between the NEF and the 3rd party for the configuration. This allows customized zoning (as opposed to unified zoning in the case of configuration by the management plane).

In an implementation, the NEF translates UE location information (e.g. zone identifier, or uncoded zone information) received from the application into information (e.g. IDs) indicative of the ANs that serves the geographic zone. The NEF may provide the translated information to the selected CPF such as SMF or PCF.

In some embodiments, the AF implements the NEF functionality, and the interaction between NEF and CPFs takes place between CPFs and the AF, and the interaction between NEF and AF becomes AF's internal logic.

In an implementation, a system and method is provided for maintaining an efficient UP path for AFs requiring a UP path. In an embodiment, the system and method provides for AF-Influenced SSC and UP path management that is executed between an AF and the CN CP to maintain an efficient UP path for AFs that require the UP path. The following is assumed for this embodiment:
The AFs handling the traffic from/to the UE are deployed in a local DN of the operator.
An AF is in charge of the (re)selection or relocation of the AFs within the local DN. The AF interacts with the Control Plane Network Functions either directly or via the NEF.
The NEF (or the AF itself when the AF interacts with the CN CP directly) determines the list of suitable UPFs providing an efficient UP path towards identified potential AF locations, and provides this information to the SMF.

It may also be assumed that the NEF can authenticate and validate the information received from the application function.

Figure 16:
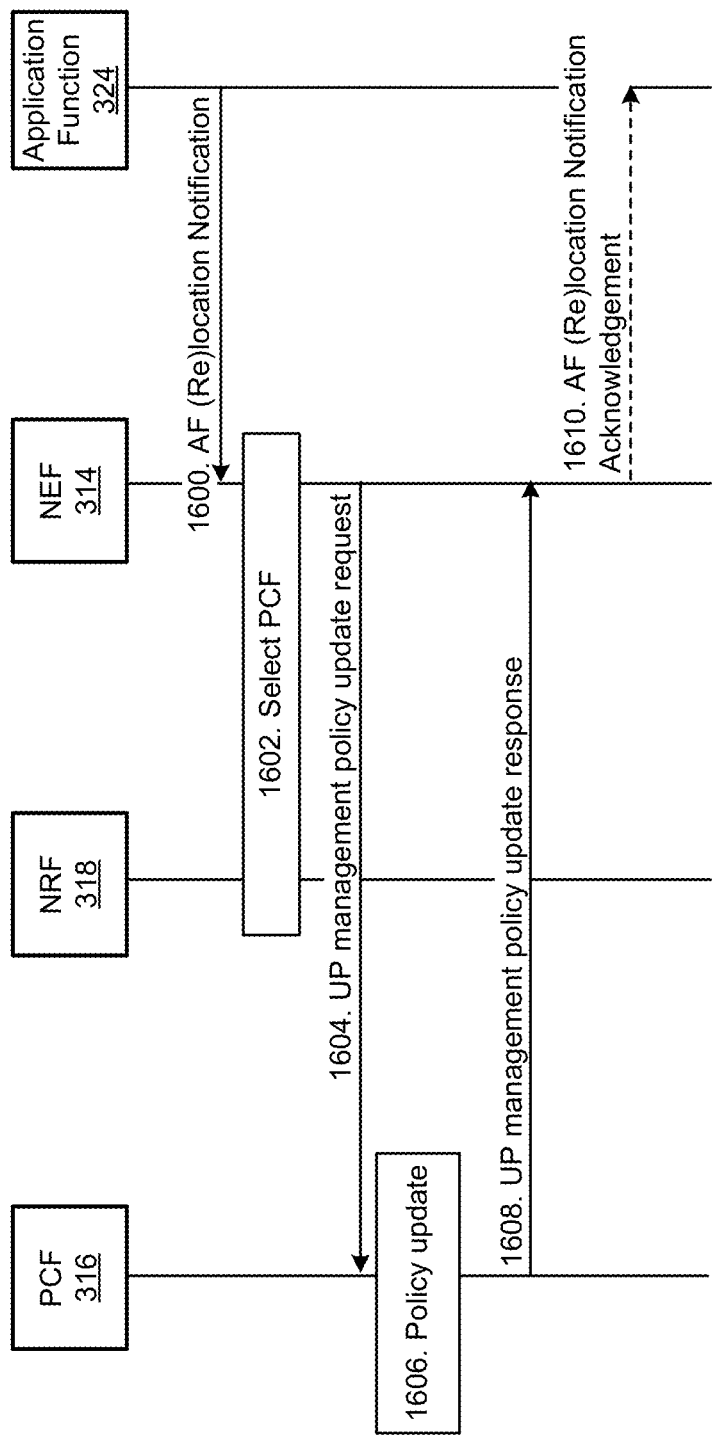
FIG. 16 is a signalling diagram illustrating an embodiment of an AF (re)location notification procedure.

FIG. 16 is a signalling diagram illustrating an embodiment of an AF (re)location notification procedure. It should be noted, however, that in certain embodiments in which an AF 324 is trusted by the operator, the AF 324 can interact directly with CN functions, such that the AF 324 also performs the role of the NEF 314 in this method. This is noted in steps 1600-1608, where the AF 324 may participate directly, rather than via the NEF 314, in those cases where the AF 324 is trusted by the operator.

In step 1600 the AF 324 sends an AF (re)location Notification (which includes application identifier, AF location information, temporal validity condition, spatial validity condition, traffic filter) to the NEF 314.

In step 1602 the NEF 314 (or the AF 324) selects a serving PCF 314 using the NRF 318. In the embodiment illustrated in FIG. 15, the serving PCF selected is PCF 318. In some embodiments (not shown), the NEF 314 provides the NRF 318 with the local DN name, the edge computing application identifier, a spatial validity condition (such as serving access nodes identifiers, geographic location or area), and the NRF 318 replies to the NEF 314 with the serving PCF according to all or any combination of these pieces of information. The information may be supplied by the AF 324, or the NEF 314 may derive the information based on input provided by the AF 324. It should be understood that the information provided by NEF 314 to NRF 318 may be provided by the AF 324. The information may be provided in a message such as the AF (re)location notification, or it may be determined or derived by the NEF 314 through information provided by the AF 324.

Next, in step 1604 the NEF 314 (or the AF 324) processes the notification and sends a UP management policy update request to the PCF 314. In step 1606, the PCF 314 then generates or updates UP management policies according to the request. If the policy generation/update impacts an ongoing PDU session and the serving SMF 310 of the PDU session has subscribed to policy update notification, the PCF 314 will notify the SMF 310 about the policy update.

In step 1608 the PCF 314 responds to the NEF 314 (or the AF 314) to acknowledge receipt of the request. In the case where the PCF 314 responds to the NEF 314 rather than the AF 324, the NEF 314 acknowledges, in step 1610, the AF (re)location Notification to the AF 324.

Figure 17:
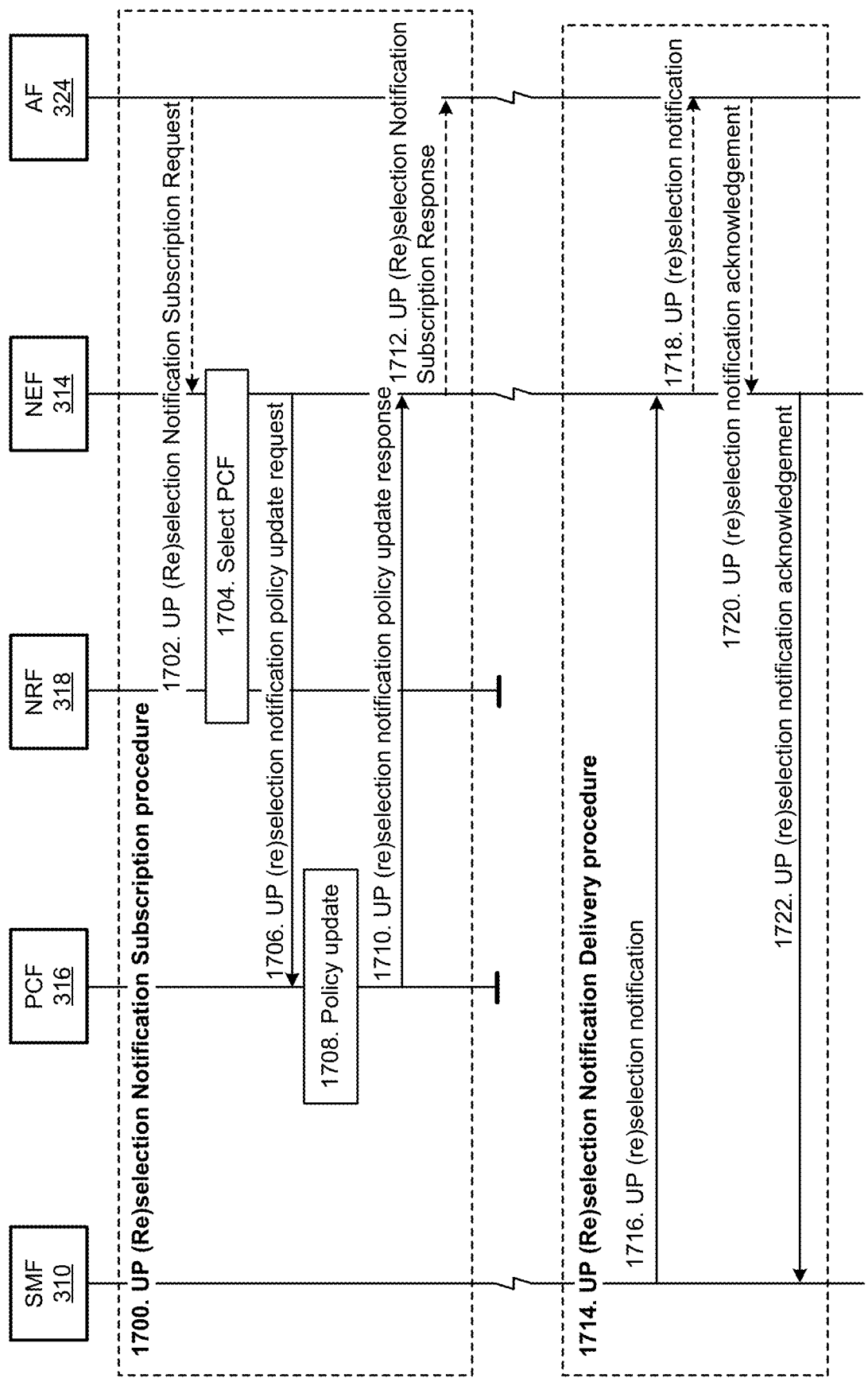
FIG. 17 is a signalling diagram illustrating an embodiment of a procedure for UE-requested PDU Session Establishment for non-roaming and roaming with local breakout.

FIG. 17 is a signalling diagram illustrating an embodiment of a UP (re)selection notification procedure. In some embodiments, the AF 324 is trusted by the operator, such that it can interact directly with the CN. In that case, the AF 324 takes the role of the NEF 314 in this procedure, and steps 1702 and 1712 are skipped, and steps 1704, 1706 and 1708 involve the AF 324 rather than the NEF 314.

The method starts with a UP (re)selection notification procedure 1700. In step 1702 of this procedure, the AF 324 sends a UP (re)selection Notification Subscription request (which includes PDU session or application identifier, temporal validity condition, spatial validity condition, traffic filter) to the NEF 314, indicating whether notifications before and/or after UP (re)selection are requested. As noted above, this step is optional and may not required in embodiments in which the AF 324 is trusted by the operator.

In step 1704 NEF 314 (or the AF 324, if it is trusted by the operator) interacts with the NRF 318 to select a PCF. In the embodiment illustrated in FIG. 16, the selected PCF is PCF 314. In some embodiments, the NEF 314 provides the NRF 318 with the local DN name, the edge computing application identifier, a spatial validity condition (such as serving access node identifiers, geographic location or area), and the NRF 318 replies to the NEF 314 with the serving PCF according to all or any combination of these pieces of information. The information may be supplied by the AF 324, or the NEF 314 may derive the information based on input provided by the AF 324. Similar to the situation described above, the information provided to the NRF 318 by the NEF 314 may be received from the 324 in a (re)selection notification subscription request. In other embodiments, the NRF 318 may determine or derive this information based on information received from the NEF 314. In step 1706 NEF 314 (or the AF 324) processes the request and sends a UP (re)selection notification policy update request to the PCF 314.

In step 1708, the PCF 314 generates or updates UP (re)selection notification policies in accordance with the received request. If the policy generation/update impacts an ongoing PDU session and the serving SMF 310 of the PDU session has subscribed to policy update notification, the PCF 314 can send a notification message to the SMF 310 about the policy update.

In step 1710, the PCF 314 responds to the NEF 314 (or the AF 324) to acknowledge the receipt of the request. In the embodiment in which the AF 324 does not interact directly with the CN, the NEF 314 can send an acknowledgement, in step 1712, of the UP (re)selection Notification Subscription to the AF 324.

Following completion of the UP (re)selection notification subscription procedure 1600, the UP (re)selection notification delivery procedure 1714 can be performed. The steps of procedure 1714 are performed as UP (re)selection takes place or as UP (re)selection notification policy update is enforced.

In step 1716 the SMF 310 transmits a UP (re)selection Notification to the NEF 314 that serves as notification to subscribers to the UP (re)selection Notification that UP (re)selection has taken place. This notification takes place before and/or after the UP (re)selection based on the type of notification requested. It indicates the PDU session location, which may include the location of the PDU session anchor and/or the IP address of the UE 102.

Early notifications allow the AF 324 to prepare the necessary steps (e.g., AF 324 mobility) related to UP (re)selection. Late notifications allow the AF 324 to configure the local DN for routing traffic from the AF 324.

In step 1718, in response to receipt of the UP (re)selection Notification the NEF 314 processes the notification and sends the UP (re)selection Notification to the AF 324. The AF 324 can then indicate the PDU session location and the corresponding application location. This step 1718 is optional and in some embodiments is only performed when the NEF 314 is used by the AF 324. In the case where the NEF 314 is not used, the AF 324 and PCF 316 can interact directly with each other and the AF 324 can implement the functions otherwise performed by the NEF 314 (e.g., the functionality related to the present procedure). If step 1718 is performed, in step 1720, the AF 324 acknowledges the delivery of the notification to the NEF 314.

In step 1722, NEF 314 (or the AF 324) acknowledges delivery of the notification to the SMF 310.

In an implementation, a "UP management policy update" service is one in which the PCF 316 receives a UP management policy update request. The request may include application identifier(s), the identifiers of the anchor UPFs suitable for selection for each of the application locations, temporal validity condition, spatial validity condition, traffic filter, and N6 traffic routing information. The output of this service is the result of the delivery of the request.

During this service, when the PCF 316 receives a UP management policy update request, the PCF 316 generates or updates UP management policies accordingly, and acknowledges the receipt of the request towards the requester. If the policy generation/update impacts an ongoing PDU session and the serving SMF 310 of the PDU session has subscribed to policy update notification, the PCF 316 will notify the SMF 310 about the policy update.

In another implementation, the "UP (re)selection notification policy update" service is one in which the PCF receives a UP (re)selection notification policy update request. The request may include application identifier, temporal validity condition, spatial validity condition, traffic filter, type of notification. The output of the service is the result of the delivery of the request.

During this service, when the PCF 316 receives a UP (re)selection notification policy update request, it can generate or update UP (re)selection notification policies accordingly, and acknowledges the receipt of the request towards the requester. If the policy generation/update impacts an ongoing PDU session and the serving SMF 310 of the PDU session has subscribed to policy update notification, the PCF 316 may notify the SMF 310 about the policy update.

In an implementation, the "AF (re)location Notification" service is one in which the NEF 314 receives a notification about the (re)location of an AF 324. The input notification may include an application identifier, AF location information, temporal validity condition, spatial validity condition, traffic filter, N6 traffic routing information. The output of the service is the result of the delivery of the AF (re)location notification.

During this service, when the NEF 314 receives an AF (re)location Notification, it processes the notification and requests the PCF 316 to update UP management policies, and acknowledges the AF (re)location Notification towards the requester.

In an implementation, the "UP (re)selection Notification Subscription" service is one in which the NEF 314 receives a subscription for UP (re)selection Notification for notifications of UP (re)selection events for specified traffic. The input subscription may include an application identifier, temporal validity condition, spatial validity condition, traffic filter, and type of notification. The output of the service is the result of the UP (re)selection notification subscription.

During this service, when the NEF 314 receives a UP (re)selection Notification subscription, it can request the PCF 316 to update UP (re)selection notification policies, and acknowledge the subscription towards the requester. When the NEF 314 receives an UP (re)selection notification, it identifies the location of the respective traffic-handling AF 324 and notifies the subscribers of the UP (re)selection notification and the traffic-handling AF location.

In an implementation, the "UP (re)selection notification" service is one in which the SMF 310 has a local policy indicating a subscription for UP (re)selection Notification for notifications of UP (re)selection events for an ongoing PDU session. The input for this service is the UP (re)selection notification policy, which may include PDU session identifier, temporal validity condition, spatial validity condition, type of notification, and subscription information. The subscription information indicates the subscriber NF. The output of this service is an UP (re)selection notification (which may include subscription information, and PDU session location information). The subscription information is used to identify the entry of the subscription context in the subscriber NF.

During this procedure, when the SMF 310 detects a local policy indicating a subscription for UP (re)selection Notification for notifications of UP (re)selection events for an ongoing PDU session, it registers the subscription indicated by the policy. When the SMF 310 (re)selects the UPF for the PDU session, it notifies the subscribers of the UP selection notification. In the case of a subscription for early notification, the SMF 310 sends the notification before executing the UPF (re)selection. In this case, the response to this notification may include N6 related traffic routing information. SMF 310 notifies NEF 314 which notifies AF 324; the AF 324 responds to NEF 314 which then responds to SMF 310. The N6 related traffic routing information may be included in the response transmitted by the AF 324 to the NEF 314. The NEF 314 may process it before sending it to the SMF 310. The processing may include complementing it with missing information pieces, which is N6 protocol specific, and protocol header compilation. The SMF 310 then configures the anchor UPF to support or use the N6 interface with a traffic handling AF, which may be the AF 324 or a different AF, according to the received N6 related traffic routing information when executing the UPF (re)selection.

In the case of a subscription for late notification, the SMF 310 sends the notification when the UPF (re)selection has completed. In an implementation, there is provided a method for PDU session establishment requested by the UE 102. In the case of roaming, the AMF 308 can determine if a PDU session is to be established in Local Breakout (LBO) or Home Routing. In the case of LBO, the procedure is as in the case of non-roaming with the difference that any or all of the SMF 310, the UPF 304 and the PCF 316 can be located in the visited network.

Figure 18A:
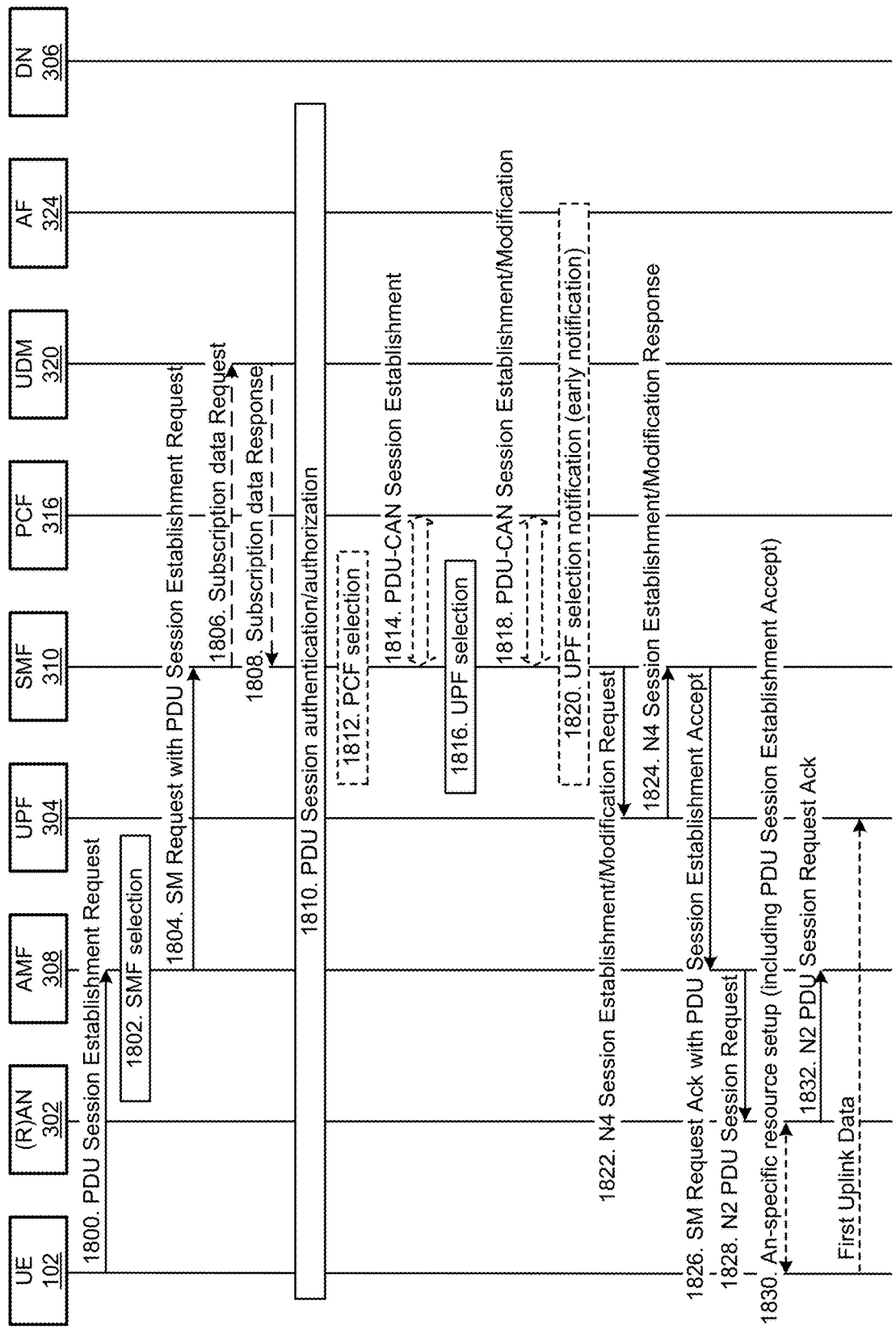
FIGS. 18A and 18B show a signalling diagram illustrating an embodiment of a PDU session anchor reconfiguration due to application relocation.
Figure 18B:
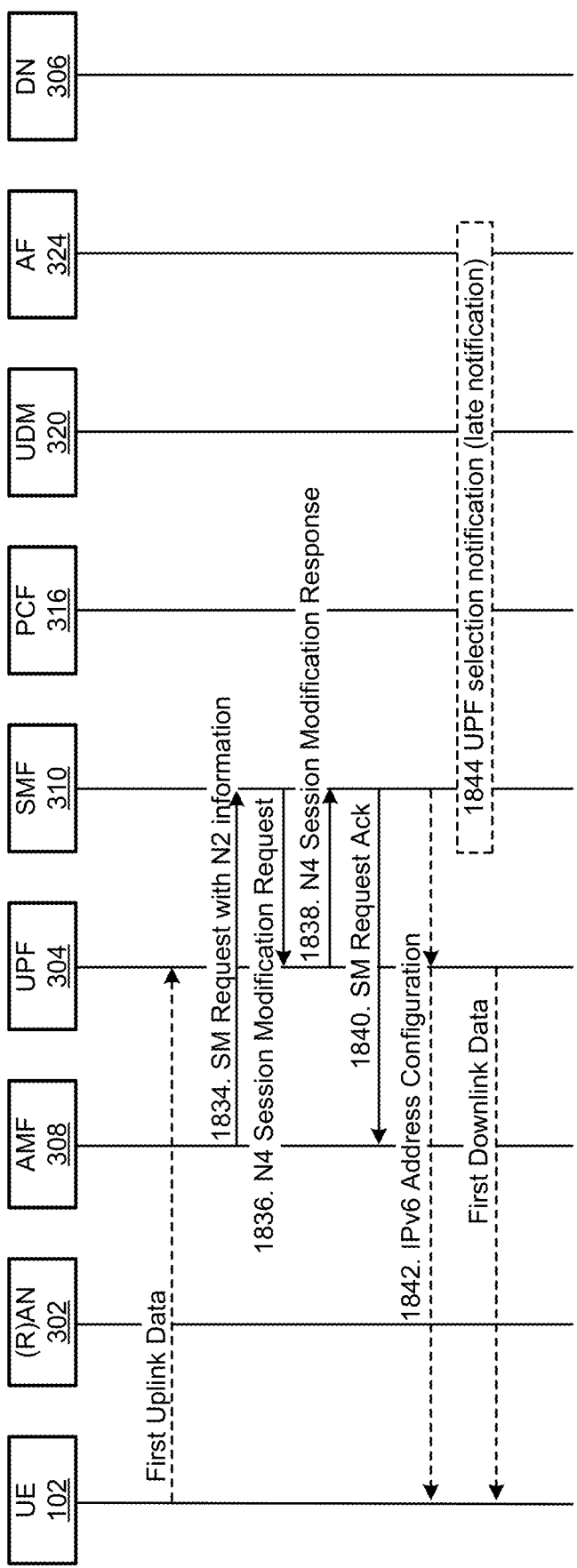

FIGS. 18A and 18B present a signalling diagram illustrating an embodiment of a procedure for UE-requested PDU Session Establishment for non-roaming and roaming with local breakout. The procedure assumes that the UE 102 has already registered on the AMF 308, thus, the AMF 308 has already retrieved the user subscription data from the UDM 320.

In order to establish a new PDU session, the UE 102 generates a new PDU Session ID. The UE 102 initiates the UE Requested PDU Session establishment procedure by, in step 1800 transmitting an NAS Message (S-NSSAI, DNN, application identifier, PDU Session ID, N1 SM information (note that in some embodiments the application identifier may be embedded in the SM information)) containing a PDU Session Establishment Request within the N1 SM information to the AMF 308. The PDU Session Establishment Request may include a PDU Type, SSC mode, Protocol Configuration Options.

When the DNN points to a local DN, the NAS message may include an application identifier corresponding to an Edge Computing application hosted in the local DN. The presence of the application identifier indicates it is a request for a PDU session dedicated for the Edge Computing application.

The NAS message sent by the UE 102 is encapsulated by the AN 308 in a N2 message that should include User location information and Access Technology Type Information.

The SM information may contain SM PDU DN Request Container containing information for the PDU session authorization by the external DN.

In step 1802 the AMF 308 determines that the message corresponds to a request for a new PDU Session based on the PDU Session ID that is not used for any existing PDU Session(s) of the UE. The AMF 308 selects an SMF 310.

In step 1804 the AMF 308 transmits an SM Request to SMF 310. The SM Request contains Subscriber Permanent ID, DNN, S-NSSAI, PDU Session ID, AMF ID, N1 SM information, User location information, and Access Technology Type. The AMF ID uniquely identifies the AMF 308 serving the UE 102. The N1 SM information contains the PDU Session Establishment Request received from the UE 102.

In step 1806 the SMF 310 transmits the Subscription Data Request (Subscriber Permanent ID, DNN) to the UDM 320. This step is optional and may be performed if the SMF 310 has not yet retrieved the SM-related subscription data for the UE related with the DNN, the SMF 310 requests this subscription data.

If step 1806 is performed, then, in step 1808, the UDM 320 transmits a Subscription Data Response to the SMF 310. Subscription data includes the authorized PDU type(s), authorized SSC mode(s), Default QoS profile.

The SMF 310 checks whether the UE request is compliant with the user subscription and with local policies. If it is not compliant then the SMF 310 rejects the UE request via NAS SM signalling (including a relevant SM rejection cause)

relayed by the AMF 308, the SMF 310 indicates to the AMF 308 that the PDU session ID is to be considered as released and the rest of the procedure is skipped.

Step 1810 is the PDU session authentication/authorization, which is from the SMF 310 to DN 306 via UPF 304. If the SMF 310 needs to authorize/authenticate the establishment of the PDU session, the SMF 310 selects an UPF 304 and triggers the PDU session establishment authentication/authorization. If the PDU session establishment authentication/authorization fails, the SMF 310 terminates the PDU session establishment procedure and indicates a rejection to the UE 102.

If dynamic Policy and Charging Control (PCC) is deployed, then, in step 1812, the SMF 310 performs PCF selection. In step 1814, the SMF 310 may initiate PDU-CAN Session Establishment towards the PCF 316 to obtain the default PCC Rules for the PDU Session. It is noted that, in this particular embodiment a purpose of step 1810 is to receive PCC rules before selecting UPF 304. If PCC rules are not needed as input for UPF selection, step 1810 can be skipped.

In step 1816 the SMF 310 selects an SSC mode for the PDU Session. If step 1710 is not performed, the SMF 310 may also select an UPF 304 during this step. In case of PDU Type IPv4 or IPv6, the SMF 310 can allocate an IP address/prefix for the PDU Session.

If dynamic PCC is deployed and the PDU-CAN Session Establishment was not performed in step 1814, then at step 1818 the SMF 310 can initiate PDU-CAN Session Establishment towards the PCF 316 to get the default PCC Rules for the PDU Session. Otherwise, if dynamic PCC is deployed and PDU Type is IPv4 or IPv6, SMF initiates PDU-CAN Session Modification and provides the allocated UE IP address/prefix to the PCF 316.

In step 1820 the SMF 310 notifies the AF 324 about the UP path selection, if the PDU session request is for an Edge Computing application and if the AF 324 has subscribed to such an early notification related to the PDU session. The notification indicates the PDU session anchor.

If step 1810 was not performed, then the SMF initiates an N4 Session Establishment procedure with the selected UPF 304, otherwise it initiates an N4 Session Modification procedure with the selected UPF 304 as illustrated in FIG. 17. In particular, in step 1822, the SMF sends an N4 Session Establishment/Modification Request to the UPF 304 and provides Packet detection, enforcement and reporting rules to be installed on the UPF 304 for this PDU Session. If CN Tunnel Info is allocated by the SMF 310, the CN Tunnel Info is provided to UPF 304 in this step. Then, at step 1824, the UPF 304 acknowledges by sending an N4 Session Establishment/Modification Response. If CN Tunnel Info is allocated by the UPF 304, the CN Tunnel Info is provided to SMF 310 in this step 1824.

In step 1826, the SMF 310 sends an SM Request Ack (N2 SM information (PDU Session ID, QoS Profile, CN Tunnel Info), N1 SM information (PDU Session Establishment Accept (Authorized QoS Rule, SSC mode))) to the AMF 308.

The N2 SM information carries information that the AMF 308 can provide to the (R)AN 302. The CN Tunnel Info may correspond to the Core Network address of the N3 tunnel corresponding to the PDU session. The QoS Profile can provide the (R)AN 302 with the mapping between QoS parameters and QoS Flow Identifiers. The PDU Session ID may be used by (R)AN signalling with the UE 102 to indicate to the UE 102 the association between (R)AN resources and a PDU session for the UE 102. The N1 SM information may contain the PDU Session Establishment Accept that the AMF provides to the UE 102. Multiple Authorized QoS Rules may be included in the PDU Session Establishment Accept within the N1 SM information and in the N2 SM information. The SM Request Ack can further contain information allowing the AMF 308 to know or determine which UE 102 is the target of the SMF 310 request as well to determine which access towards the UE 102 to use.

It is noted that the access information may be provided/used to enable the case where a UE is simultaneously connected over 3GPP and Non 3GPP access.

In step 1828 AMF 308 sends an N2 PDU Session Request (N2 SM information, PDU Session Establishment Accept) to (R)AN 302. The AMF 308 sends the PDU Session Establishment Accept and the N2 SM information received from the SMF 310 within the N2 PDU Session Request to the (R)AN 302.

In step 1830 the (R)AN 302 may start an AN specific signalling exchange with the UE 102 that is related to the information received from SMF 310. For example, in case of a 3GPP RAN, an RRC Connection Reconfiguration may take place with the UE 102 establishing the necessary RAN resources related to the Authorized QoS Rules for the PDU Session request received in step 1822.

(R)AN 302 can also allocate (R)AN tunnel information for the PDU Session. (R)AN 302 can forward the NAS message (PDU Session Establishment Accept) provided in step 1824 to the UE 102. (R)AN 302 may provide the NAS message to the UE 102 when the necessary (R)AN resources are established and the allocation of (R)AN tunnel information are successful.

In step 1832 (R)AN 302 sends a N2 PDU Session Request Ack ((R)AN Tunnel Info) to AMF 308. The (R)AN Tunnel Information may correspond to the Access Network address of the N3 tunnel corresponding to the PDU session.

In step 1834 the AMF 308 can send the SM Request (N2 SM information) to SMF 310. More specifically, the AMF 308 forwards the N2 SM information received from (R)AN 302 to the SMF 310.

In some implementations, the UE 102 can notify a CN Function it has successfully established the PDU Session. In some implementations, the UE 102 transmits a NAS PDU Session Establishment Complete message to indicate that the UE 102 has successfully established the PDU Session. In some implementations, successful establishment of a session in (R)AN 302 indicated in step 1828 serves as the notification.

If the N4 session for this PDU Session was not established already, the SMF 310, in step 1836, initiates an N4 Session Establishment procedure with the UPF 304. Otherwise, the SMF 310 initiates an N4 Session Modification procedure with the UPF 304. The SMF 310 provides AN Tunnel Info and CN Tunnel Info. The CN Tunnel Info only needs to be provided if the SMF 310 selected CN Tunnel Info in step 1718.

In step 1838 the UPF 304 transmits to the SMF 310 a N4 Session Establishment/Modification Response. Following this step, the AMF 308 can forward notification of relevant events to the SMF 310, e.g., at handover where the (R)AN Tunnel Info changes or the AMF 308 is relocated. In some embodiments, the SMF 310 explicitly subscribes to these events. In other embodiments, the subscription is implicit. In optional step 1842 the SMF 310 forwards IPv6 Address Configuration to UE 102, via UPF 304. In particular, in the case of PDU Type IPv6, the SMF 310 generates an IPv6 Router Advertisement and sends it to the UE 102 via N4 and the UPF 304. It should be understood that in some embodiments, after step 1838, the SMF can send an SM Request Acknowledgement (shown as 1840) to the AMF 308. This may be a response to the SM Request message 1724.

In step 1844 SMF 310 transmits to the AF 324 a UPF selection notification (late notification) message that informs the AF 324 about the UP path selection, if the PDU session request is for an Edge Computing application and if the AF 324 has subscribed to such a late notification related to the PDU session. The notification indicates the PDU session anchor. the AMF 308 may store, for the lifetime of the PDU session, an association of the PDU session ID and the SMF ID.

In an embodiment, there is provided a procedure for AF-influenced SSC and UP path management in edge computing scenarios. The procedure is between an AF and the CN CP to maintain an efficient UP path for AFs that require it. For this procedure, it is assumed that the local Data Networks that host Edge Computing applications are responsible for the proper implementation of N6 interface to ensure service or session continuity in the presence of UE mobility and/or AF mobility. In this case, UP path reselection may be transparent to the UE 5.

Figure 19:
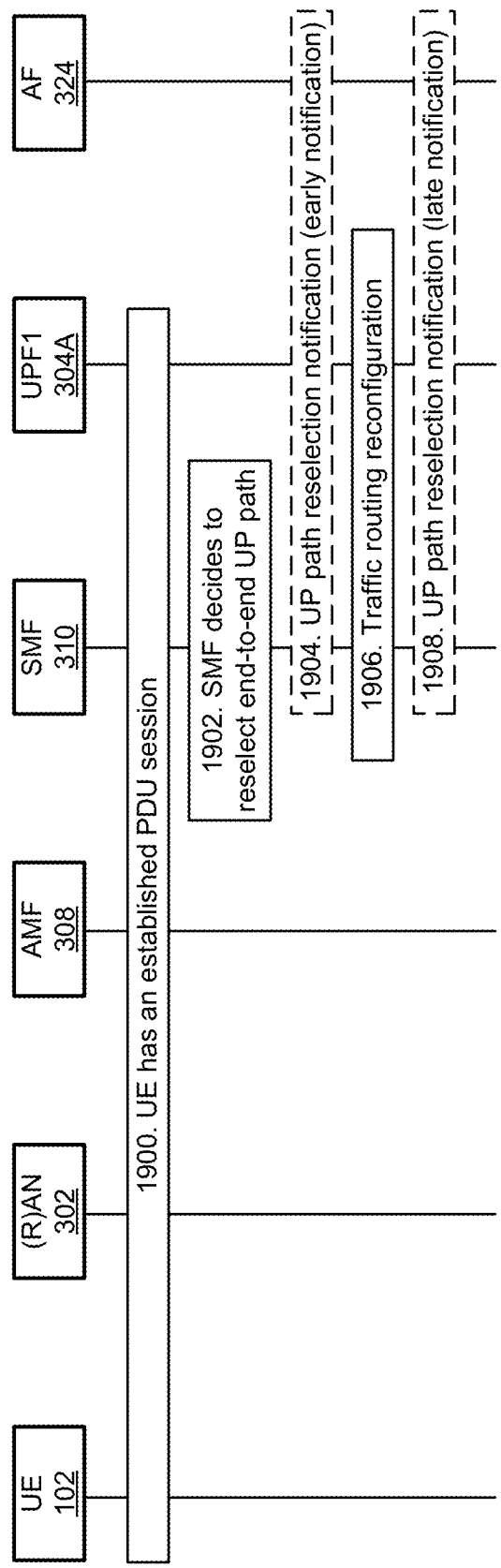
FIG. 19 is a signalling diagram illustrating an embodiment of a method for PDU session anchor relocation for a PDU session dedicated to an Edge Computing application.

In one implementation, the PDU session anchor reconfiguration is due to application relocation. In this case, the application relocation does not impact the SMF's UPF selection decision and the SMF 10 only needs to re-configure the N6 traffic routing at the PDU session anchor to ensure UL traffic delivery to the new traffic-handling AF location and recognition of DL traffic from the new traffic-handling AF location FIG. 19 is a signalling diagram illustrating an embodiment of a PDU session anchor reconfiguration due to application relocation. As shown in FIG. 19, at step 1900 the UE 102 has an established PDU session with the UPF1 304A as the PDU session anchor. In step 1902 the SMF 310 receives a trigger to update the N6 traffic routing configuration at the UPF1 304A. This can be triggered by, for example, the application relocation, policy change, etc. In step 1904 the SMF 310 notifies the AF 324 about the UP path reselection, if the AF 324 has subscribed to such an early notification. The notification indicates the UPF1 304A as the PDU session anchor. Next, in step 1906, the SMF 310 reconfigures the N6 traffic routing at the UPF1 304A. In step 1908 the SMF 310 notifies the AF 324 about the UP path reselection, if the AF 324 has subscribed to such a late notification. The notification indicates the UPF1 304A as the new PDU session anchor. In some embodiments, AF 324 subscribes to early notification only, such that step 1908 is not performed. In some embodiments, AF 324 subscribes to late notification only, such that step 1904 is not performed. In other embodiments AF 324 subscribes to both early and late notification, such that steps 1904 and 1908 are both performed.

In another implementation, the PDU session anchor relocation is for a PDU session dedicated to an Edge Computing application. In this case, the traffic carried by the PDU session is associated only to the Edge Computing application. If the SMF decides to reselect the PDU session anchor for the PDU session, it will move all the traffic associated to the PDU session to the new PDU session anchor and then release the old PDU session anchor.

Figure 20:
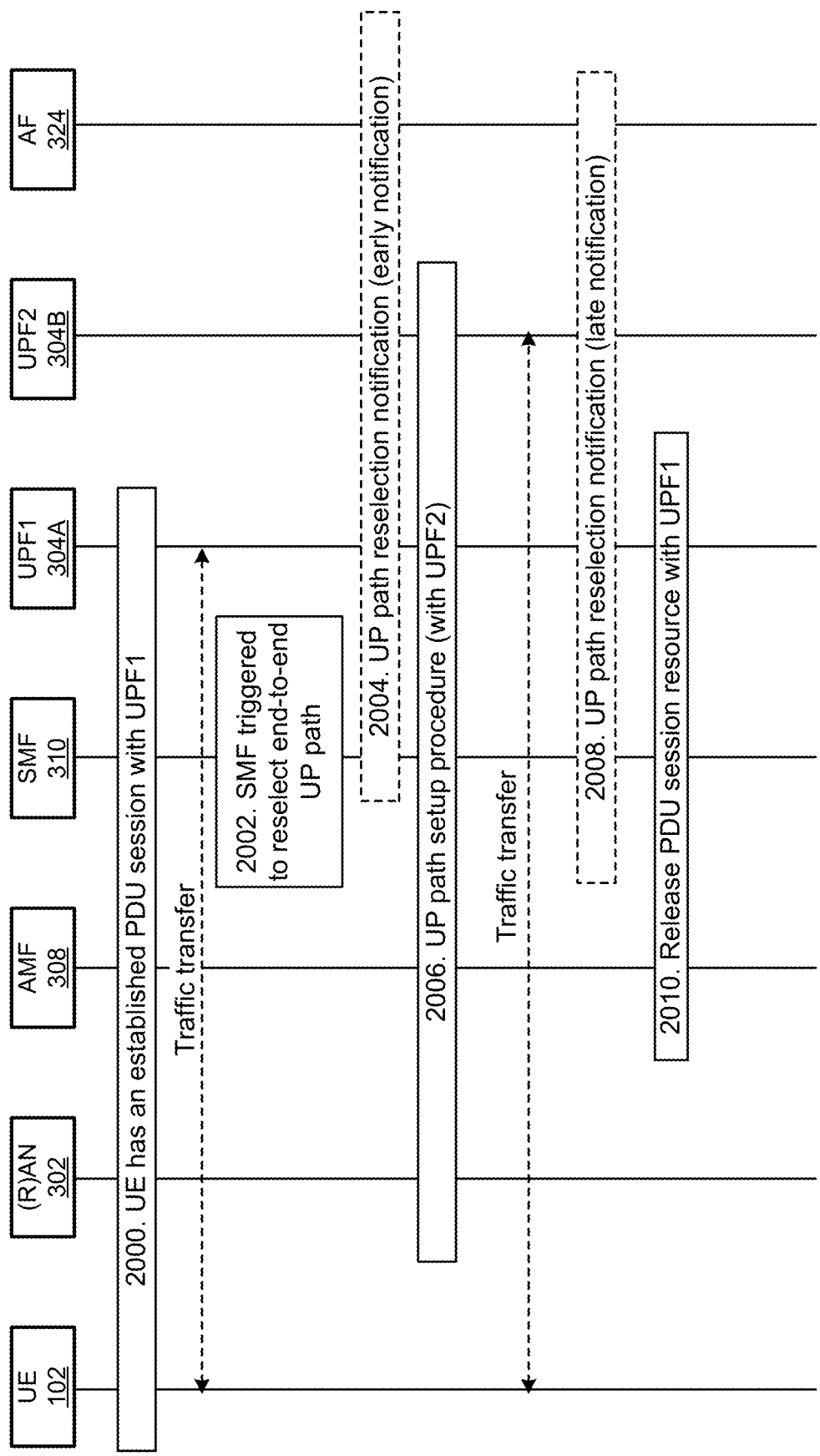
FIG. 20 is a signalling diagram illustrating an embodiment of a method for PDU session anchor relocation for a PDU session shared by multiple Edge Computing applications.

FIG. 20 is a signalling diagram illustrating an embodiment of a method for PDU session anchor relocation for a PDU session dedicated to an Edge Computing application. As shown in FIG. 20, at step 2000, the UE 102 has an established PDU session with the UPF1 304A as the PDU session anchor. The PDU session is dedicated for the traffic associated to the Edge Computing application. In step 2002 the SMF 310 receives a trigger to reselect the UPF2 304B as PDU session anchor. This can be triggered, for example, by the application relocation, UE mobility, policy change, etc. In step 2004 the SMF 310 notifies the AF 324 about the UP path reselection, if the AF 324 has subscribed to such an early notification. The notification indicates the UPF2 304B as the new PDU session anchor. In step 2006 the SMF 310 reconfigures the UP path with the UPF2 304B as the PDU session anchor, including the N6 traffic routing configuration at the UPF2 304B. In step 2008 the SMF 310 notifies the AF 324 about the UP path reselection, if the AF 324 has subscribed to such a late notification. The notification indicates the new PDU session anchor is UPF2 304B. In some embodiments, AF 324 subscribes to early notification only, such that step 2008 is not performed. In some embodiments, AF 324 subscribes to late notification only, such that step 2004 is not performed. In other embodiments AF 324 subscribes to both early and late notification, such that steps 2004 and 2008 are both performed. In step 2010 the SMF 310 releases the PDU session resource with UPF1 304A.

In another implementation, the PDU session anchor relocation is for a PDU session shared by multiple Edge Computing applications. In this case, the PDU session carries traffic associated to multiple Edge Computing applications. If the SMF 310 is triggered to reselect the PDU session anchor for one Edge Computing application, it will configure an UPF as Uplink Classifier UL (CL) so that the traffic associated to that Edge Computing application is forwarded from the UL CL to the new PDU session anchor while the other traffic is forwarded to the old PDU session anchor.

Figure 21:
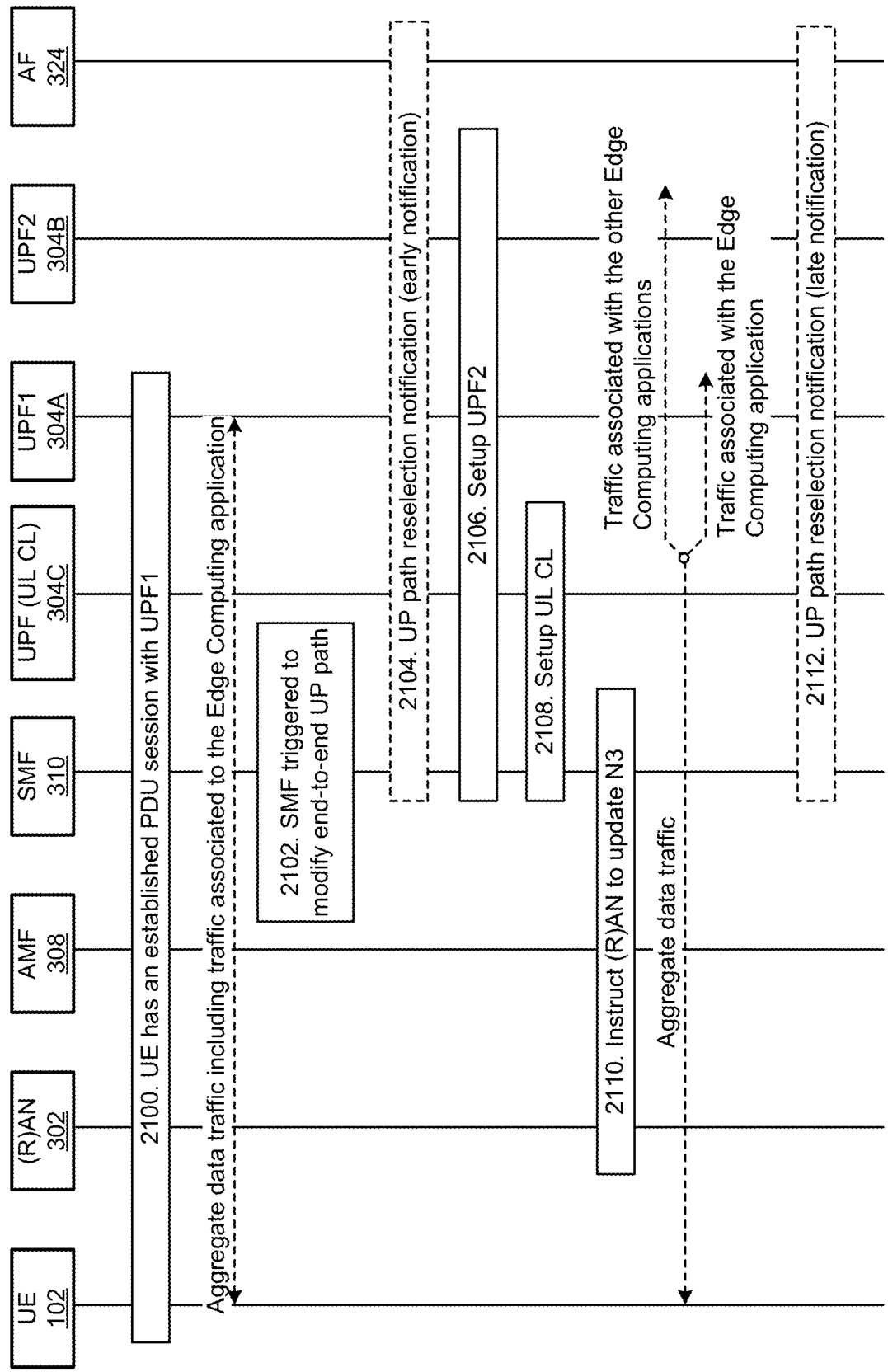
FIG. 21 is a simplified network diagram is provided illustrating an embodiment of segmented management.

FIG. 21 is a signalling diagram illustrating an embodiment of a method for PDU session anchor relocation for a PDU session shared by multiple Edge Computing applications. As shown in FIG. 21, at step 2100, the UE 102 has an established PDU session with the UPF1 304A as the PDU session anchor for the traffic associated to the Edge Computing application. In step 2102 the SMF 310 decides to reselect the UPF2 304B as the PDU session anchor for the traffic associated to the Edge Computing application. This can be triggered, for example, by the application relocation, UE mobility, policy change, etc. In step 2104 the SMF 310 notifies the AF 324 about the UP path reselection, if the AF 324 has subscribed to such an early notification. The notification indicates the UPF2 304B as the new PDU session anchor for the traffic associated to the Edge Computing application. In step 2106 the SMF 310 configures the UPF2 304B via N4 to be the new PDU session anchor for the traffic associated to the Edge Computing application. In step 2108 the SMF 310 configures via N4 an UPF as a UL CL 304C for the PDU Session and sets up the two branches from the UL CL 304C to the UPF1 304A and the UPF2 304B. The SMF 310 provides the UL CL 304C with the necessary UL traffic forwarding rules. The SMF 310 then instructs, in step 2110, the (R)AN 302 to update N3. In step 2112, the SMF 310 notifies the AF 324 about the UP path reselection, if the AF 324 has subscribed to such a late notification. The notification indicates the UPF2 302B as the new PDU session anchor for the traffic associated to the Edge Computing application. In some embodiments, AF 324 subscribes to early notification only, such that step 2112 is not performed. In some embodiments, AF 324 subscribes to late notification only, such that step 2104 is not performed. In other embodiments, AF 324 subscribes to both early and late notification, such that steps 2104 and 2112 are both performed.

In some circumstances, the network address (e.g. IP address) of an AF 324 (an edge computing application) known to the UE 102 does not indicate the actual location where the AF 324 is hosted (e.g. the IP address may not point to the server on which the AF is instantiated). This may arise, for instance, due to AF mobility, and may be more common in a virtualized environment. As a result, the IP address of the AF 324 may not work in all uplink (UL) communications from the UE 102.

In some embodiments, joint management of the CN-UP and the local DN may be employed. A NEF (a CP function in CN) determines the interconnection between UPFs and physical hosts of AFs (i.e., edge computing applications). The NEF may determine the interconnecting based on the AF information provided by the MEC controller and pre-configured information of topology between UPF and AF hosts. The NEF compiles protocol parameters for the interconnection between UPFs and AF hosts. The compilation may be based on the protocol information provided by MEC controller and the UE and/or session information provided by other CPFs. The NEF instructs the PCF to generate policies according to the management decision. The management decision is on a per session/session group, per UE/UE group, or per application/service basis A MEC controller manages serving function chaining within the local DN and manages/configures AF hosts for the interface with UPFs based on the UPF and/or UE information provided by the CN-CP. The management is on a per session/session group, per UE/UE group, or per application/service basis.

Figure 22:
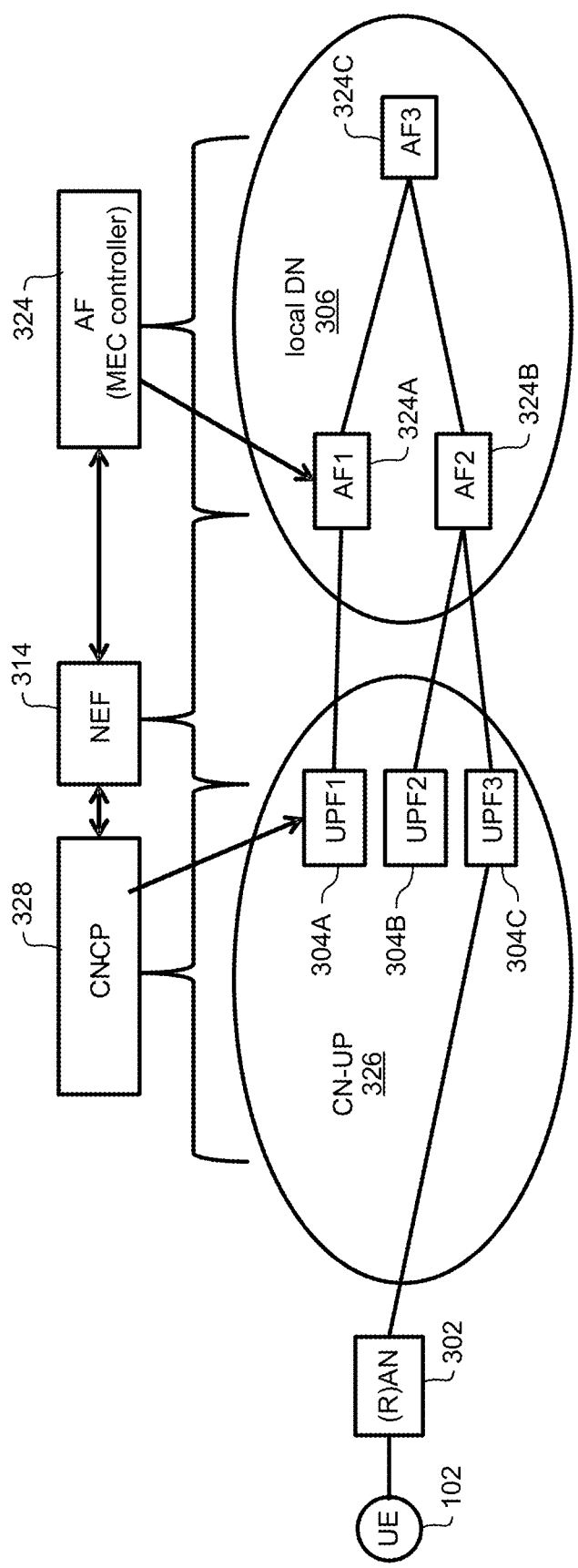
FIG. 22 is a simplified network diagram illustrating segmented management in accordance with embodiments of the present invention.

A SMF (a CP function in CN) manages and configures the path and protocols between RAN and anchor UPF and configures and anchor UPF for the interface with AF hosts according to the policies provided by the PCF including protocol parameters and routing destination. The SMF may further provide the MEC controller (directly or via NEF), with information related to the anchor UPF and/or the UE. The management is on a per session basis Referring to FIG. 22, a simplified network diagram is provided illustrating segmented management. The CN-CP 328 manages the CN-UP 326 and a MEC controller 324 manages the MEC in the local DN 306. The NEF 314 manages the linkages between the CN-UP 326 and the local DN 306. Those skilled in the art will appreciate that the linkages managed by the NEF 314 may be understood to be logical links between network functions in the CN-UP 326 and local DN 306.

A UE 102 may discover MEC applications by sending a discovery request to a CP function. The request may include a local DN name requesting discovery of the MEC applications hosted inside the specified local DN. In some implementations, the absence of a local DN name indicates that a discovery of all MEC applications is requested. The CP function responds to the UE with the discovery result. The discovery result includes list of <application identifier, [application address]>, where [ ] indicates the information is optional. In some embodiments, the discovery results are limited to those MEC applications available to the UE 102 or those MEC applications that the UE 102 is authorized to use. The application address is used by the UE 102 for upper layer (such as TCP layer) communication with the MEC application. The MEC application information may be maintained by NRF 318 or stored in UDM 320 or SMF 310. The CP function can be any relevant CP function, including for example AMF 308, NEF 314, SMF 310, NRF 318. The CP function needs to interact with the NRF 318 or the UDM 320 or SMF 310 to obtain the requested MEC app info before replying to the UE 102. The CP function can also be the NRF 318 or the UDM 320 or SMF 310. In embodiments where the CP function is AMF 308, the discovery procedure can be integrated with registration procedure, i.e. in the registration complete message (to the UE 102), the AMF 308 may include the discovery result.

The CP function may notify the UE 102 about changes in the discovery result, such as an application address change, through an NAS message. The UE 102 may submit a request for dedicated PDU sessions to handle traffic associated to Edge Computing applications. Such a dedicated PDU session may be used for a single Edge Computing application or shared by multiple Edge Computing applications.

In some implementations, the UE's request may specify whether the dedicated PDU session is for use with a single Edge Computing application or shared by multiple Edge Computing applications. In some implementations, if the UE 102 requests use with a single Edge Computing application, the UE 102 may indicate the application to the SMF 310 during the PDU session establishment procedure. The SMF 310 may indicate to the UE 102 the address of the application during session establishment acceptance step.

Joint management resolves the addressing issue in UL communications. While not required, using joint management for DL communications joint management allows the UE IP address to be decoupled from anchor UPFs, i.e. transparent UPF reselection. Anchor UPF reselection may be due to UE mobility, AF mobility, loading, etc. The UE IP address does not need to change as anchor UPF changes.

Figure 23:
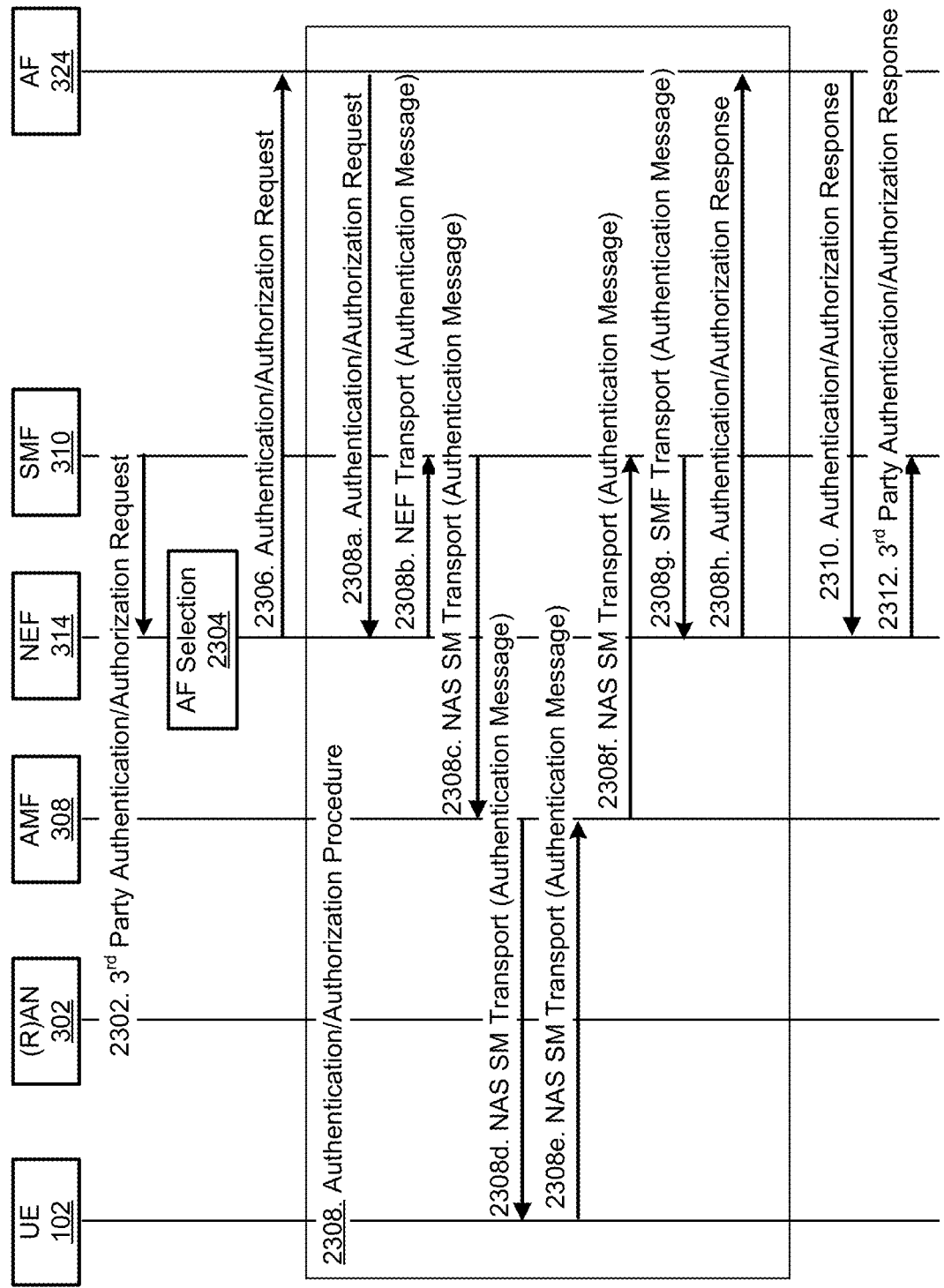
FIG. 23 is a call flow diagram illustrating respective example processes in accordance with embodiments of the present invention.

FIG. 23 is a message flow diagram illustrating representative procedures for $3^{rd}$ party authentication/authorization via the NEF 314. The $3^{rd}$ party authentication/authorization for PDU session establishment is optionally triggered by the SMF 310 during a PDU session establishment procedure and performed via the NEF 314.

Those skilled in the art will appreciate that in reference to this figure, and to the other figures of the application, there may be discussion of a network function triggering a process. This should be understood to include a network function transmitting a request or a notification to another network function, as well as including a network function initiating an internal process that may result in the transmission of a request or notification to another network function. In reference to a function triggering a process, the understanding of the term "trigger" should not be constrained to a meaning in which a state of the function or another such characteristic is compared to a threshold, and in response to the comparison a process is invoked.

In step 2302 the SMF sends a request for a 3rd party authentication/authorization to the NEF 314. As a part of this request, the SMF 310 may provide the NEF 314 with the SM PDU AF Request Container in a $3^{rd}$ party authentication/authorization request message. The request message may include the DNN, S-NSSAI and/or the application identifier. The application identifier, as described previously, may be provided by the UE 102 as part of the PDU session establishment request.

In step 2304 the NEF 314 selects an AF 324 using the information received in step 2302. In step 2306 the NEF 314 relays to the selected AF 324 the SM PDU AF Request Container received from the SMF 310 using an authentication/authorization request message. The request message may further include the application identifier.

An authentication/authorization procedure 2308 takes place between the UE 102 and the AF 324 with messages transported via the NEF 314, the SMF 310 and NAS. In step 2308a the AF transmits an Authentication/Authorization request to the NEF 314. Responsive to the Authentication/Authorization Request, in step 2308*b* the NEF 314 transmits an NEF Transport (Authentication Message) to the SMF 310, where the Authentication Message includes authentication/authorization request information received from the AF 324 for the UE 102 in the step 2308*a*. Responsive to receiving the NEF Transport (Authentication Message), in step 2308*c* the SMF 310 transmits a NAS SM Transport (Authentication Message) to the AMF 314. In step 2308*d* the AMF 324 then forwards the NAS SM Transport (Authentication Message) to the UE 102 via the (R)AN 302. In step 2308*e* the UE 102 responds by transmitting a NAS SM Transport (Authentication Message) to the AMF 308 via the (R)AN 302, where the Authentication Message is intended for the AF 324. In step 2308*f* the AMF 308 transmits the NAS SM Transport (Authentication Message) to the SMF 310. Responsive to receiving the NAS SM Transport (Authentication Message) in step 2308*g* the SMF 310 transmits an SMF Transport (Authentication Message) to the NEF 314. Responsive to receiving the SMF Transport (Authentication Message), in step 2308*h* the NEF 314 transmits an Authentication/Authorization Response to the AF 324. It should be understood that alternate procedures comprised of different steps may also be suitable for use.

In step 2310 the AF 324 based on the Authentication Message of the UE 102 concludes the authentication/authorization and sends an authentication/authorization response message to the NEF 314, to confirm the successful authentication/authorization of the PDU session or a failure. The AF 324 may provide a SM PDU AF Response Container to the NEF 314 to indicate successful authentication/authorization or failure. The SM PDU AF Response Container may include the identifier(s) of application(s) with which the UE 102 is authorized to use the PDU session.

In step 2312 the NEF 314 sends a 3$^{rd}$ party authentication/authorization response message to the SMF 310 containing the SM PDU AF Response Container.

Figure 24:
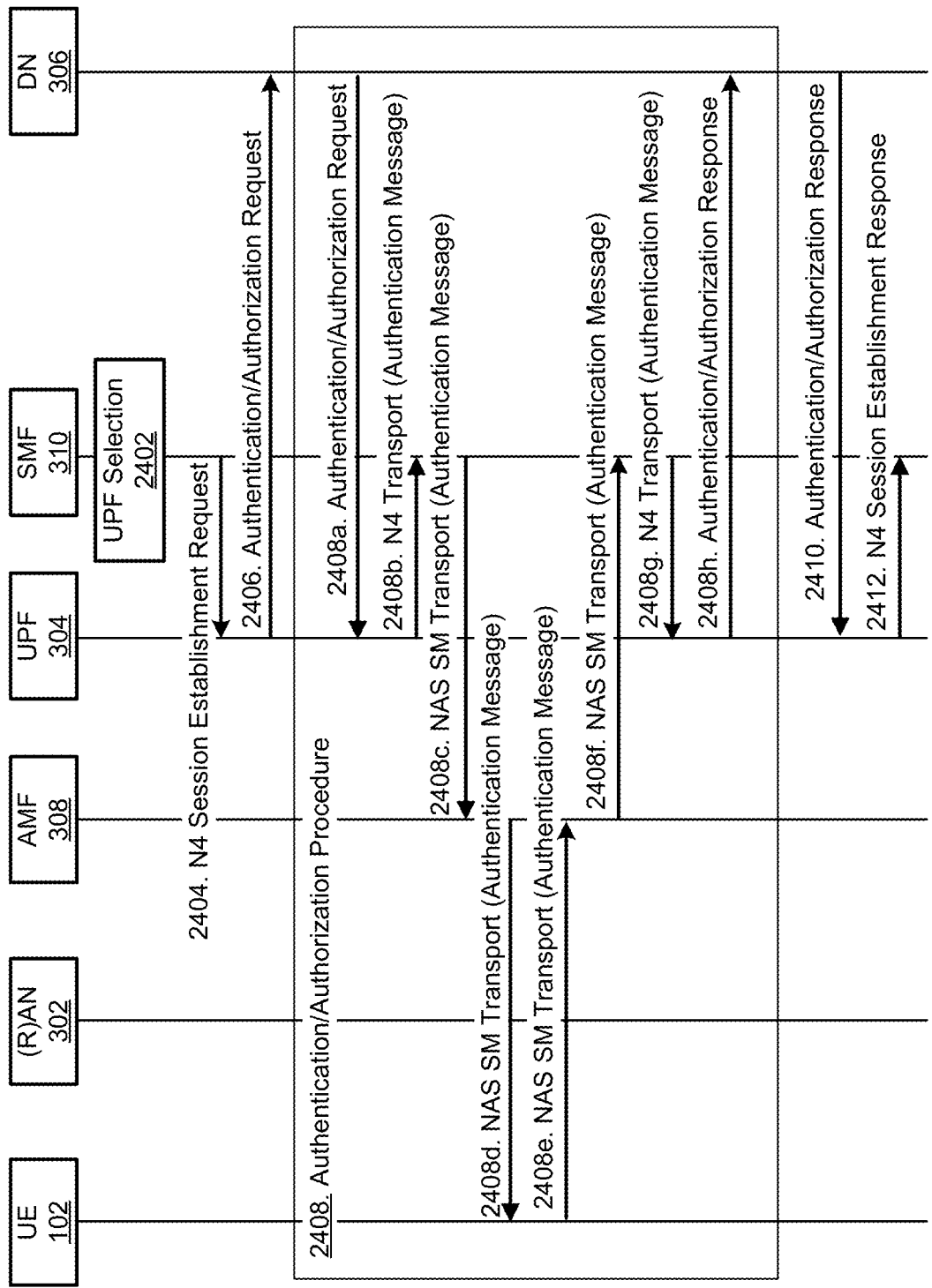
FIG. 24 is a call flow diagram illustrating respective example processes in accordance with embodiments of the present invention.

FIG. 24 is a call flow diagram illustration representative procedures for PDU session establishment authentication/authorization.

In step 2402 the SMF 310 selects a UPF 304. In step 2404 the SMF 310 transmits the SM PDU DN Request Container in an N4 Data Forwarding message to the selected UPF 304. In some cases, this is referred to as the SMF 310 "triggering" the PDU session establishment procedure. In an embodiment, the SMF 310 provides the selected UPF 304 with traffic steering configuration information (which may, for instance, be a detailed configuration message or an identifier pointing to pre-stored configuration information accessible to the UPF). The traffic steering configuration information may be part of the N4 Data Forwarding message, or may be transmitted as a separate message to the UPF 304. In step 2406 the UPF 304 relays to the DN 306 the SM PDU DN Request Container received from the SMF 310.

An authentication/authorization procedure 2408 takes place and is shown to include steps 2408*a* to 2408*h* between the UE 102 and the DN 306 with messages transported via N4 and NAS. It should be understood that alternate procedures comprised of different steps may also be suitable for use.

In step 2410, the DN confirms the successful authentication/authorization of the PDU session. The DN may provide a SM PDU DN Response Container to the UPF to indicate successful authentication/authorization.

In step 2412, the UPF 304 returns an N4 Data Forwarding message to the SMF 310 containing the SM PDU DN Response Container.

Figure 25A:
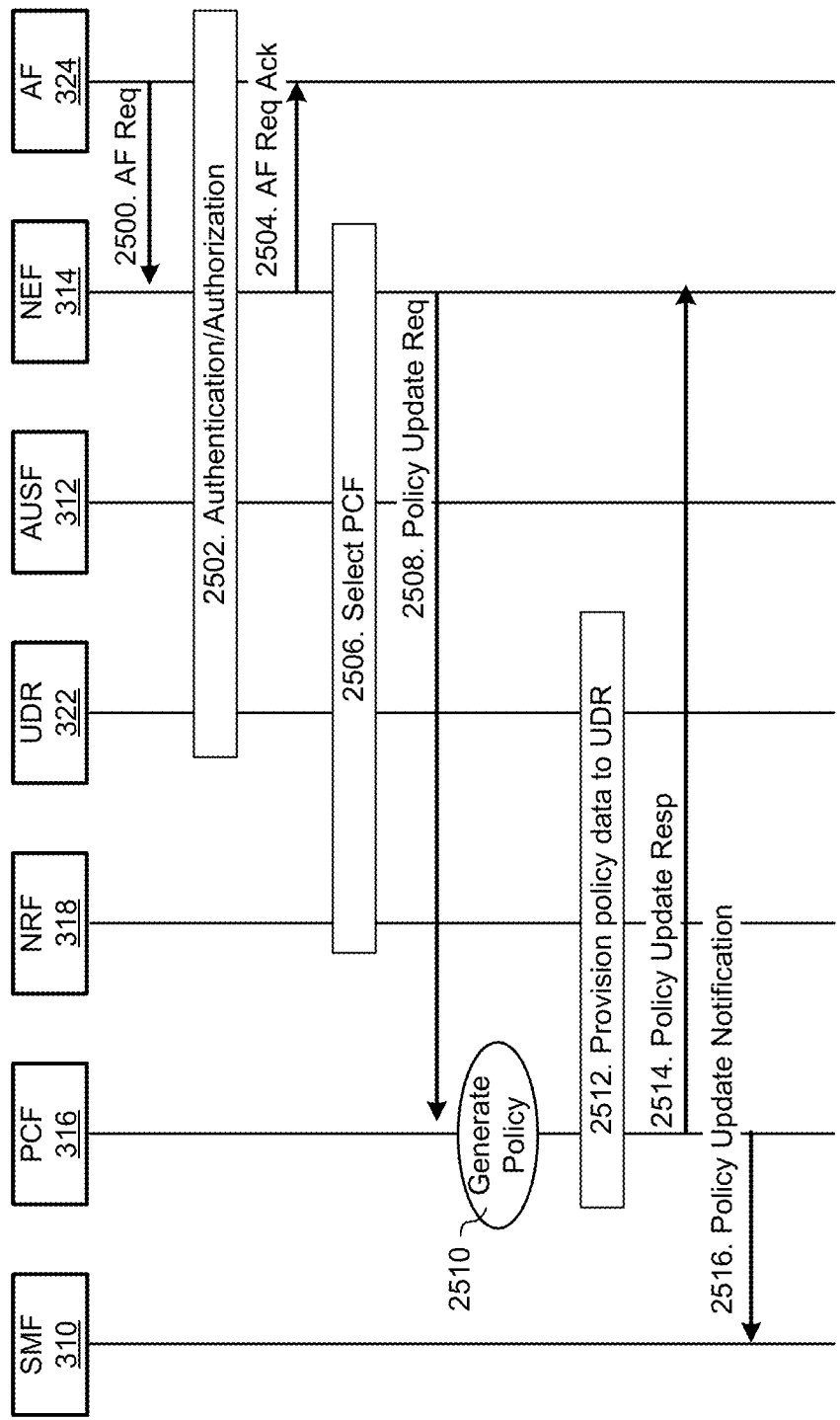
FIGS. 25A-25C are call flow diagrams illustrating respective example processes in accordance with embodiments of the present invention.

FIG. 25A is a message flow diagram illustrating representative procedures between the Application Function (AF) 324 and elements of the 5G Core Network (5GC). These procedures may be used to maintain or configure an efficient user plane path for traffic flows associated with applications that require the end-to-end user plane path efficiency.

At a first step 2500, the AF 324 may send an AF request message to the NEF 314. It is contemplated that the request message may contain a plurality of fields, such as, for example: Request Identifier; Application Network Identifier; Application External Identifier; Traffic Filter; Temporal Validity Condition; Spatial Validity Condition; Request Type; and Request Content. The AF request message may also include information to indicate current or future sessions to which the request may apply. In some such embodiments, a UE identifier, a group of UE identifiers, an identifier of a group of UEs, or other such information may be included within the AF Request.

The Request Identifier may be used to uniquely identify the AF request message, and so may enable the AF 324 to modify or delete the AF request message or to correlate the AF request message with future AF request messages. The request identifier may be generated by either the AF 324 itself of by the NEF 314. In embodiments in which the AF 324 generates the request identifier, it may be included in the AF request message send to the NEF 314, which may record the request identifier for future use. In embodiments in which the NEF 314 generates the request identifier, it may be conveyed to the AF 324 in an AF request response message, which will be described in greater detail below.

The Application Network Identifier may be used to indicate the network in which the application is located. In this respect, the network in which the application is located may be a virtual network, a physical network, a domain network, etc. The application network identifier can be in the form network name such as a domain name or a virtual network name.

The Application External Identifier may be used to identify the application that the AF request is related to.

The Traffic Filter may be used to select the traffic to which the user plane path applies. In specific embodiments, the traffic filter may have any valid combination of one or more of the following forms:
 UE identifiers such as UE External Identifier or Mobile Station ISDN (MSISDN), e.g. for referring to future traffic of particular UEs or non-IP traffic of particular UEs;
 IP addresses/Prefixes, e.g. for referring to IP traffic associated to on-going PDU sessions;
 AF request identifiers, e.g. for referring to the traffic filters defined in previous AF requests;
 an ANY_UE indicator, for example for referring to the traffic of any UE.

The Temporal Validity Condition is an optional parameter which may be used to indicate a time period in which the AF request function is valid. The temporal validity condition may include a set of time elements such as: start time; end time; and frequency, where the frequency may, for example, indicate every day, every week, every month, non-repeating, etc.

The Spatial Validity Condition is an optional parameter which may be used to indicate an area in which the AF request message is valid. For example, the Spatial Validity Condition may be used to limit the validity of the AF request message to the current location of the UE. The spatial validity condition may have the form of one or more zone or domain identifiers. The zone or domain may refer to a geographic region or a network zone or domain. A geographic zone may be defined in terms of a geographic boundary (and may be combined with a temporal validity condition) to apply to any electronic device (e.g. a UE) within the defined boundary (or to a specified set of devices within the boundary), or it may be defined in terms of the topology of a network (e.g. by specifying a that the request message applies to any connection through a set of Access Nodes, or other such network nodes or functions) in place of the geographic coordinate based boundary. As noted above the spatial validity condition may be combined with other validity conditions (e.g. temporal validity or a specification of the UE or UEs to which the request applies) so that the request may be applied to any session in a time window, where a UE in a specified set of UEs connects while in a spatial area defined by either a geographic boundary, or defined by a network topological constraint (e.g. all sessions where the UE has connected to at least one of a set of Access Nodes in a Radio Access Network). In embodiments where the AF provides a spatial validity condition based on geographic locations, a network function within the 3GPP compliant network may be used to map the geographic boundary definition to a set of network access nodes or other network functions that correspond to the geographic boundary.

The Request Type parameter may be used to indicate whether the AF request message is an 'application location notification', a 'UP management event subscription request', or a 'UE grouping request', for example. If desired, other request types may be defined and indicated by use of the request type parameter. In a further alternative, the Request Type parameter may be used to indicate a combination of two or more request types. In such a case, the fields required for those request types must be present in the message format.

The Request Content may be used to provide additional information related to the AF request. If desired, the Request Content may also be used to provide information required to indicate and/or support two or more request types, either alone or in combination with the Request Type parameter. In specific embodiments, this additional information may be dependent on the request type. For example, in a scenario in which the request type parameter indicates that the AF request is an application location notification, the Request Content may include any one or more of: potential locations of the application; and respective N6 point-to-point tunnelling requirements of the UP path. The potential locations of application may be in the form of transport addresses (e.g. server name, IP address, etc.) within the application network. The N6 point-to-point tunnelling requirements may indicate a type of tunnel (e.g. no tunnel, IP tunnel, IP/UDP tunnel, Ethernet tunnel, etc.) and related tunnelling protocol parameters (such as tunnel end point address/identifier and/or a port number at the application location, for example). The absence of specific N6 point-to-point tunnelling requirements may be used to imply that a set of default tunnelling requirements may be used.

In some embodiments, the Request Content field may also include an Event/Notification Type parameter to enable a given Request Type to be used in conjunction with two or more types of event. For example, in an AF request message having a Request Type parameter indicative of a "UP management event subscription" request, the Event/Notification Type parameter may indicate whether the request is an Early Notification or Late Notification, or both. In other embodiments, the Event/Notification Type parameter may, for example, indicate an anchor UPF change event, a traffic steering change event, QoS change event, etc. In some embodiments, the AF may respond to different Event/Notification Type parameters to perform respective different actions in the local DN, such as, for example, performing tunnelling configuration, finalizing application relocation, or adjusting QoS provisioning.

In some embodiments, the Request Content field may also include a group identifier parameter. For example, in an AF request message having a Request Type parameter indicative of a "UE grouping" request, the group identifier parameter is the group ID referring to the group of UEs defined by the Traffic Filter field in the AF request. In some embodiments, the group identifier parameter is absence, and the NEF is responsible for allocating a group identifier for the UE group and providing it to the AF using the response message to. The group ID may be used by the AF to construct traffic filer for subsequent AF requests.

In response to the AF request message, the NEF 314 may execute (at 2502) an authentication/authorization process between the AF 324, an Authentication Server Function (AUSF) 312 and a User Data Repository (UDR) 322 or a Unified Data Management (UDM) 320 function. In some embodiments, the term UDR 322 may also be understood to refer to a Unified Data Repository which provides unified data storage to user data and application-related data such as the policy requirements provided by the AF (e.g. in the form of AF request).

In some embodiments, the AF 324 may register itself (using its own identity) and the applications (e.g. application identifiers, or application external identifiers) that it is managing with the network. This registration may also indicate the application network identifier (or the DNN). The registration may be done through a management plane function such as the service manager, network manager, domain manager, etc. The management function may allocate security credentials to the AF and may store the registration data and security credentials into the Unified Data Management (UDM) 320 or the UDR 322.

In the authentication/authorization process at step 2503, the NEF 314 may send AF identity information, the application external identifier (or the application identifier), and/or the application network identifier (or the DNN) to the AUSF 312, which may then interact with the UDM 320 (or UDR 322) for authentication and authorization. The NEF 314 may also need to interact with the AF to obtain the AF identity information, if that information was not already provided in AF request message, for example. Alternatively, the NEF 314 may provide the AF identifier to the AUSF, which may then obtain the AF identity information from the AF.

The AUSF 312 may discover the AF address through a Network Function (NF) Repository Function (NRF) using the AF identifier in order to communicate with the AF. Alternatively, the NEF may provide the AF addresses to the AUSF, which the NEF may have obtained as part of its communication with the AF in step 2500. In other embodiments, other AF address discovery methods may be employed.

Following completion of the authentication/authorization process, the NEF may return (at 2504) an AF request response message including a result code to the AF. The result code may indicate the result of the authentication/authorization process. If the result is a failure, the NEF 314 may terminate the AF request procedure after step 2504. Otherwise, the NEF 314 may proceed to step 2506, and select a Policy Control Function (PCF) 316 using the NRF 318. In some embodiments, the PCF 316 may be selected based on the service area of the PCF. For example, a PCF having a service area that covers the local DN and/or overlaps the spatial validity condition in the AF request may be selected at this step. In some embodiments, the PCF 316 may be selected based on the service area of the local DN. For example, all the PCFs within the service area of the local DN may be selected. In another example, the PCF 316 may be selected based on the intersection of the service area of the PCF and that of the local DN. In some embodiments, the application external identifier (or the application identifier) may be used for PCF selection. In some embodiments, the PCF 316 may be pre-configured in the NEF 314, in which case the PCF selection step 2506 may be omitted.

At step 2508, the NEF 314 may process the AF request message and send a policy update request message to the PCF 316. The policy update request message may include any one or more of the following parameters: Request Identifier; DNN; application identifier; traffic filter; temporal validity condition; spatial validity condition; request type; and request content.

The Request Identifier may be used to uniquely identify the policy update request message, and so may enable the NEF 314 to modify or delete the policy update request message or to correlate the policy update request message with future policy update request messages. The request identifier may be generated by either the NEF 314 itself of by the PCF 316. In embodiments in which the NEF 314 generates the request identifier, it may be included in the policy update request message sent to the PCF 316, which may record the request identifier for future use. In embodiments in which the PCF 316 generates the request identifier, it may be conveyed to the NEF 314 in a policy update request response message, which will be described below. Preferably, the NEF 314 maintains a mapping between the policy update request identifier and the AF request identifier received by the NEF in step 2500.

The DNN may be mapped from the application network identifier received by the NEF in step 2500. This mapping may be pre-configured in the NEF 314. The application network identifier may also be used to identify relevant control information such as S-NSSAI that the application is related to.

The application identifier may be mapped from the application external identifier received by the NEF in step 2500, and used within the 5GC and by the UE 102 to identify the control information (e.g. Single Network Slice Selection Assistance Information (S-NSSAI), policies) that the application relates to. The mapping between the application external identifier and the application identifier may be pre-configured in the NEF 314.

The Traffic Filter field of the policy update request message may contain policy update request identifiers, which may be generated based on, or converted from AF request identifiers (if any) in the Traffic Filter field of the AF request message received by the NEF. The traffic filter field may also contain UE group identifiers. The UE groups that the identifiers refer to may be created or defined according to a pervious UE grouping request of the AF, and the group membership is maintained within the UDM 320 (e.g. UDR 322). The UE group may be application specific.

The Spatial Validity Condition may take the form of RAN node identifiers or cell identifiers and any may be mapped from the spatial validity condition of the AF request message received by the NEF in the step 2500. The mapping between the spatial validity condition of the AF request message and that of the policy update request message may be pre-configured in the NEF.

In a case in which the AF request is an application location notification, the request content container may include Routing Profile IDs and respective N6 point-to-point tunnelling requirements. The Routing Profile IDs may be mapped from information (such as the application network identifier, application external identifier, and potential locations of application) contained in the AF request message received by the NEF in step 2500. This mapping may be pre-configured in the NEF by the management plane (MP) directly or through a Network Function (NF), such as PCF 316, UDM 320 or DSF (e.g. UDR 322).

As may be appreciated, pre-configuration of mappings etc (whether the pre-configuration performed at this step or at other steps described in this disclosure) may be done by a management plane function such as a network manager, slice manager, or a service manager.

When the management plane function performs the pre-configuration, it may use an element management system to install the pre-configuration information in the target network function. In some embodiments, the management plane function may act as an Application Function and performs the pre-configuration through the PCF 316 or the NEF 314.

In some embodiments, pre-configuration is not performed directly to the target NF, but rather to a third NF such as a UDM 320 or a DSF. The target NF may obtain the pre-configuration information from the third NF proactively (e.g. periodically, or when needed) or reactively (e.g. upon receipt of a notification from the third NF). Those skilled in the art will appreciate that the DSF may, in some embodiments, by a UDR 322.

In some embodiments, when a first NF (e.g. PCF) and a second NF (e.g. NEF) are to be pre-configured with the same information (e.g. Routing Profiles), the pre-configuration may be performed only for the first NF, and the second NF may subsequently obtain the pre-configuration information from the first NF.

In response to the policy update request message, the PCF 316 may generate (at 2510) one or more UP management polices according to the information contained in the policy update request message. Depending on the policy request type, the generated UP management policies may include traffic steering polices, UP management event notification polices, and/or UE grouping policies.

If the traffic filter field of the received policy update request message contains policy update request identifiers, those policy update request identifiers may be converted to corresponding traffic filters. The request message may also contain UE group identifiers which may be converted to traffic filters (or may be used in conjunction with other data to create traffic filters). For the conversion, the PCF may interact with the UDR to obtain related policy data. This conversion may be performed before the PCF provisions policy data to the UDR. Alternatively, the conversion may be performed later when the policy is sent to the SMF. Performing the conversion later allows any update/modification to the traffic filters in those police update requests (e.g. indicated by the policy update request identifiers) or the UE group membership to be reflected when the SMF obtains the policy.

A traffic steering policy may include any one or more of: a DNN, application identifier, traffic filter, traffic steering profile IDs, a Routing Profile ID, temporal validity condition, spatial validity condition, N6 point-to-point tunnelling requirements, and policy update request identifier. The traffic steering profile IDs may be mapped from the Routing Profile IDs in the policy update request (at step 2508).

A UP management event notification policy may include any one or more of: a DNN, application identifier, traffic filter, temporal validity condition, spatial validity condition, event type, notification type, event notification receiver identifier (e.g. an NEF or an AF or an PCF), and policy update request identifier.

A UE grouping policy may include any one or more of: a DNN, application identifier, UE filter, and the policy update request identifier. In this case, the traffic filter in the policy update request (and AF request) may serve as a UE filter, and mapping/conversion may be performed to the UE filter at the NEF and/or the PCF as described above.

Once the UP management polices (or, equivalently, the UP management policy data) have been generated, the PCF may select the UDR and provision (at 2512) the corresponding UP management policy data to the selected UDR. The UDR may be selected using the DNN and the application identifier. The UE information in the traffic filter can also be used for UDR selection, if desired. The UDR may notify any other PCFs that have subscribed to the policy data change event. Alternatively, this can be based on the overlapping of (the DNN, application identifier, and/or spatial validity condition (if desired)) and the PCF's service area.

Once the policy data has been provisioned to the UDR, the PCF returns (at 2514) a Policy Update Response message to the NEF (or the AF) to acknowledge the receipt of the policy update request.

The PCF 316 may also notify (at 2516) any SMF's 310 that have subscribed to notification of the policy update event. Alternatively, the PCF 316 may identify target SMFs based on the overlapping of spatial validity condition (if any) and the SMF's service area and notify the identified SMFs. Upon receipt of the notification from the PCF 316, the subscribing SMF 310 may obtain the UP management policies, identify the PDU sessions to which the policies apply, and apply the policies to those PDU sessions.

In order to determine whether or not an SMF 310 has subscribed to notification of the policy update event, the SMF 310 may send PDU session properties (such as: application, DNN, UE IP address, UE identifier, and/or UE location information) to the PCF 316, and the PCF 316 may check the PDU session properties against the updated polices. The PCF 316 may provide the updated policies that the PDU session is eligible for to the SMF 310 according to information available to it. The SMF 310 may further check the PDU session against the updated policies using PDU session properties that the PCF 310 does not have. Thus, the information that has been used for checking the PDU session by the PCF 316 does not need to be provided to the SMF 310. For example, if a temporal validity condition is checked by the PCF 316, then the SMF 310 does not need to check it and thus the polices provided to the SMF will not include it. In an embodiment in which the PCF does not check PDU session properties, all the information may be provided to the SMF.

If desired, the spatial validity conditions may be verified by the PCF (in this case, the SMF needs to notify the PCF about UE location for the spatial validity condition check) and trigger a policy update. In this case, the traffic steering policy and/or the UP management event notification policy does not include those conditions, since the policy is always spatially valid if it exits.

If desired, the temporal validity conditions may be verified by the PCF (in this case, the PCF periodically performs the temporal validity condition check) and trigger a policy update. In this case, the traffic steering policy and/or the UP management event notification policy does not include those conditions, since the policy is always temporally valid if it exits.

The SMF may maintain the policy for individual PDU sessions. In this case, the policy may not include traffic filter information and the binding between PDU session and policy may be indicated by the PCF (e.g. PCF checks the PDU session against the policy and if a match is found, then the PCF notifies the SMF to obtain the policy). The policy may contain traffic filter information. In this case, the SMF may check the traffic filter to determine whether or not to apply it to a PDU session or to which portion of the traffic associated to the PDU session. In these two cases, the SMF subscription to the policy update may be a general subscription or PDU session specific.

The PDU session may be subject to multiple traffic steering policies. The SMF selects which of the traffic steering policies to apply. In some embodiments, the SMF first selects a traffic steering policy, then it identifies the UPFs that supports the traffic steering specified in the policy (e.g. by the traffic steering profile IDs) and performs UPF selection and traffic steering profile selection. The SMF provides the identifier of the selected traffic steering profile to the selected UPF. The UPF uses the traffic steering profile identifier to identify the traffic steering parameters in its local configuration.

In some embodiments, based on the N6 point-to-point tunnelling requirements in the traffic steering policy, the SMF calculates the N6 point-to-point tunnel information and configures it into the PDU session anchor. The N6 point-to-point tunnel information may include Traffic Forwarding Template (TFT) for mapping N6 tunnel to UP path for DL packets and packet handling instructions (e.g. tunnelling protocol header to be applied) for UL packets.

Figure 25B:
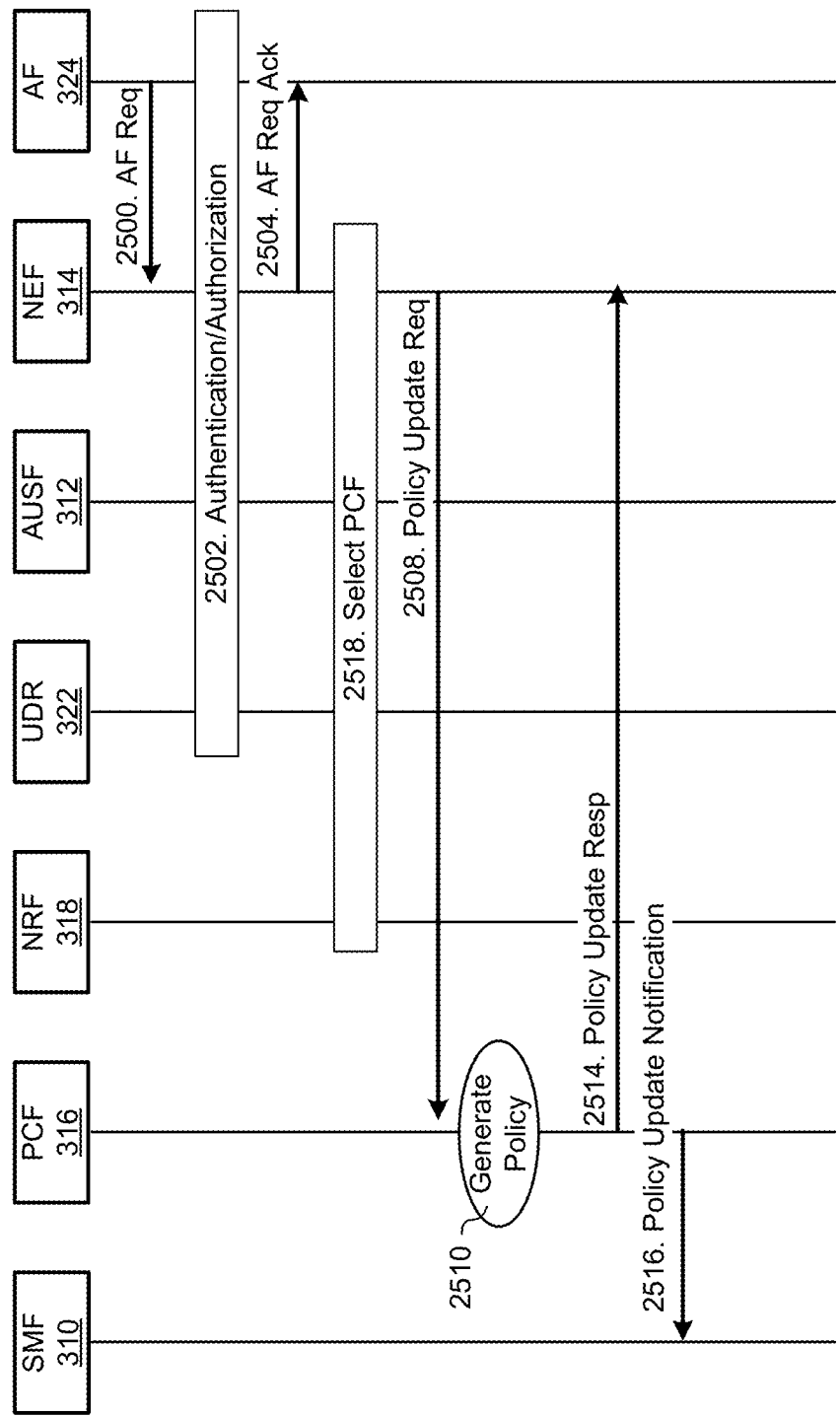
Figure 25C:
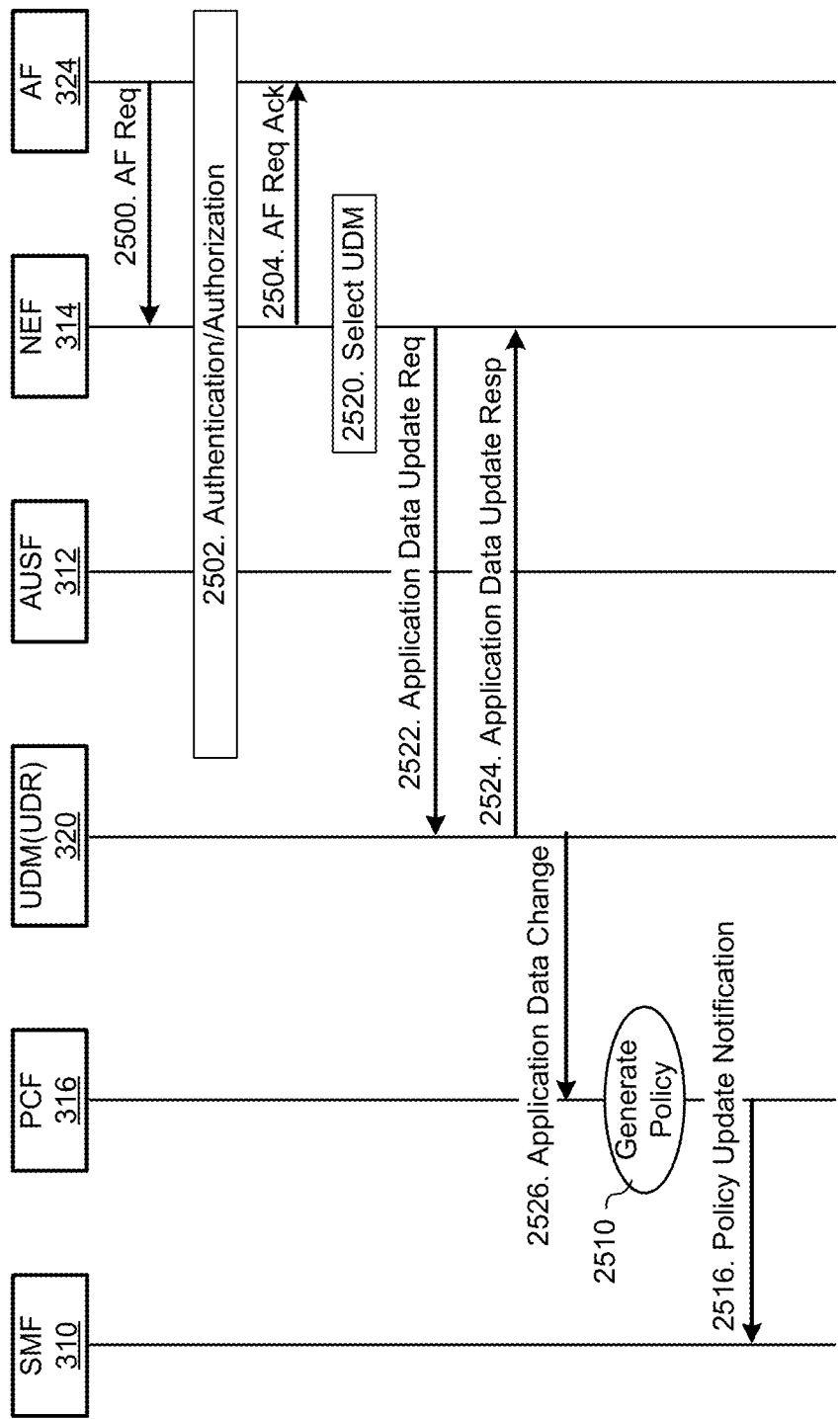

In the example of FIG. 25A, the PCF may be selected (at 2506) based on the service area of the PCF overlapping the spatial validity condition in the AF request. FIG. 25B illustrates an alternative embodiment, in which the PCF is selected based on a DNN and an application identifier. FIG. 25C illustrates another alternative embodiment, in which the PCF is selected by the UDM (or UDR) rather than the NEF.

As may be seen in FIG. 25B, the call flow (also referred to as a message flow) process is broadly similar to that of FIG. 25A, except that in this case, step 2512 is omitted and step 2506 (PCF selection) is replaced by an alternative step (2518), in which the NEF 314 (or the AF 324) may map the application network identifier to a DNN and the application external identifier to an application identifier, and provide the resulting DNN and application identifier information to the NRF 318 for selecting the PCF 316. The UE information in the traffic filter can also be used for PCF selection. The application identifier may be used within the 5GC and by the UE to identify the control information (e.g. S-NSSAI, policies) that the application relates to. In some embodiments, multiple PCFs are selected and the NEF (or the AF) sends the policy update request to all the selected PCFs. In some embodiments, the NEF 314 (or the AF 324) performs PCF selection by selecting a PCF agency (which is network function) and sends the policy update request to the PCF agency, which then send it to all the PCFs that it is serving or delegating. In some embodiments, the mappings may be pre-configured in the NEF (or the AF). In some embodiments, the selection of the PCF may be pre-configured in the NEF (or the AF), in which case the PCF selection step may be omitted.

Referring to FIG. 25C, in the illustrated alternative embodiment, the AF 324 and NEF 314 interact to perform steps 2500, 2502 and 2504 as described above with reference to FIG. 3A. Next (at 2520), the NEF 314 (or the AF 324) may map the application network identifier to a DNN and the application external identifier to an application identifier, and use the resulting DNN and application identifier information to select a UDM 320. The UE information in the traffic filter can also be used for UDM selection. The application identifier may be used within the 5GC and by the UE 102 to identify the control information (e.g. S-NSSAI, policies) that the application relates to. In some embodiments, the mappings may be pre-configured in the NEF (or the AF). In some embodiments, the selection of the UDM may be pre-configured in NEF, in which case the UDM selection step 2520 may be omitted.

At step 2522, the NEF 314 may process the AF request message and send an Application Data Update request message to the UDM 320. The application data update request message may include any one or more of the following parameters: Request Identifier; DNN; application identifier; traffic filter; temporal validity condition; spatial validity condition; request type; and request content.

The Request Identifier may be used to uniquely identify the application data update request, and so may enable the NEF to modify or delete the application data update request or to correlate the application data update request with future policy update requests. The request identifier may be generated by either the NEF 314 itself or by the UDM 320 (or UDR 322). In embodiments in which the NEF 314 generates the request identifier, it may be included in the application data update request message sent to the UDM 320 (or UDR 322), which may record the request identifier for future use. In embodiments in which the UDM (or UDR) generates the request identifier, it may be conveyed to the NEF 314 in an application data update response message, which will be described in greater detail below. Preferably, the NEF 314 maintains a mapping between the application data update request identifier and the AF request identifier received by the NEF 314 in step 2500.

The DNN may be mapped from the application network identifier received by the NEF in step 2500. This mapping may be pre-configured in the NEF.

The application identifier may be mapped from the application external identifier received by the NEF in step 2500, and used within the 5GC and by the UE to identify the control information (e.g. Single Network Slice Selection Assistance Information (S-NSSAI), policies) that the application relates to. The mapping between the application external identifier and the application identifier may be pre-configured in the NEF.

The Traffic Filter field of the policy update request message may contain policy update request identifiers, which may be generated based on AF request identifiers (if any) in the Traffic Filter field of the AF request message received by the NEF.

The Spatial Validity Condition may take the form of RAN node identifiers or cell identifiers and any may be mapped from the spatial validity condition of the AF request message received by the NEF in the step 2500. The mapping between the spatial validity condition of the AF request message and that of the policy update request message may be pre-configured in the NEF.

At step 2524, the UDM 320 (or UDR) may return an Application Data Update Response message to the NEF 314.

Next, the UDM 320 (or UDR) may identify any PCFs that have subscribed to notification of application data updates. Alternatively, the UDM 320 (or UDR) may identify any PCFs having a service area that includes the local DN or intersects the service area of the local DN. The UDM 320 (or UDR) may then send (at 2526) corresponding Application Data Change Notification messages to each identified PCF 316. Based on the information contained in received Application Data Change Notification messages, a PCF 314 can generate Policies and forward corresponding Policy Update Notifications to subscribing SMFs 310, as described above at steps 2510 and 2516. In some embodiments, the application data change notification is a simple signal and does not include the change detail, and the PCF needs to interact with the UDM (or UDR) to obtain the change detail and generate policies accordingly.

It will be noted that, in the example of FIG. 25C, since the UDM 320 is used to select the PCF 314, the UDM 320 (or UDR) selection and notification steps described above at 2512 and 2514 may be omitted.

Figure 26:
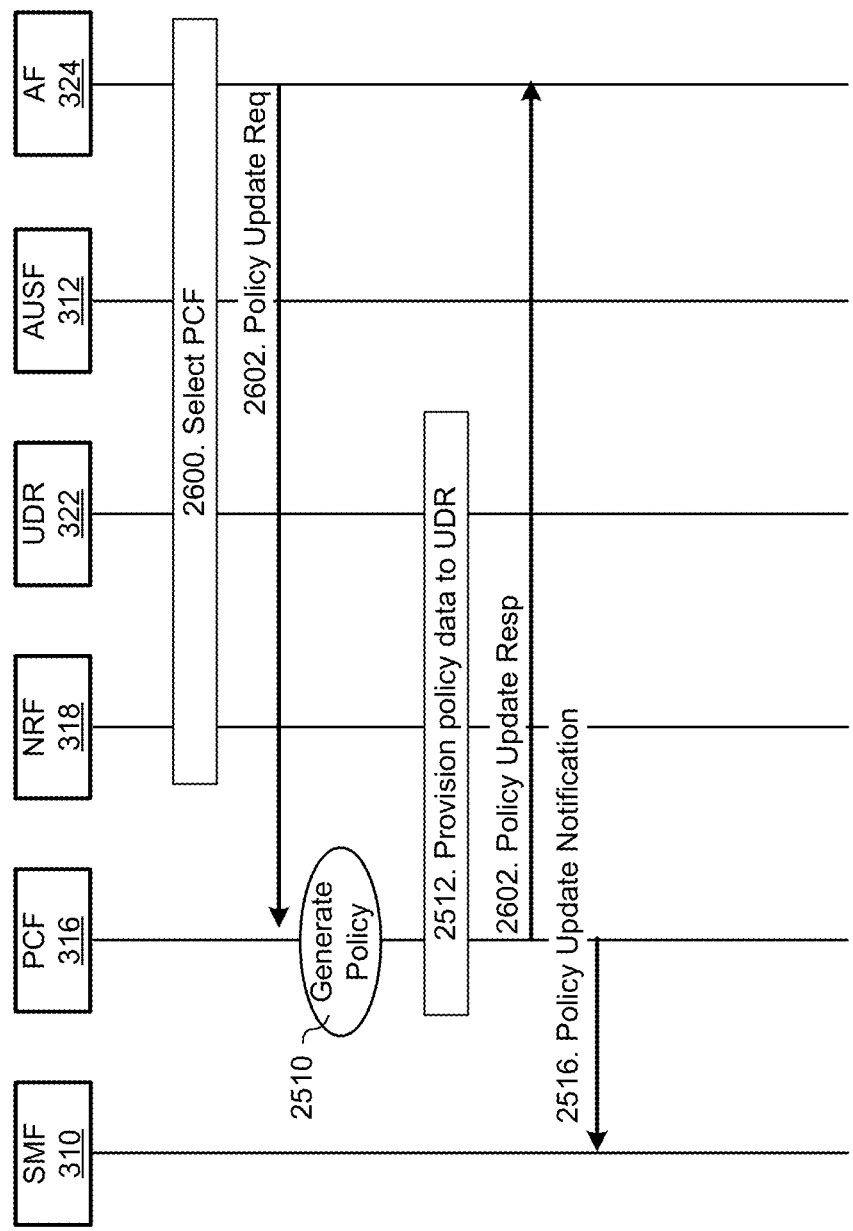
FIG. 26 is a call flow diagrams illustrating a further example process in accordance with embodiments of the present invention.

As may be appreciated, an Application Function 324 that is trusted by the operator may interact directly with the PCF 316. In such a case, the AF 324 may also perform the role of the NEF in the procedure. FIG. 26 illustrates an example call flow diagram corresponding to the example of FIG. 25A, in which steps 2500, 2502 and 2504 of FIG. 25A are either not performed or are performed by the AF 324, and steps 2506, 2508 and 2514 are replaced by steps 2600, 2602 and 2604 which are performed by the AF 324, but are otherwise identical to steps 2506, 2508 and 2514. It will be appreciated that analogous variants exist for the embodiments of FIGS. 25B, 25C and 27A-27B, which, for the sake or brevity are not be described in detail in this description.

Figure 27A:
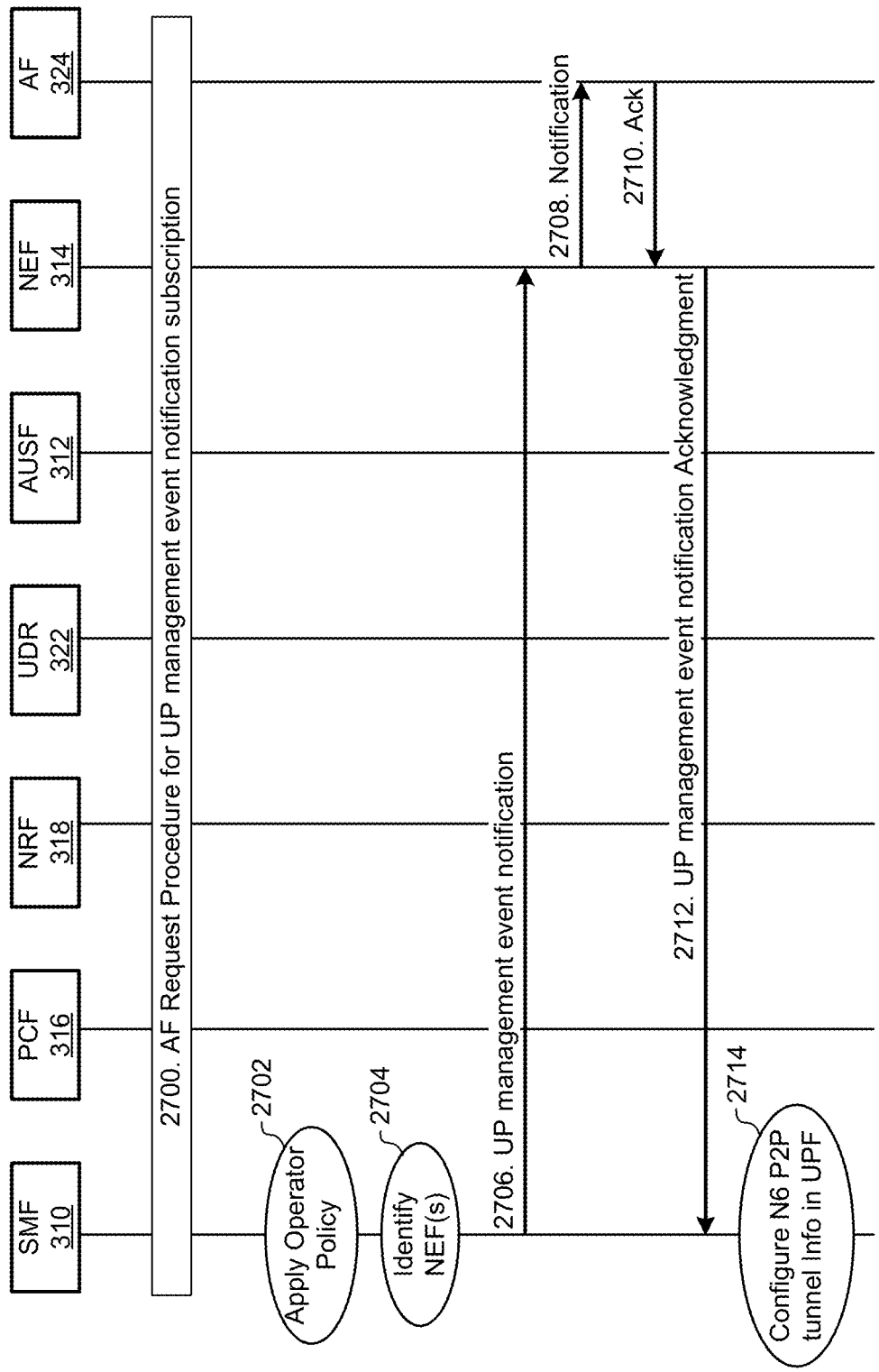
FIGS. 27A and 27B show call flow diagrams illustrating respective processes for UP path management notification to an AF in accordance with example embodiments of the present invention.

FIG. 27A is a call flow diagram (also referred to as a message flow diagram) illustrating a process for UP path management notification to an AF 324. It may be appreciated that an Application Function that is trusted by the operator may interact directly with the PCF 316. In such a case, the AF 324 may take the role of the NEF 314 in this procedure. The UP management event notification procedure may be performed either before the UP management event is initiated in the user plane and/or after it is completed, depending on the type of notification.

For the purposes of this procedure, the AF may subscribe (at 2700) to UP management event notifications from the SMF 314 using any suitable process such as, for example, as described above, or as set out in an applicable 3GPP Technical Standard.

In a first step (at 2702) the SMF 310 may apply an operator policy, and identify (at 2704) each NEF (or AF) that requested a corresponding policy update notification.

Then, the SMF 310 may send (at 2706) a UP management event notification message to the (or each) identified NEF (or AF). The UP management event notification message may include one or more of the following parameters: Policy Update Request Identifier (or Application Data Update Request Identifier); Traffic Filter; Event Type; Notification Type; and Event Notification Content.

The Policy Update Request Identifier (or Application Data Update Request Identifier) may be obtained by the SMF from within the operator policy.

The Traffic Filter may indicate the traffic that the UP management event is related to, which is a portion of the traffic specified by the Traffic Filter field in the policy update request. The absence of a Traffic Filter in the UP management event notification message may be used to indicate that the UP management event is related to all the traffic specified by the traffic filter in the policy update request. The traffic filter may include any suitable combination of: UE identifiers such as UE External Identifier or MSISSDN; and IP addresses/Prefixes The Notification Type may be used to indicate whether the UP management event notification is either Early Notification or Late Notification.

The Event Notification Content may be used to provide additional information related to the UP management event. The Event Notification Content may include any one or more of: traffic filter; application location; anchor UPF location; and N6 point-to-point tunnel information. The application location may take the form of a Routing Profile ID or DNAI or traffic steering profile ID. The anchor UPF location may take the form of a network address, which may be dependent on the tunnel type. For example, for an IP tunnel, it is in the form of IP address; for an Ethernet tunnel, it is in the form of Ethernet address. In some embodiments, the Anchor UPF location information may be used for supporting the N6 point-to-point tunneling in the local DN. The N6 point-to-point tunnel information may be provided to be configured at the application location for binding DL traffic with N6 point-to-point tunnel so as to ensure proper DL packet delivery. The N6 point-to-point tunnel information may include tunnel end point address/identifier and/or port number at the anchor UPF side. The form of the tunnel end point address/identifier may be dependent on the tunnel type. For example, for an IP tunnel, the tunnel end point address/identifier will preferably be in the form of IP address; for an Ethernet tunnel, it will preferably be in the form of Ethernet address. In specific embodiments, the particular information provided in the Event Notification Content may be dependent on the type of event referenced by the UP management event notification. For example, in case of a QoS change event, the Event Notification Content may include new "QoS rules". In a further example, if the event type is traffic steering change, then the Event Notification Content may include application location, anchor UPF location, and N6 point-to-point tunnel information.

Based on the received UP management event notification message, the NEF 314 may send (at 2708) a corresponding UP management event notification message to the AF 324. The UP management event notification message sent to the AF 324 may include any one or more of: AF request identifier; event type; notification type; and event notification content. The AF request identifier may be mapped from the policy update request identifier contained in the Policy Update Request message described above with reference to FIGS. 25 and 26. The event notification content may be mapped from the Event Notification Content of the UP management event notification message received by the NEF from the SMF (in step 2706). For example, the application location may be translated from in the form a Routing Profile ID or DNAI or traffic steering profile ID to in the form of a network address that refers to a location where the application is deployed.

Following receipt of the UP management event notification message from the NEF 310, the AF 324 may send (at 2710) an acknowledgement message to the NEF 314. The acknowledgement may include N6 point-to-point tunnel information that is to be configured in the anchor UPF 304.

The NEF 314 may then send (at 2712) an acknowledgement of the original UP management event notification message to the SMF 310. In embodiments in which the AF provides N6 point-to-point tunnel information to the NEF 314, this information may be included in the acknowledgement message sent to the SMF 310.

Upon the receipt of the acknowledgement message from the NEF 314, the SMF 310 may configure (at 2714) N6 point-to-point tunnel information in the anchor UPF.

As noted above, an Application Function that is trusted by the operator may interact directly with the SMF 310. In such a case, the AF 324 may also perform the role of the NEF 314 in the procedure of FIG. 27A. Accordingly, steps 2708 and 2710 will not be performed, and steps 2706 and 2712 are performed by the AF 324.

Figure 27B:
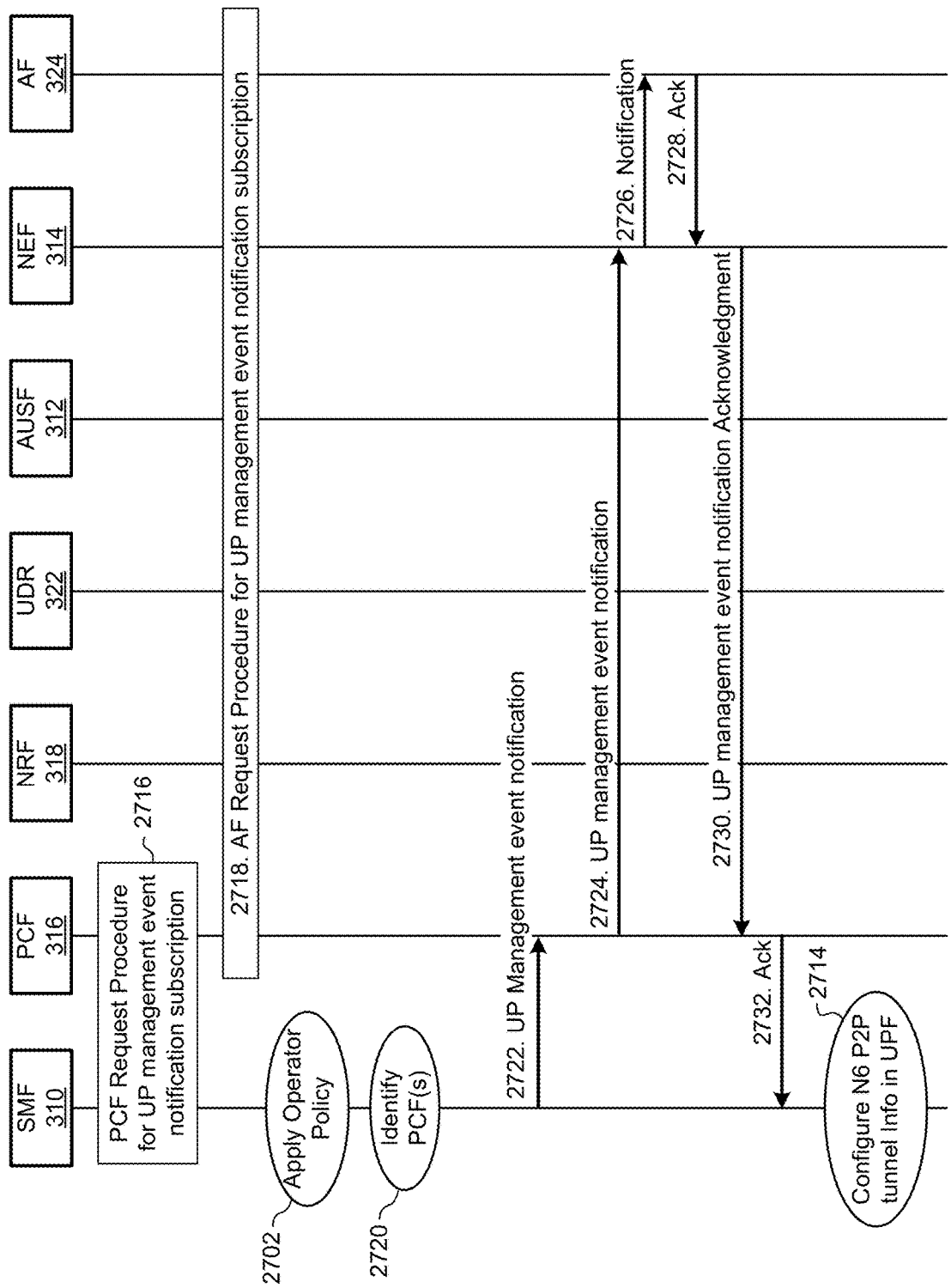

FIG. 27B is a call flow diagram (also referred to as a message flow diagram) illustrating an alternative process for UP path management notification to an AF 324. As in the embodiment of FIG. 27A, the UP management event notification procedure may be performed either before the UP management event is initiated in the user plane and/or after it is completed, depending on the type of notification.

For the purposes of this procedure, the PCF 316 may subscribe (at 2716) to UP management event notifications from the SMF 310 using any suitable process such as, for example, as described above, or as set out in an applicable 3GPP Technical Standard. Similarly, the AF may subscribe (at 2718) to UP management event notifications from the PCF 316.

In a first step (at 2702) the SMF 310 may apply an operator policy, and identify (at 2720) each PCF 316 that requested a corresponding policy update notification.

The SMF 310 may send (at 2722) a UP management event notification message to the (or each) identified PCF 316. The UP management event notification message may be formatted as described above with reference to FIG. 27A.

Based on the received UP management event notification message, the PCF 316 may send (at 2724) a corresponding UP management event notification message to the NEF 314. Before sending the message, it may convert the traffic steering profile ID or DNAI in the message to a routing profile ID. The UP management event notification message sent to the NEF 314 may include any one or more of: AF request identifier; event type; notification type; and event notification content. The AF request identifier may be mapped from the policy update request identifier contained in the Policy Update Request message described above with reference to FIGS. 25 and 26. The event notification content may be mapped from the Event Notification Content of the UP management event notification message received by the NEF from the SMF (in step 2706). For example, the application location may be translated from in the form a Routing Profile ID to in the form of a network address that refers to a location where the application is deployed. The NEF 314 may forward (at 2726) the received UP management event notification message to the AF 324.

In some embodiments, the UP management event notification message sent to the NEF 314 or the PCF 316 may also include a content format field which provides information about how the data is structured to allow a network function to properly interpret the information in the event notification content. For example, the event notification content may be used to contain different types of information (such as routing profile ID, traffic steering profile ID, or event DNAI) depending of the receiver function. In such a case, the content format field may be used to indicate the appropriate format to be used to read the information in the event notification content field. The content format field may set by the PCF when policy is created, or based on the content of the UP management even notification from the SMF (at step 2722).

Following receipt of the UP management event notification message from the NEF 314, the AF 324 may send (at 2728) an acknowledgement message to the NEF 314. The acknowledgement may include N6 point-to-point tunnel information that is to be configured in the anchor UPF 304.

The NEF 314 may send (at 2730) an acknowledgement of the original UP management event notification message to the PCF 316. In embodiments in which the AF 324 provides N6 point-to-point tunnel information to the NEF 314, this information may be included in the acknowledgement message sent to the PCF 316.

Upon the receipt of the acknowledgement message from the NEF 314, the PCF 316 may forward (at 2732) the acknowledgement message to the SMF 310.

Upon the receipt of the acknowledgement message from the PCF 316, the SMF 310 may configure (at 2714) N6 point-to-point tunnel information in the anchor UPF 304.

As noted above, an Application Function that is trusted by the operator may interact directly with the PCF 316. In such a case, the AF 324 may also perform the role of the NEF 314 in the procedure of FIG. 27B. Accordingly, steps 2726 and 2728 will not be performed, and steps 2725 and 2730 would be performed by the AF 324.

Figure 28B:
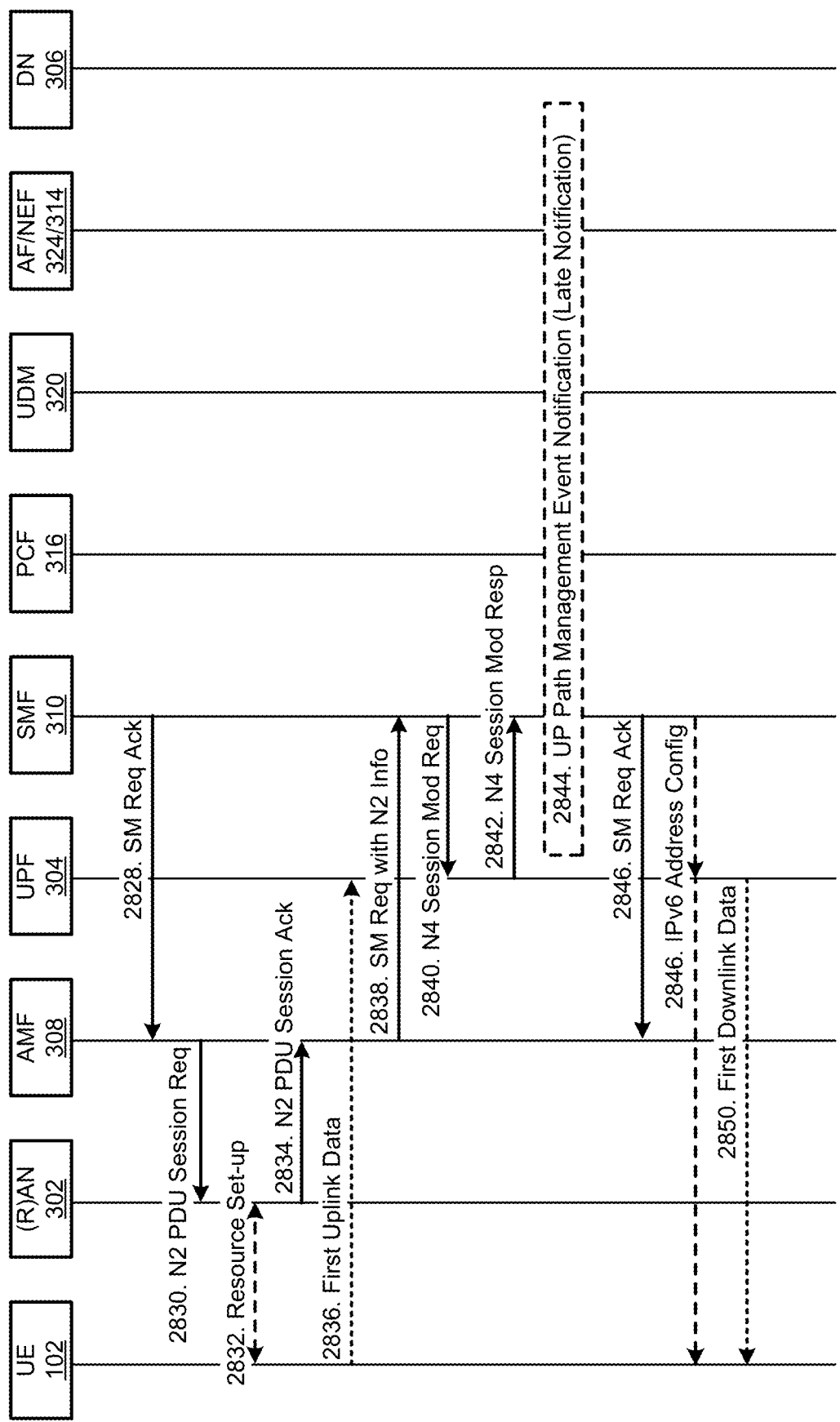

FIGS. 28A and 28B show a call flow diagram (also referred to as a message flow diagram) illustrating a process for UE-requested PDU Session Establishment for non-roaming scenarios. The procedure of FIGS. 28A and 28B assumes that the UE 102 has already registered on the AMF 308 thus the AMF 308 has already retrieved the user subscription data from the UDM 320.

At a first step (at 2800) the UE 102 initiates the UE Requested PDU Session establishment procedure by generating and sending a NAS message to the AMF 308. The NAS message may comprise S-NSSAI, DNN, application identifier, PDU Session ID, and N1 SM information, and may contain a PDU Session Establishment Request within the N1 SM information. The PDU Session Establishment Request may include a PDU Type, SSC mode, and Protocol Configuration Options. The application identifier may be used for describing URSP as described in clause A.3.1.3.3 of TS 23.501.

The NAS message may include an application identifier corresponding to an Edge Computing application. This may occur, when the DNN points to a local DN. The presence of the application identifier indicates it is a request for a PDU session whose use is intended or dedicated for the Edge Computing application.

The NAS message sent by the UE 102 may be encapsulated by the AN in a N2 message that may also include User location information and Access technology Type Information.

The SM information may contain SM PDU DN Request Container containing information for the PDU session authorization by the external DN.

Based on the information provided in the NAS message, the AMF 308 may determine that the message corresponds to a request for a new PDU Session based on the PDU Session ID that is not used for any existing PDU Session(s) of the UE. The AMF may then select (at 2802) an SMF for the PDU Session.

At a next step (at 2804), the AMF 308 may send an SM request message to the selected SMF 310. The Request message may include parameters such as: Subscriber Permanent ID, DNN, application identifier, S-NSSAI, PDU Session ID, AMF ID, N1 SM information, User location information, and Access Technology Type). The AMF ID uniquely identifies the AMF 308 serving the UE. The N1 SM information contains the PDU Session Establishment Request received from the UE 102.

Based on the information provided in the SM request message, the SMF 310 may perform one or more checks to determine whether or not the UE request is compliant with the user subscription and with local policies. This may include sending (at 2806) a Subscription Data Request to the UDM 320, and receiving (at 2808) a Subscription Data Response providing information of the user subscription. Subscription data may include the authorized PDU type(s), authorized SSC mode(s), Default QoS profile, and subscription-defined group information (e.g. Group Identifiers). If the SMF 310 has not yet retrieved the SM-related subscription data for the UE 102 related with the DNN, the SMF 310 may also request this subscription data from the UDM 320.

If the UE request is not compliant with the user subscription and local policies, then the SMF 310 may reject the UE request via NAS SM signalling to indicate to the AMF 308 that the PDU session ID is to be considered as released and the procedure terminates.

In embodiments in which the SMF 310 needs to authorize/authenticate the establishment of the PDU session via a third party, the SMF may trigger the applicable third-party PDU session establishment authentication/authorization process 2810. The triggering of the third party PDU session establishment process 2810 may include the SMF 310 transmitting a request to a third party authentication service, which may reside within the DN. This process 2810 may be via the UPF or the NEF, as described elsewhere in this disclosure. If the PDU session establishment authentication/authorization fails, the SMF 310 may terminate the PDU session establishment procedure and indicates a rejection to the UE 102.

In embodiments in which dynamic PCC is deployed, the SMF 310 may perform PCF selection (at 2812). The SMF 310 may also initiate PDU-CAN Session Establishment (2814) with the PCF 316 to obtain the default PCC Rules for the PDU Session. In embodiments in which dynamic PCC is deployed and the DNN points to a local DN, the SMF 310 may provide the DNN and the application identifier to the PCF 316. Additional information can be provided to the PCF 316 to enable more detailed policy decisions. For example, UE information (such as location information, UE identifier, subscription-defined group information, etc.) or traffic information (e.g. UE IP address) can be provided so that the PCF may respond only with policy that tailored to the requirements of the specific UE or traffic. Other PDU session related information can be provided, if desired. The PCF may use this information to obtain relevant policy data from the UDR for policy decisions. This may trigger the PCF to subscribe to notifications of policy data change related to the DN and/or the application from the UDR. The PCC Rules may include UP path management event notification policies. The PCC Rules may include information of N6 Tunnel related to the DN (such as address and/or port number of the tunnel end in the DN). It may be appreciated that the purpose of this step is to receive PCC rules before selecting the UPF. If PCC rules are not needed as input for UPF selection, this step can be omitted.

The SMF 310 may select (at 2816) a UPF 304 and an SSC mode for the PDU Session. In embodiments in which the PDU Type is either IPv4 or IPv6, the SMF 310 may allocate an IP address/prefix for the PDU Session. For Unstructured PDU Type, the SMF 310 may allocate an IPv6 prefix for the PDU session and N6 point-to-point tunnelling (based on UDP/IPv6). If traffic steering policies are provided, the SMF 310 may also select a traffic steering profile or policy in this step.

In embodiments in which dynamic PCC is deployed and the PDU-CAN Session Establishment was not performed at step 2514, the SMF 310 may initiate (at 2818) PDU-CAN Session Establishment towards the PCF 316 to obtain the default PCC Rules for the PDU Session. If the DNN points to a local DN, in addition to the UE information (e.g. UE identifier, subscription-defined group information) the SMF 310 may also provide the DNN and the application identifier (if available) to the PCF 316. Otherwise, if dynamic PCC is deployed and the PDU Type is either IPv4 or IPv6, the SMF 310 may initiate PDU-CAN Session Modification and provide the allocated UE IP address/prefix to the PCF 316. If dynamic PCC is deployed, for unstructured PDU type, the SMF 310 may provide the IPv6 prefix allocated for the PDU session to the PCF 316.

At a next step (2820), the SMF 310 may select a traffic steering profile or policy.

In embodiments in which UP path management event notification polices are provided, the SMF may notify (at 622) the AF (or NEF) about the UP path selection. If the traffic steering policies indicate a need for dynamic configuration on N6 Tunnel information between the SMF 310 and the AF 324, the negotiation may also be performed along with the UP path selection notification. The notification may include N6 tunnel information related to the UPF (e.g. the address and/or port number of the UPF) and an indication that this is an early notification.

At step 2824, the SMF 310 may send an N4 Session Establishment/Modification Request to the UPF 304 and provide Packet detection, enforcement and reporting rules to be installed on the UPF 304 for this PDU Session. In embodiments in which the PDU session authentication process is not performed (at 2810), the N4 Session Establishment/Modification Request message may be used to initiate an N4 Session Establishment procedure with the selected UPF 308, otherwise it may be used to initiate an N4 Session Modification procedure with the selected UPF 308: If CN Tunnel Info is allocated by the SMF, the applicable CN Tunnel Info is provided to UPF 308 in this step. If N6 Tunnel is to be supported, the applicable N6 Tunnel information is provided to UPF 304 in this step. It should be understood that the N6 Tunnel information does not necessarily have to be provided to the UPF 304 in this step.

The UPF may acknowledge the N4 Session Establishment/Modification Request message by sending (at 2826) an N4 Session Establishment/Modification Response message to the SMF. If CN Tunnel Info is allocated by the UPF 308, the applicable CN Tunnel Info may also be provided to SMF 310 in this step.

At step 2828, the SMF 310 may return an SM Request Acknowledgment message to the AMF 308. The SM Request Acknowledgment message may contain parameters such as: N2 SM information (e.g. PDU Session ID, QoS Profile, and CN Tunnel Info); N1 SM information (e.g. PDU Session Establishment Accept (including Authorized QoS Rule, and SSC mode)). The N2 SM information may carry information that the AMF needs to provide to the (R)AN. The CN Tunnel Info may correspond to the Core Network address of the N3 tunnel corresponding to the PDU session. The QoS Profile may provide the AN with the mapping between QoS parameters and QoS Flow Identifiers. The PDU Session ID may be used by AN signalling with the UE to indicate to the UE the association between AN resources and a PDU session for the UE. The N1 SM information may contain the PDU Session Establishment Accept message that the AMF needs to provide to the UE. Multiple Authorized QoS Rules may be included in the PDU Session Establishment Accept message within the N1 SM information and in the N2 SM information.

The SM Request Acknowledgement message may further contain information allowing the AMF to identify which UE is the target of the SMF request as well to determine which access towards the UE to use. The access information may be used to deal with the case where a UE is simultaneously connected over 3GPP and Non 3GPP access.

Referring now to FIG. 28B, at step 2830, the AMF may send an N2 PDU Session Request message to the R(AN) 302. The N2 PDU Session Request message may contain parameters such as: N2 SM information; and PDU Session Establishment Accept.

In response to the N2 PDU Session Request message, the R(AN) 302 may initiate (at 2832) AN specific signalling exchange with the UE 102 to set up resources for the PDU session. For example, in the case of a 3GPP RAN, an RRC Connection Reconfiguration may take place with the UE 102 establishing the necessary RAN resources related to the Authorized QoS Rules for the PDU Session. Nodes within the (R)AN may also allocate (R)AN tunnel information for the PDU Session. The (R)AN nodes may forward the NAS message (including the PDU Session Establishment Accept) to the UE, if the necessary RAN resources are established and the allocation of (R)AN tunnel information are successful.

Following set up of the resources for the PDU session, the (R)AN node 302 may send (at 2834) an N2 PDU Session Request Acknowledgment message to the AMF 308. The N2 PDU Session Request Acknowledgment message may also include (R)AN Tunnel Information corresponding to the Access Network address of the N3 tunnel for to the PDU session. Following receipt of the N2 PDU Session Request Acknowledgment message by the AMF 304, the UE 102 may be able to begin transmitting (at 2836) Uplink data of the PDU session to the UPF 304.

At a next step (2838), the AMF 308 may forward the N2 SM information received from (R)AN to the SMF 310, using an SM Request message that includes the N2 SM information.

Next, the SMF 310 may send (at 2840) an N4 Session Modification Request to the UPF 304 in order to provide AN Tunnel Info and (optionally) CN Tunnel Info for the N4 session associated with the new PDU session. In a case in which the N4 session for the new PDU Session has not already been established, the SMF 310 may initiate an N4 Session Establishment procedure with the UPF 304 to establish the N4 session with the AN Tunnel Info and (optionally) CN Tunnel Info. Otherwise, the SMF 310 may initiate an N4 Session Modification procedure with the UPF 304 to add the AN Tunnel Info and (optionally) CN Tunnel Info to the existing N4 session. Note that the CN Tunnel Info only needs to be provided if the SMF 310 selected CN Tunnel Info in step 2816.

Following receipt of the N4 Session Establishment/Modification Response from the UPF (at 2842), the SMF 310 may notify (at 2844) the AF 324 (or NEF 314) about the UP path selection, if UP path management event notification polices are provided and indicate the need of late notification. The notification may include N6 tunnel information related to the UPF (e.g. the address and/or port number of the UPF) and an indication that this is a late notification. If N6 Tunnel is to be used, this step may indicate to the AF that the N6 Tunnel is ready for use. Subsequently, the AMF may forward relevant events to the SMF, for example at handover where the (R)AN Tunnel Info changes or the AMF is relocated.

The SMF 310 then returns (at 2846) an SM Request Acknowledgement to the AMF 308 before generating and sending (at 2848) an IP Router Advertisement to the UE 102 via the N4 session and the UPF 304. This step provides the IP configuration information so that Downlink Data can be transmitted to the UE (at 2850).

During the lifetime of the PDU session, the AMF 308 stores an association of the PDU session ID and the SMF ID.

Figure 29A:
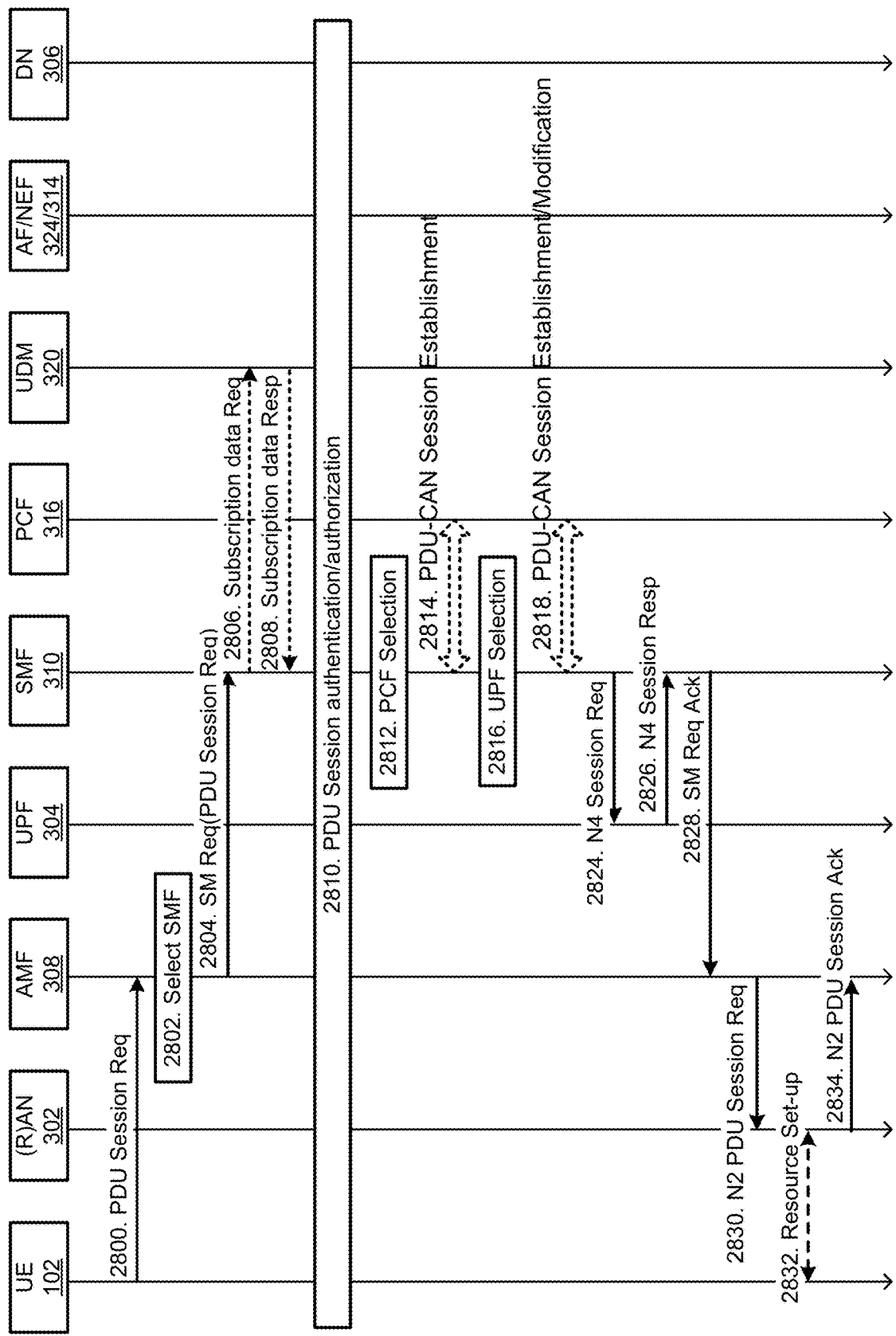
FIGS. 29A and 29B show a call flow diagram illustrating a further alternative process for UP path management notification to an AF in accordance with an example embodiment of the present invention; d
Figure 29B:
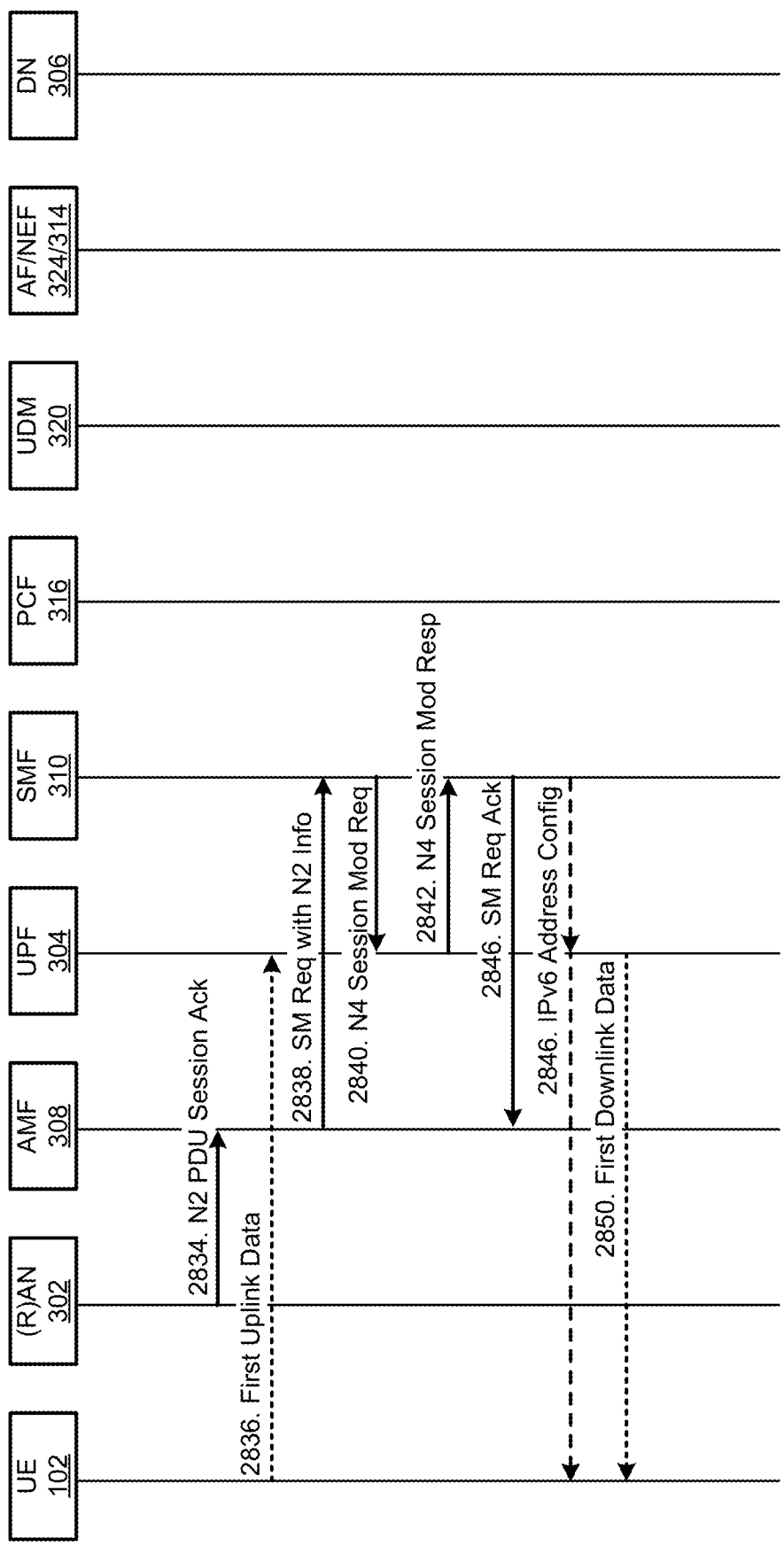

FIGS. 29A and 29B show a call flow diagram illustrating a process for UE-requested PDU Session Establishment for roaming with local breakout. The procedure of FIGS. 29A and 29B is closely similar to that of FIGS. 28A and 28B, except that in the case of roaming with local breakout, the SMF 310, UPF 304 and the PCF 316 are all located in the visited network. This implies that steps 2820, 2822 and 2844 described above are not performed.

Figure 30:
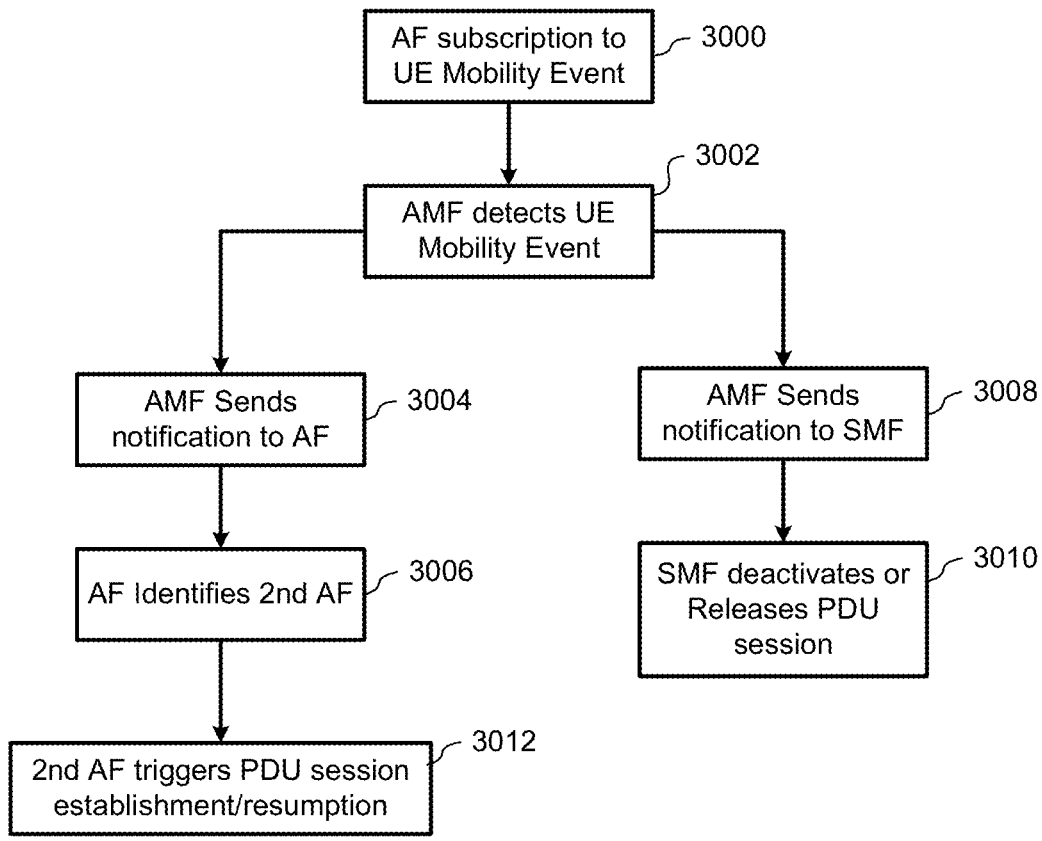
FIG. 30 is a flowchart illustrating a process in accordance with an example embodiment of the present invention.

FIG. 30 is a flowchart illustrating a hand-off process in accordance with an example embodiment of the present invention. It will be well understood that in the illustrated flow charts different entities are responsible for carrying out different steps. It should be further understood that this is showing the interaction of multiple independent methods each of which is carried out at a different node or function. A variation one of the methods will not necessarily require a change in the other method. Furthermore, where reference is made to a first function sending a message to a second function, it should be understood that this implies that the second function carries out the step of receiving the message transmitted by the first function.

At a first step (3000) an AF may subscribe to notification of UE mobility events for some particular traffic associated with an application. UE mobility events may, for example, include the UE moving out of the service area of the current local DN.

Subsequently, an AMF may detect the UE mobility event (at 3002), and sends a corresponding notification to the AF (at 3004). Alternatively, the AMF may notify the SMF, and the SMF in turn notifies the AF. The notification may be sent via the NEF (e.g. when the AF is untrusted) or directly to the AF (e.g. when the AF is in the trust domain). The notification may include the target local DNs (where the application is also deployed) that the UE is moving into.

Upon receipt of the notification, the AF may identify (at 3006) a second AF that is associated with the application in a target DN, and notifies the second AF about the application IDentifier, the traffic filter (indicating the impacted application traffic) and the application context information. The AF may optionally notify the second AF about the AMF notification identifier (carried in the AMF notification).

The second AF may then send a request (at 3012) to the 5GC (eg. The SMF) to trigger PDU session establishment or resumption after the UE enters the target local DN. The request sent to the 5GC (e.g. the SMF) for PDU session establishment or resumption may include the AMF notification identifier and/or the traffic filter, so that the 5GC can resume the correct PDU session or inform the UE to establish PDU sessions for the proper traffic.

Once the UE mobility event has occurred, the AMF may send a corresponding notification to the SMF (at 3008), and the SMF may respond by deactivating or releasing (at 3010) the PDU session associated with the application.

In some cases, the same AF may be associated with the application in both the current and target DNs. In this case, the "AF" and the "second AF" referenced above are in fact the same entity. Consequently, the interaction between the two AFs at step 3006 becomes an internal procedure, and the step 3012 may be carried out by the response message from the first AF to the AMF or to the SMF.

As may be appreciated, the process of FIG. 30 allows the UE's application session to be preserved, because the application context is transferred to the second AF, which controls the application in the target DN.

In some embodiments, the AF is an application server. In other embodiments, the AF is not an application server, but rather operates to configure the application context into the application server for resuming/preserving application sessions.

In some embodiments, the AF is an SDN controller which operates to configure forwarding rules in the transport network to ensure packet delivery to correct UPF.

In some embodiments, the application is a video streaming application and the application context information describes how (from where) to resume the dis-continued video stream. In some embodiments, the application is a gaming application and the application context information describes how (from where) to reconstruct or recover the gaming context.

The DNAI is an identifier that points to a node or function that provides access to the DN for user plane traffic. A node or function in the UP transmitting traffic to the DN, can direct the traffic to a DNAI. In some embodiments, the DNAI may be a network element such as router that is strategically deployed by the operator, in other embodiments the DNAI may be gateway function providing access to a data centre within which virtual UPFs are instantiated. An application location refers to a network element (e.g. a server, a data centre) upon which the application is deployed. Multiple applications can be deployed at the same location.

It should be understood that when an application communicates with a UE through a 3GPP-compliant network, the application location can be mapped or associated with a DNAI. In some embodiments, this association can be a part of the routing profile (e.g. stored or otherwise indicated within the routing profile). In other embodiments the association is external to the routing profile, and may be stored within a locally accessible table, or in a common reference point within the network. In some embodiments the routing profile describes the routing parameters associated with the routing of traffic to the application location. This may take the form of a combination of either or both a destination address and a destination port number at the application location. Such embodiments are examples of situations in which the association may be external to the routing profile. It will be understood by those skilled in the art that routing profiles may, in some embodiments, be application location specific. This allows traffic to be directed to the DNAI, and from there be forwarded to the application. An application may be instantiated in different DNs. Within the same DN, an application may be instantiated at multiple locations, and each application location may be associated with a plurality of DNAIs. In implementations where a routing profile is per application location specific, the routing profile can indicate a transport address such as IP address and port number or a network address such as Ethernet address, associated with the application location and other traffic routing parameters to be used by the DNAIs associated with the application location for routing traffic to the application location.

In some embodiments, both routing profiles and the association between the routing profile (or the corresponding application location) and the DNAI can be configured into the NEF, by another network function (e.g. the AF) in coordination with the NEF or by a management plane function such network manager, slice manager, service manager, etc. In embodiments in which the AF is within a trusted domain, the routing profile and association between the routing profile and the DNAI may be configured into the AF itself.

Because a DNAI identifies a data network access point, and each DN can support a plurality of different applications and UPFs, a DNAI may be associated with a plurality of different UPFs. The traffic steering profile is typically associated with the DNAI and then applied to each UPF associated with the DNAI. In some embodiments the PCF may be configured with the information of the DNAI and the traffic steering profiles. In some embodiments, the association between the traffic steering profile and UPFs can be configured into the SMF. In another embodiment, the traffic steering profile may be configured into the UPF and the SMF. The configuration described above may be performed by a management plane function such as network manager, slice manager, service manager, etc. Other network functions, including the SMF, the NEF or the PCF, may also have roles in the configuration of the UPF and the traffic steering profile. In implementations where a traffic steering profile is per DNAI specific, the traffic steering profile can indicate a transport address such as IP address and port number or a network address such as Ethernet address, associated with the DNAI and other traffic routing parameters to be used by the UPFs associated with the DNAI for routing traffic to the DNAI. The traffic steering profile may also indicate the DNAI itself by means of an identifier.

Figure 31:
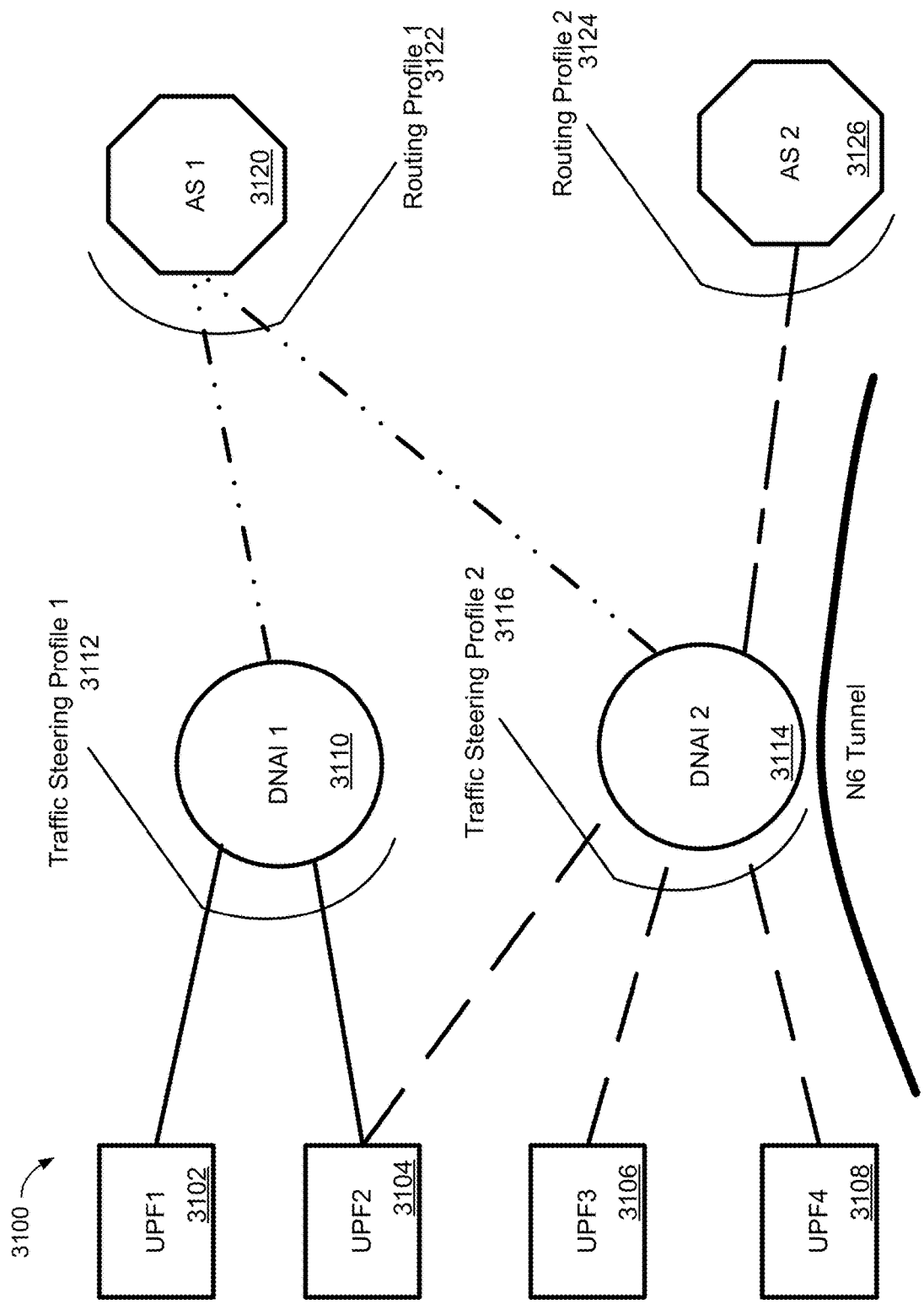
FIG. 31 is a logical block diagram illustrating an example relationship between application location, DNAI and UPF, according to embodiments of the present invention.

FIG. 31 is a logical block diagram 3100 illustrating an example relationship between application location, DNAI and UPF. A set of four UPFs, UPF1 3102, UPF2 3104, UPF3 3106, and UPF4 3108 are illustrated. A set of two application locations, AS1 3120 and AS2 3126 are illustrated. Access to AS1 3120 can be through either DNAI 1 3110 or DNAI 2 3114. Access to AS2 3126 is through DNAI 2 3114. Traffic from UPF1 3120 and UPF2 3104 to AS1 3120 is subject to traffic steering profile 1 3112 and routing profile 1 3122. Traffic from UPF2 3104, UPF3 3106 and UPF4 3108 to AS2 3126 is subject to traffic steering profile 2 3116 and routing profile 2 3124. Thus, traffic from UPF2 3104 may be subject to different traffic steering profiles based on the application location targeted.

The routing profile 1 3122 corresponds to the application location AS1 3120, which is associated with both DNAI1 3110 and DNAI2 3114. The routing profile 2 3124 corresponds to the application location AS2 1326, which is associated with DNAI2 3114.

The association between a UPF and a DNAI may imply that the UPF may support traffic steering toward the DNAI using the information specified in the traffic steering profile associated with the DNAI. For example, UPF2 3104 is associated with both DNAI1 3110 and DNAI2 3112. As such, UPF2 3104 is capable of steering traffic toward both DNAIs.

An information mapping configured in NEF, PCF and SMF is illustrated below:

@ NEF: Application location←→routing profiling ID
@ PCF: Routing profile ID→DNAIs;
    DNAI←→traffic steering profile ID
@ SMF: traffic steering profile ID→UPFs The PCF does not necessarily need to know the content of routing profiles and similarly the SMF does not necessarily need to know the content of traffic steering profiles.

In the illustrated embodiments of FIG. 31, there is a minimal set of information that is available to each of the different types of network functions. An AF should have access to the Application location (e.g. in terms of a transport address or network address of the application location).

The DNAI should have access to routing profiles associated with the application location that it is associated with. A UPF should have access to traffic steering profiles of the DNAIs that it is associated with. The configuration of these nodes and functions so that they are provided with this information, or provided with access to this information, can be performed by any of a number of different management plane functions, such as network manager, slice manager, service manager, and/or the AF. For example, the AF may provide the necessary information to the DNAI, while a management plan function provide the necessary information to the NEF, the PCF, the SMF, and the UPF.

N6 Tunnel information, which may have been provided by the SMF, is used by a UPF to establishing an N6 tunnel, and for determining the processing applied to UL packets sent through the N6 tunnel. The N6 Tunnel information may include tunnel type such as IP tunnel, Ethernet tunnel, IPv6/UDP tunnel, etc. It may include information of tunnel end point identifier or address, port number, and other tunnel protocol parameters. The traffic steering parameters can be obtained using a traffic steering profile ID (which itself may be obtained from a function such as the SMF). The traffic steering parameters may be obtained from a local configuration. If the traffic steering parameters are not pre-configured locally at the UPF, the UPF may obtain them from a function such as the SMF. If traffic steering parameters are provide by the SMF to the UPF, the traffic steering profile ID may not be provided to the UPF by the SMF. Packets sent through the N6 tunnel can be encapsulated, and traffic steering information can be embedded within the outer header. The outer header can also include an identification of the processing to be applied for UL packets.

As will be understood, the manner in which traffic in the UP is routed and processed can be configured by CP functions. For application-influenced traffic routing, the configuration process can commence with an AF performing a request procedure to send an application location notification to the network. The AF can provide an application location (e.g. in a transport address) and N6 Tunnel information (if any) to the NEF. The NEF can map the application location, received from the AF, to a routing profile. The NEF can then send the routing profile ID and the N6 Tunnel information to the PCF. The PCF can map the routing profile ID to at least one DNAI. The routing profile ID can also be mapped to traffic steering profiles, for example, via the mapped at least one DNAI. Based on these mappings a traffic steering policy can be generated. The traffic steering policy will typically specify one or multiple traffic steering profile IDs, a routing profile ID, and N6 Tunnel information. Traffic steering policy may also contain other information such as validity conditions.

For non-IP traffic, N6 Tunnel information is typically required. For IP traffic, it may be optional. If N6 Tunnel is not used when handling IP traffic, the traffic routing parameters in traffic steering profile and routing profile together may describe how to route traffic end to end over N6.

An example of enforcing application influence on traffic routing during a session establishment procedure (or a session modification procedure) is now discussed. The process may commence with the PCF sending a traffic steering policy to SMF. The SMP can then map traffic steering profile IDs (typically contained in the traffic steering policy, but optionally provided along with the policy) to UPFs. The PCF can then perform a UPF/traffic steering selection process, and provide the selected traffic steering profile ID and the N6 Tunnel information (carried by the policy) to a UPF selected for the PDU session. The SMF may compile/ process the N6 Tunnel information before sending it to the UPF, for example, generating a tunnel header for the UPF to apply to UL packets. The SMF may also generate a Traffic Forwarding Template. The TFT can be used by the UPF to map a N6 Tunnel to a path in the UP for DL traffic.

The SMF can send a notification to the NEF of any N6 Tunnel change (e.g. N6 tunnel end point change due to UPF reselection). The SMF may also send a notification to the NEF to inform the NEF of a traffic steering change, which may include changes in DNAI mappings and/or routing profile ID. The NEF can map the DNAI to a transport address and the routing profile ID to a traffic address of the respective application location. The NEF can then provide the information associated with an N6 Tunnel change and traffic steering change (after information mapping) to the AF.

Based on the foregoing description, it may be appreciated that embodiments of the present invention may provide:

A method for managing protocol data unit session data traffic on a network, the method comprising a control plane entity available on the network:
receiving an application program interface (API)-based Application System (AS) location notification from an AS controller, the API-based AS location notification identifying an AS location and data traffic to be associated with the identified AS location; and,
transmitting an AS location notification to locate the AS.

In some embodiments, before the control plane entity transmits the AS location notification, the method further comprises the control plane entity authenticating the AS controller.

In some embodiments, the authenticating the AS controller comprises transmitting an authentication request to an authentication server function (AUSF) available on the network; and, receiving an authentication response from the AUSF indicating an authentication result in response to the authentication request.

In some embodiments, the AS location notification comprises an AS relocation notification that changes an existing location of a PDU session.

In some embodiments, the AS location notification comprises an AS location notification that establishes a location of a future PDU session.

In some embodiments, the AS relocation notification is transmitted to a session management function (SMF) to configure traffic steering for the data traffic to the relocated AS.

In some embodiments, the AS location notification is transmitted to a Policy Control Function (PCF) to generate a User Plane (UP) selection policy and traffic steering policy for the data traffic.

A method for managing protocol data unit (PDU) session data traffic exchanged with a User Equipment (UE) connected to a network, the method comprising a control plane entity available on the network:
receiving a PDU session request from the UE;
verifying the UE context and authorizing the session request based on user subscription data, and if authorized the method further comprises:
selecting and setting up a user plane (UP) path for the requested PDU session;
transmitting a PDU session request response to the UE.

In some embodiments, the PDU session request includes a session ID.

In some embodiments, the PDU session request includes a preferred SSC mode for the requested PDU session.

In some embodiments, the PDU session request includes an application identifier indicating the PDU session request is dedicated to an application associated with the application identifier.

A method for connecting a UE to network, comprising a session management function available on the network:
receiving a PDU session request from the UE;
selecting an end-to-end user plane (UP) path for the PDU session;
notifying an application function available on the network of the selected end-to-end UP path;
sending to an access node (AN) a request to setup a PDU session connection for the UE corresponding to the selected end-to-end UP path.

In some embodiments, the AN comprises a serving AN that received the PDU session request from the UE and forwarded the PDU session request to the SMF.

In some embodiments, the PDU session request indicates an anchor user plane function (UPF) location and an application location of the application function.

An electronic device comprising:
A network interface;
A processor;
A memory for storing instructions that when executed by the processor cause the electronic device to carry out the method described herein.

A method for managing protocol data unit session data traffic on a network, the method comprising a Network Exposure Function (NEF) available on the network:
selecting a Policy Control Function (PCF) available on the network;
transmitting to the PCF a User Plane (UP) selection notification policy update request; and,
receiving a UP selection notification policy update response.

In some embodiments, the selecting a Policy Control Function (PCF) available on the network is based on receipt of a UP selection Notification Subscription Request, and wherein the method further comprises:
transmitting a UP selection Notification Subscription Response.

In some embodiments, the UP selection Notification Subscription Request is received from an Application Function (AF) available on the network, and wherein the UP selection Notification Subscription Response is transmitted to the AF.

A method of managing a network, the method comprising exchanging User Plane management information between an Application Function entity supporting one or more applications and a Slice Management Function entity configured to manage traffic flows in a respective slice of the network.

A Slice Management Function entity for managing traffic flows in a respective slice of a network, the Slice Management Function entity configured to exchange User Plane management information with an Application Function entity supporting one or more applications of the network.

An Application Function entity supporting one or more applications in a network, the Application Function entity configured to exchange User Plane management information with a Slice Management Function entity configured to manage traffic flows in a respective slice of the network.

In some embodiments, the User Plane management information comprises either one or both of:
operator policy information or events; and
traffic requirements of the applications supported by the Application Function entity.

A method for establishing a PDU session performed by a network entity executing on a processing unit of a network node of a communication network, comprising the network entity performing the steps of:

receiving from a UE a session request including an application identifier;

transmitting to a Network Exposure Function (NEF) an authentication/authorization request on behalf of the UE;

receiving from the NEF an authentication/authorization response; and, authorizing the PDU session based on the authentication/authorization response.

In some embodiments, the network entity comprises a Session Management Function.

In some embodiments, the network entity transmits the authentication/authorization request to a third party entity through the NEF.

In some embodiments, the network entity receives the authentication/authorization response from a third party entity through the NEF.

A network node operative to establish a PDU session on a communication network, the network node comprising:
a processor operative to enable the network node to:
receive from a UE a session request including an application identifier;
transmit to a Network Exposure Function (NEF) an authentication/authorization request on behalf of the UE;
receive from the NEF an authentication/authorization response; and,
authorize the PDU session based on the authentication/authorization response.

In some embodiments, the network node is enabled to act as a Session Management Function.

In some embodiments, the network node transmits the authentication/authorization request to a third party entity through the NEF.

In some embodiments, the network node receives the authentication/authorization response from a third party entity through the NEF.

A method for establishing a PDU session performed by a network entity executing on a processing unit of a network node of a communication network, comprising the network entity performing the steps of:

receiving from a UE a session request;

if the session request does not include an application identifier, detecting application traffic related to the session request and transmitting a notification to a control plane entity indicating the application traffic detection and requesting reselection of the application traffic steering; and, if the session request includes an application identifier, transmitting to the control plane entity a notification that the PDU session is intended for the application traffic associated with the application identifier.

In some embodiments, the network entity comprises a Session Management Function.

In some embodiments, if the session request includes an application identifier, the method further comprising:
transmitting an authentication/authorization request to a third party entity through the NEF.

In some embodiments, if the session request includes an application identifier, the method further comprising: receiving an authentication/authorization response from a third party entity through the NEF.

A network node operative to establish a PDU session on a communication network, the network node comprising:
a processor operative to enable the network node to:
receive from a UE a session request;
if the session request does not include an application identifier, the network node is operative to detect application traffic related to the session request and to transmit a notification to a control plane entity indicating the application traffic detection and requesting reselection of the application traffic steering; and,
if the session request includes an application identifier, the network node is operative to transmit to the control plane entity a notification that the PDU session is intended for the application traffic associated with the application identifier.

In some embodiments, the network node is enabled to act as a Session Management Function.

In some embodiments, if the session request includes an application identifier, network node is further operative to transmit the authentication/authorization request to a third party entity through the NEF.

In some embodiments, if the session request includes an application identifier, the network node is further operative to receive the authentication/authorization response from a third party entity through the NEF.

A method for establishing a PDU session performed by a network entity executing on a processing unit of a network node of a communication network, comprising the network entity performing the steps of:

receiving from a UE a session request including an application identifier;

obtaining PCC rules associated with the application identifier; and, configuring application traffic handling policies for the PDU session based on the obtained PCC rules.

In some embodiments, the network entity comprises a Session Management Function.

A network node operative to establish a PDU session on a communication network, the network node comprising:
a processor operative to enable the network node to:
receive from a UE a session request including an application identifier;
obtain PCC rules associated with the application identifier; and,
configure application traffic handling policies for the PDU session based on the obtained PCC rules.

In some embodiments, the network node is enabled to act as a Session Management Function.

A method for establishing a PDU session performed by a network entity executing on a processing unit of a network node of a communication network, comprising the network entity performing the steps of:

receiving a third party authentication/authorization request including an application identifier from a session management entity;

selecting an Application Function (AF) based on the third party authentication/authorization request; and, transmitting to the selected AF the third party authentication/authorization request.

In some embodiments, the network entity comprises a Network Exposure Function (NEF).

In some embodiments, the session management entity comprises a Session Management Function (SMF).

In some embodiments, the method further comprises:
receiving an authentication/authorization response from the selected AF.

In some embodiments, the method further comprises:
transmitting the authentication/authorization response to the session management entity.

In some embodiments, the AF is external to the session management entity, and is not operable to communicate directly with the session management entity.

In some embodiments, the network entity and the session management entity are core network functions, and wherein the selected AF is external to the core network.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by modules or functional elements specific to those steps. The respective units/modules may be implemented as specialized hardware, software executed on a hardware platform that is comprised of general purpose hardware, or a combination thereof. For instance, one or more of the units/modules may be implemented as an integrated circuit, such as field programmable gate arrays (FPGAs) or application-specific integrated circuits (ASICs). It will be appreciated that where the modules are software, they may be stored in a memory and retrieved by a processor, in whole or part as needed, individually or together for processing, in single or multiple instances as required. The modules themselves may include instructions for further deployment and instantiation.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of notification management, the method comprising:
    obtaining, by a session management function (SMF), information from a policy control function (PCF), the information being a policy associated with an application function (AF) request, the AF request being for a subscription to a notification of a user plane (UP) path selection or reselection; and
    sending, by the SMF to the AF without involving the PCF, the notification according to the policy, the notification comprising a notification type indicating a time sequence between a transmission of the notification and configuring a UP path.

2. The method according to claim 1, wherein the AF request indicates a requested time sequence between the transmission of the notification and configuring the UP path.

3. The method according to claim 1, wherein the policy is for a protocol data unit (PDU) session associated with a traffic to which the notification relates.

4. The method according to claim 1, wherein the sending the notification without involving the PCF comprises: sending, by the SMF, the notification to the AF via a network exposure function (NEF).

5. The method according to claim 4, wherein the AF request is sent from the AF to the PCF via the NEF.

6. The method according to claim 1, wherein the notification is sent by the SMF before the UP path is configured, and the notification type indicates that the time sequence is that the notification is sent before the UP path is configured.

7. The method according to claim 6, wherein the AF request indicates that the notification is requested to be sent before the UP path is configured.

8. The method according to claim 1, wherein the notification is sent by the SMF after the UP path is configured, and the notification type indicates that the time sequence is that the notification is sent after the UP path is configured.

9. The method according to claim 8, wherein the AF request indicates that the notification is requested to be sent after the UP path is configured.

10. The method according to claim 1, wherein the sending the notification by the SMF comprises:
    sending, by the SMF, a first notification before the UP path is configured, the first notification comprising a first notification type, wherein the first notification type indicates that the time sequence is that the first notification is sent before the UP path is configured; and
    sending, by the SMF, a second notification after the UP path is configured, the second notification comprising a second notification type, wherein the second notification type indicates that the time sequence is that the second notification is sent after the UP path is configured.

11. The method according to claim 10, wherein the AF request indicates that the notification is requested to be sent before and after the UP path is configured.

12. The method according to claim 1, after obtaining the information, further comprising: selecting or reselecting, by the SMF, a UP function (UPF).

13. The method according to claim 1, after obtaining the information, further comprising: selecting or reselecting, by the SMF, an application location.

14. The method according to claim 13, wherein the application location being expressed as a data network access identifier (DNAI).

15. An apparatus implementing a network function comprising:
    a processor; and
    a non-transitory computer readable storage medium storing programming for execution by the processor, the programming including instructions to:
    obtain information from a policy control function (PCF), the information being a policy associated with an application function (AF) request, the AF request being for a subscription to a notification of a user plane (UP) path selection or reselection; and
    send, to the AF without involving the PCF, the notification according to the policy, the notification comprising a notification type indicating a time sequence between a transmission of the notification and configuring a UP path.

16. The apparatus according to claim 15, the programming further including instructions such that the AF request indicates a requested time sequence between the transmission of the notification and configuring the UP path.

17. The apparatus according to claim 15, the programming further including instructions such that the policy is for a protocol data unit (PDU) session associated with a traffic to which the notification relates.

18. The apparatus according to claim 15, the programming including the instructions to send the notification without involving the PCF comprises: instructions to send the notification to the AF via a network exposure function (NEF).

19. The apparatus according to claim 18, the programming further including instructions such that the AF request is sent from the AF to the PCF via the NEF.

20. The apparatus according to claim 15, the programming further including instructions such that the notification is sent by the apparatus before the UP path is configured, and the notification type indicates that the time sequence is that the notification is sent before the UP path is configured.

21. The apparatus according to claim 6, the programming further including instructions such that the AF request indicates that the notification is requested to be sent before the UP path is configured.

22. The apparatus according to claim 15, the programming further including instructions such that the notification is sent by the apparatus after the UP path is configured, and the notification type indicates that the time sequence is that the notification is sent after the UP path is configured.

23. The apparatus according to claim 22, the programming further including instructions such that the AF request indicates that the notification is requested to be sent after the UP path is configured.

24. The apparatus according to claim 15, the programming including the instructions to send the notification comprises instructions to:
send a first notification before the UP path is configured, the first notification comprising a first notification type, wherein the first notification type indicates that the time sequence is that the first notification is sent before the UP path is configured; and
send a second notification after the UP path is configured, the second notification comprising a second notification type, wherein the second notification type indicates that the time sequence is that the second notification is sent after the UP path is configured.

25. The apparatus according to claim 24, wherein the programming further including instructions such that the AF request indicates that the notification is requested to be sent before and after the UP path is configured.

26. The apparatus according to claim 15, the programming further including instructions to: after obtaining the information, select or reselect a UP function (UPF).

27. The apparatus according to claim 15, the programming further including instructions to: after obtaining the information, select or reselect an application location.

28. The apparatus according to claim 27, the programming further including instructions such that the application location being expressed as a data network access identifier (DNAI).

* * * * *